US010887731B2

(12) United States Patent
Maeda et al.

(10) Patent No.: US 10,887,731 B2
(45) Date of Patent: Jan. 5, 2021

(54) MOBILE COMMUNICATION SYSTEM

(71) Applicant: Mitsubishi Electric Corporation, Chiyoda-ku (JP)

(72) Inventors: Miho Maeda, Tokyo (JP); Mitsuru Mochizuki, Tokyo (JP); Taiga Saegusa, Tokyo (JP); Yasushi Iwane, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/138,636

(22) Filed: Apr. 26, 2016

(65) Prior Publication Data

US 2016/0242012 A1 Aug. 18, 2016

Related U.S. Application Data

(63) Continuation of application No. 14/707,505, filed on May 8, 2015, now Pat. No. 9,357,545, which is a (Continued)

(30) Foreign Application Priority Data

Feb. 2, 2009 (JP) .................................. 2009-021395

(51) Int. Cl.
*H04W 4/00* (2018.01)
*H04W 4/08* (2009.01)
(Continued)

(52) U.S. Cl.
CPC ......... *H04W 4/08* (2013.01); *H04W 36/0061* (2013.01); *H04W 72/042* (2013.01);
(Continued)

(58) Field of Classification Search
CPC ....... H04W 4/00; H04W 72/08; H04W 72/04; H04W 72/042; H04W 72/0446; H04W 72/082
See application file for complete search history.

(56) References Cited

U.S. PATENT DOCUMENTS 6,058,302 A 5/2000 Westerberg
8,072,929 B2 12/2011 Frederiksen et al.
(Continued)

FOREIGN PATENT DOCUMENTS

CN 1261484 A 7/2000
CN 1293501 A 5/2001
(Continued)

OTHER PUBLICATIONS

International Preliminary Report on Patentability dated Aug. 2, 2011 in corresponding International Application No. PCT/JP2010/000490 filed on Jan. 28, 2010 (with an English Translation).
(Continued)

*Primary Examiner* — Jae Y Lee
*Assistant Examiner* — Aixa A Guadalupe Cruz
(74) *Attorney, Agent, or Firm* — Oblon, McClelland, Maier & Neustadt, L.L.P.

(57) ABSTRACT

There is a problem that when a closed subscriber group (CSG) cell available to subscribers is installed in a macro cell area, communication cannot be performed due to the interference between a macro cell and the CSG cell in an area thereof. The CSG cell that is provided in the CSG cell area and transmits a downlink synchronization signal using a radio frame assigns control signals to a first subframe and a second subframe among a plurality of subframes constituting the radio frame, and the macro cell that is provided in the macro cell area and transmits a downlink synchronization signal using the radio frame assigns control signals to a third subframe and a fourth subframe, which are shifted from the first subframe and the second subframe by a predetermined number of subframes, respectively, among the plurality of subframes constituting the radio wave, the CSG cell and the macro cell being configured to perform transmission in synchronization with each other.

5 Claims, 34 Drawing Sheets

US 10,887,731 B2
Page 2

Related U.S. Application Data continuation of application No. 13/144,972, filed as application No. PCT/JP2010/000490 on Jan. 28, 2010, now Pat. No. 9,072,104.

(51) Int. Cl.
*H04W 36/00* (2009.01)
*H04W 72/08* (2009.01)
*H04W 72/04* (2009.01)
*H04W 84/04* (2009.01)

(52) U.S. Cl.
CPC ..... *H04W 72/0446* (2013.01); *H04W 72/082* (2013.01); *H04W 84/045* (2013.01)

(56) References Cited

U.S. PATENT DOCUMENTS

| | | | |
|---|---|---|---|
| 8,094,738 | B2 | 1/2012 | Nishio et al. |
| 8,149,749 | B2 | 4/2012 | Maeda et al. |
| 8,626,163 | B2 | 1/2014 | Maeda et al. |
| 8,908,560 | B2 | 12/2014 | Maeda et al. |
| 8,953,523 | B2 | 2/2015 | Mochizuki et al. |
| 2006/0251012 | A1 | 11/2006 | Hara et al. |
| 2007/0010203 | A1 | 1/2007 | Wee et al. |
| 2007/0153735 | A1 | 7/2007 | Frederiksen et al. |
| 2008/0207245 | A1 | 8/2008 | Wakabayashi et al. |
| 2008/0212555 | A1 | 9/2008 | Kim et al. |
| 2008/0227447 | A1 | 9/2008 | Jeong et al. |
| 2009/0047960 | A1* | 2/2009 | Gunnarsson ......... H04J 11/0093 455/436 |
| 2009/0156208 | A1* | 6/2009 | Vesterinen ............ H04W 48/08 455/435.1 |
| 2009/0252075 | A1 | 10/2009 | Ji et al. |
| 2010/0008282 | A1 | 1/2010 | Bhattad et al. |
| 2010/0027483 | A1 | 2/2010 | Ofuji et al. |
| 2010/0029283 | A1 | 2/2010 | Iwamura |
| 2010/0067464 | A1 | 3/2010 | Higuchi |
| 2010/0067465 | A1 | 3/2010 | Miki et al. |
| 2010/0069119 | A1* | 3/2010 | Mueck ................. H04J 11/0069 455/561 |
| 2010/0173637 | A1 | 7/2010 | Damnjanovic et al. |
| 2010/0178895 | A1 | 7/2010 | Maeda et al. |
| 2011/0216732 | A1 | 9/2011 | Maeda et al. |
| 2011/0261777 | A1 | 10/2011 | Maeda et al. |
| 2012/0140720 | A1 | 6/2012 | Nishio et al. |
| 2012/0170485 | A1 | 7/2012 | Maeda et al. |
| 2012/0196603 | A1 | 8/2012 | Mochizuki et al. |
| 2012/0213161 | A1 | 8/2012 | Maeda et al. |
| 2015/0055607 | A1 | 2/2015 | Maeda et al. |
| 2015/0117376 | A1 | 4/2015 | Mochizuki et al. |

FOREIGN PATENT DOCUMENTS

| | | |
|---|---|---|
| CN | 101286786 A | 10/2008 |
| CN | 101287294 A | 10/2008 |
| CN | 101296451 A | 10/2008 |
| CN | 101330714 A | 12/2008 |
| CN | 101291249 A | 10/2018 |
| EP | 1 093 238 B1 | 4/2001 |
| JP | 2006-304308 A | 11/2006 |
| JP | 2008-28977 A | 2/2008 |
| JP | WO 2008/081816 A1 | 7/2008 |
| JP | 2008-236434 A | 10/2008 |
| WO | WO 2007/077522 A2 | 7/2007 |
| WO | WO 2007/080892 A2 | 7/2007 |
| WO | WO 2008/088168 A1 | 7/2008 |
| WO | WO 2008/102531 A1 | 8/2008 |
| WO | WO 2008/134281 A2 | 11/2008 |

OTHER PUBLICATIONS

International Search Report dated Apr. 27, 2010 in corresponding International Application No. PCT/JP2010/000490 filed on Jan. 28, 2010.

"3GPP TS 36.300 V8.6.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Sep. 2008, pp. 1-137.

"Signaling of MBSFN Subframe Allocation in D-BCH", Nokia Siemens Networks, 3GPP TSG-RAN WG1 Meeting #49bis, Jun. 25-29, 2007, 3 Pages.

"3GPP TR R3.020 V0.6.0", 3rd Generation Partnership Project; Technical Specification Group Radio Access Network; Home (e)NodeB; Network Aspects (Release 8), May 2008, pp. 1-53.

"3GPP TS 36.304 V8.3.0", 3rd Generation Partnership Project; Technical Specification Group Radio Access Network; Evolved Universal Terrestrial Radio Access (E-UTRA); User Equipment (UE) Procedures in Idle Mode (Release 8), Sep. 2008, pp. 1-28.

"LS on CSG Cell Identification", RAN2, 2GPP TSG-RAN WG 2 Metting #62, May 5-9, 2008, pp. 1-2.

"LS on HNB/HeNB Open Access Mode", 3GPP SS WG1, 3GPP TSG-SA1 #42, Oct. 13-17, 2008, 1 Page.

"PSC/PCI Split handling and Clarifications", Huawei, 3GPP TSG RAN WG2 #64, Nov. 10-14, 2008, 2 Pages.

"3GPP TR 25.820 V8.2.0", 3rd Generation Partnership Project; Technical Specification Group Radio Access Networks; 3G Home NodeB Study Item Technical Report (Release 8), Sep. 2008, pp. 1-40.

"3GPP TS 36.413 V8.4.0", 3rd Generation Partnership Project; Technical Specification Group Radio Access Network; Evolved Universal Terrestrial Radio Access Network (E-UTRAN); S1 Application Protocol (S1AP) (Release 8), Dec. 2008, pp. 1-80.

"3GPP TS 36.423 V8.4.0", 3rd Generation Partnership Project; Technical Specification Group Radio Access Network; Evolved Universal Terrestrial Radio Access Network (E-UTRAN); X2 Application Protocol (X2AP) (Release 8), Dec. 2008, pp. 1-32.

"3GPP TS 36.331 V8.4.0", 3rd Generation Partnership Project; Technical Specification Group Radio Access Network; Evolved Universal Terrestrial Radio Access (E-UTRA); Radio Resource Control (RRC); Protocol Specification (Release 8), Dec. 2008, pp. 1-116.

"3GPP TR 36.814 V1.5.0", 3rd Generation Partnership Project; Technical Specification Group Radio Access Network; Technical Specification Group Radio Access Network; Further Advancements for E-UTRA; Physical Layer Aspects (Release 9), Nov. 2009, pp. 1-53.

"Concept of Carrier Segment for LTE-A", RAN1, 3GPP TSG-WG 1 #58bis, Oct. 12-16, 2009, 2 Pages.

"Autonomous CC Selection for Heterogeneous Environments", Nokia Siemens Networks, Nokia, 3GPP TSG RAN WG1 #59 Meeting, Nov. 9-13, 2009, 4 Pages.

"Home Cell "Whitelist" "Handling", Samsung," 3GPP TSG RAN WG2 #62bis, Jun. 30-Jul. 4, 2008, 4 Pages.

Japanese Office Action dated Apr. 24, 2012 in patent application No. 2010-548422 with partial English translation.

Office Action dated Jul. 31, 2012 in Japanese Patent Application No. 2010-548422 with English language translation.

Combined Office Action and Search Report dated Sep. 30, 2013 in Chinese Patent Application No. 201080006364.0 (with partial English language translation).

Office Action dated Oct. 12, 2013 in Japanese Application No. 2012-250570 (With English Translation).

Qualcomm Europe, "Support of Rel-8 UEs by LTE-A Relays", 3GPP TSG-RAN WG1#55,, R1-084384, Nov. 10-14, 2008, 20 pages.

Ericsson, "Carrier aggregation in LTE-Advanced", TSG-RAN WG1 #53bis, R1-082468, Jun. 30-Jul. 4, 2008, 6 pages.

Qualcomm Europe, "Carrier Aggregation in Heterogeneous Networks", 3GPP TSG-RAN WG1#55b R1-090357, Jan. 12-16, 2009, 12 pages.

Extended European Search Report dated Jun. 30, 2014 in Patent Application No. 10735644.6.

"3rd Generation Partnership Project; Technical Specification Group Radio Access Network; Evolved Universal Terrestrial Radio Access (E-UTRA) and Evolved Universal Terrestrial Radio Access Net-

(56) References Cited

OTHER PUBLICATIONS work (E-UTRAN); Overall description; Stage 2 (Release 8)", 3GPP TS 36.300 V8.7.0, XP050377582, Dec. 2008, pp. 1-144.
"Simulation results of macro-cell and co-channel Home NodeB with power configuration and open access", Alcatel-Lucent, 3GPP TSG-RAN WG4 (Radio) Meeting #44bis, R4-071578, XP050178018, Oct. 2007, 6 Pages.
Office Action dated Nov. 11, 2014, in Japanese Patent Application No. 2014-041232 (with Partial English-language Translation).
Office Action dated Dec. 2, 2016 in Chinese Patent Application No. 201410149822.6 (with English-language Translation).
Office Action dated Jul. 25, 2017 in Chinese Patent Application No. 201410149822.6 (with Partial English language translation).
Office Action dated Dec. 8, 2017 in Chinese Patent Application No. 201410149822.6, with Partial English-language Translation, 7 pages.
Office Action dated Dec. 27, 2017 in Chinese Patent Application No. 201510408142.6, citing documents AN-AO therein, with Partial English-language Translation, 9 pages.
Office Action dated Feb. 6, 2018 in Japanese Patent Application No. 2016-110883, citing documents AY-AZ therein, with English-language Translation, 4 pages.
ZTE, New Solution for CSG-cell Identification [online], 3GPP TSG-RAN WG2 Meeting #63 R2-084844, Aug. 18-22, 2008, URL:http://www.3gpp.org/ftp/tsg_ran/WG2_RL2/TSGR2_63/Docs/R2-084844.zip, 7 pages.
Motorola, CSG PCI Range Validity [online], 3GPP TSG-RAN WG2#64bis R2-090358, Jan. 12-16, 2009, URL:http://www.3gpp.org/ftp/tsg_ran/WG2_RL2/TSGR2_64bis/Docs/R2-090358.zip, 3 pages.
Japanese Office Action dated Jun. 27, 2017 in Patent Application No. 2016-110883 (with Partial English Translation).
Telecom Italia, "Discussion on CSG options" [online], 3GPP TSG-CT WG1#53 CI-081769, May 9, 2008, 3 pages.
Telecom Italia, AT&T, Qualcomm Europe, Samsung, "Way Forward for Handover to HeNB" [online], 3GPP TSG-RAN WG2#63 R2-084736, Aug. 22, 2008, 2 pages.
Combined Chinese Office Action and Search Report dated Jul. 25, 2018 in Chinese Patent Application No. 201510408123.3 (with English translation), citing document AO therein, 14 pages.
Combined Chinese Office Action and Search Report dated Jul. 16, 2018 in Chinese Patent Application No. 201510408207.7 (with English translation), citing document AO therein, 11 pages.
Combined Chinese Office Action and Search Report dated Aug. 27, 2018 in Chinese Patent Application No. 201510408142.6 (with English translation), citing document AP therein, 23 pages.
Extended European Search Report dated Jul. 25, 2018 in Patent Application No. 18178528.8.
"Simple CSG for REL8", Nokia Corporation, Nokia Siemens Networks, 3GPP TSG-RAN WG2 Meeting #62, R2-082551, XP050140223, May 2008, 6 pages.
"Cell re-selection for hNB", Huawei, 3GPP TSG RAN2 Meeting #60, R2-074831, XP050137339, Nov. 2007, 4 pages.
"Physical Layer Identity of CSG Cells", Motorola, 3GPP TSG-RAN WG2R2-075088 Meeting #60, R2-075088, XP050137554, Nov. 2007, 3 pages.
Office Action dated Feb. 26, 2019 in Japanese Patent Application No. 2018-083610, citing document AO therein, with English-language translation, 6 pages.
Office Action dated Dec. 5, 2018 in Chinese Patent Application No. 201510408123.3, with English-language translation, 24 pages. (The references cited therein were previously filed.).
Office Action dated Oct. 18, 2018 in Indian Patent Application No. 5547/CHENP/2011, 6 pages. (The references cited therein were previously filed.).
Office Action dated Jan. 21, 2019 in Chinese Patent Application No. 201510408207.7, with English-language translation, 8 pages.
Office Action dated Jan. 25, 2019 in Chinese Patent Application No. 201510408142.6, with English-language translation, 8 pages.
Office Action dated Jul. 15, 2019 in Chinese Patent Application No. 201510408142.6 (with unedited computer generated English translation), 7 pages.
Office Action dated Aug. 27, 2019 in Chinese Patent Application No. 201510408207.7, with English-language translation, 7 pages. (The reference(s) cited therein were previously filed.).
Office Action dated Oct. 1, 2019 in Japanese Patent Application No. 2018-083610, with English-language translation, 6 pages. (The references cited therein were previously filed.).
European Office Action dated Feb. 21, 2020 in European Patent Application No. 18 178 526.8.
Chinese Notice of Reexamination dated May 20, 2020 in Chinese Patent Application No. 201510408142.6 with computer-generated translation.
Chinese Notice of Reexamination dated Mar. 25, 2020 in Chinese Patent Application No. 201510408142.6 with translation.
Japanese Office Action dated Jul. 21, 2020 in Japanese Application No. 2018-083610 (with computer generated English Translation).
Chinese Office Action dated Aug. 28, 2020 in Chinese Patent Application No. 201510408207.7 (with Computer Generated English Translation).
Office Action dated Sep. 27, 2020 in Chinese Application No. 20150408142.6 (with Computer Generated English Translation).
Chinese Office Action dated Nov. 16, 2020 in Chinese Application No. 20150408123.3.
Japanese Office Action dated Nov. 17, 2020 in Japanese Application No. 2018-83610 (with Computer Generated English Translation).

\* cited by examiner

FIG. 5
[A]
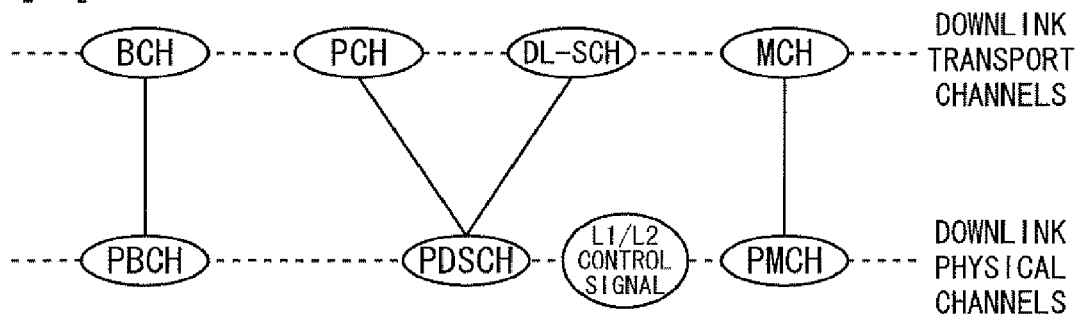
[B]
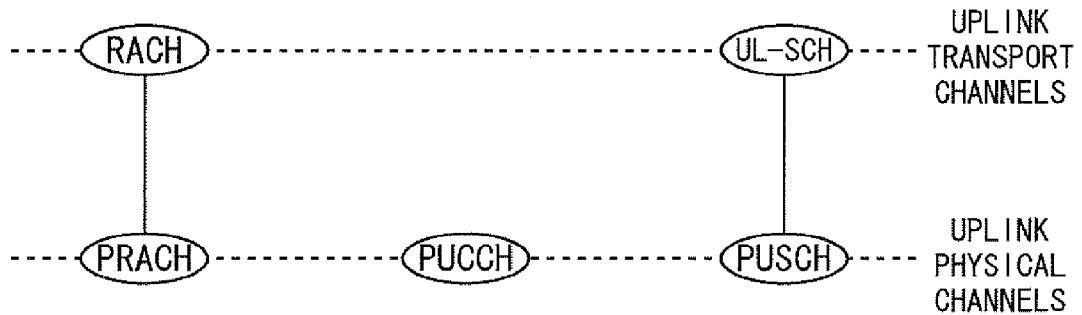

FIG. 13
(a)
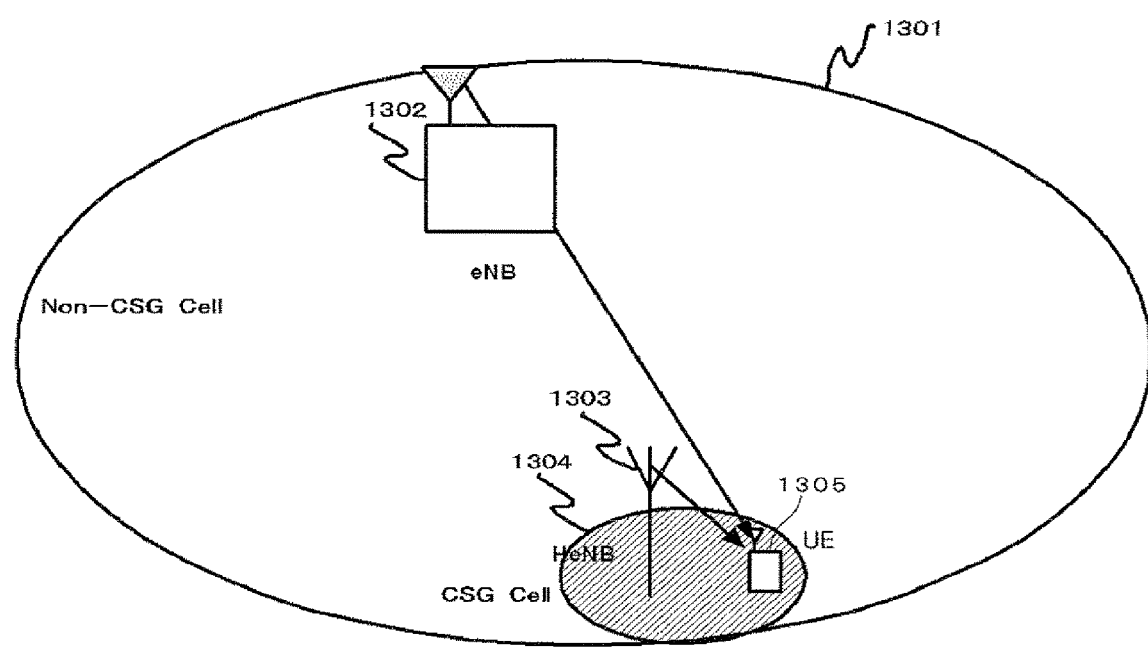
(b)
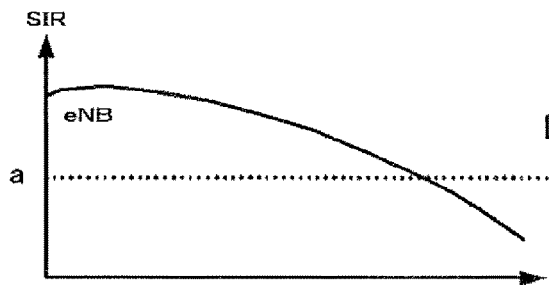
(c)
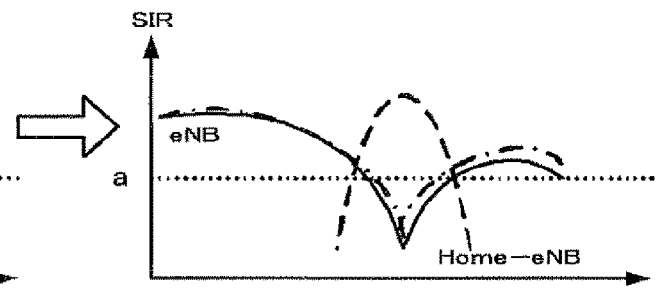

FIG. 14 (a)
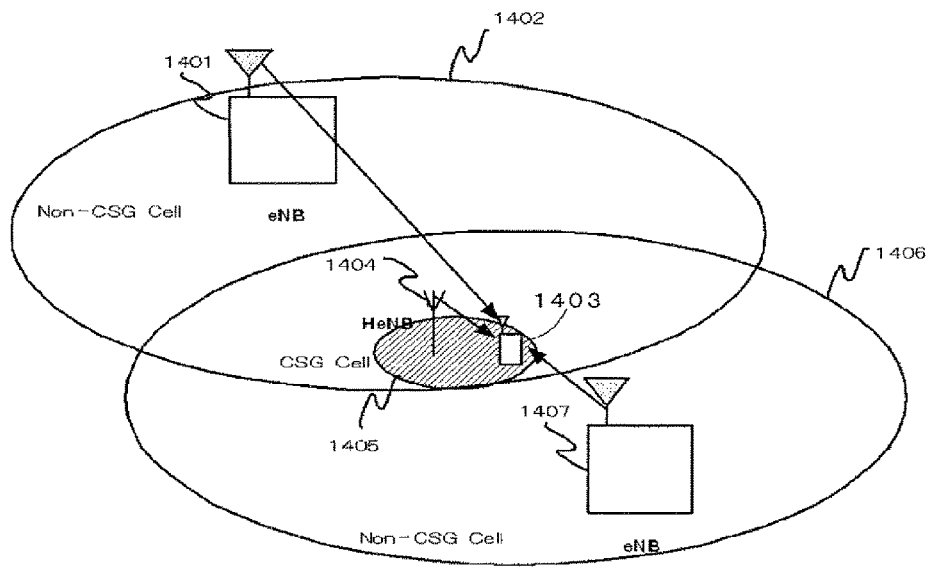
(b) 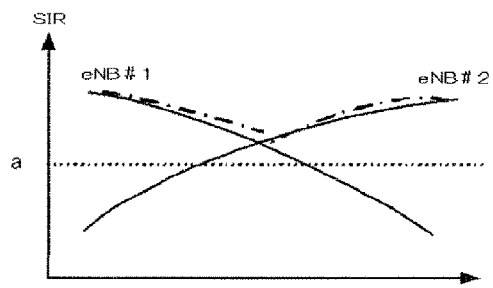
(c) 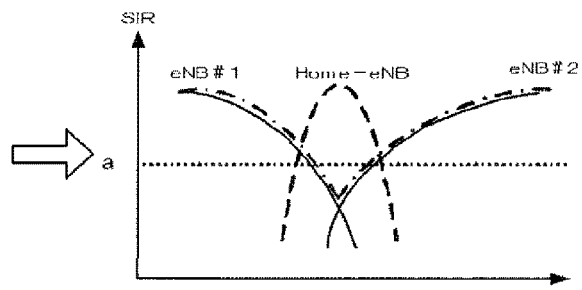
FIG. 15
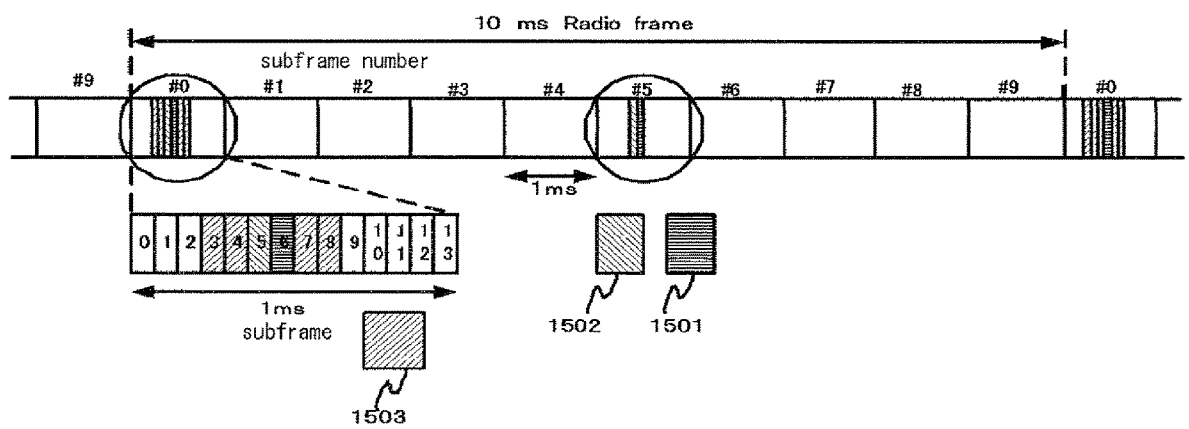

FIG. 34
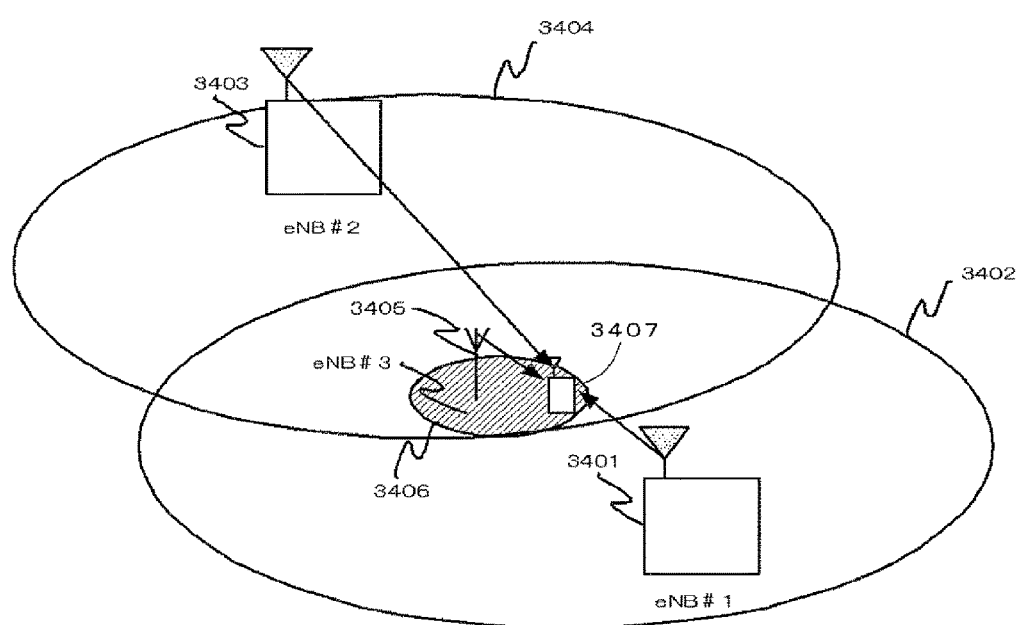
(a)
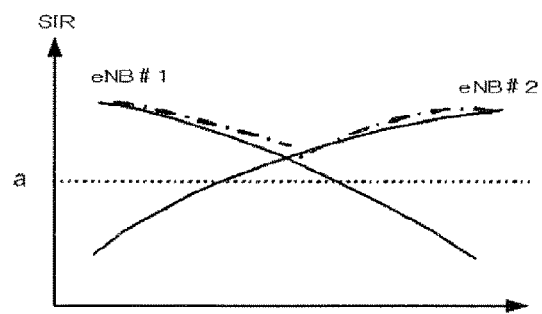
(b)
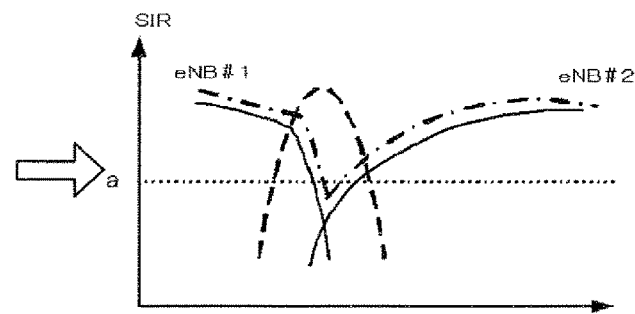
(c)

FIG. 35
(a)
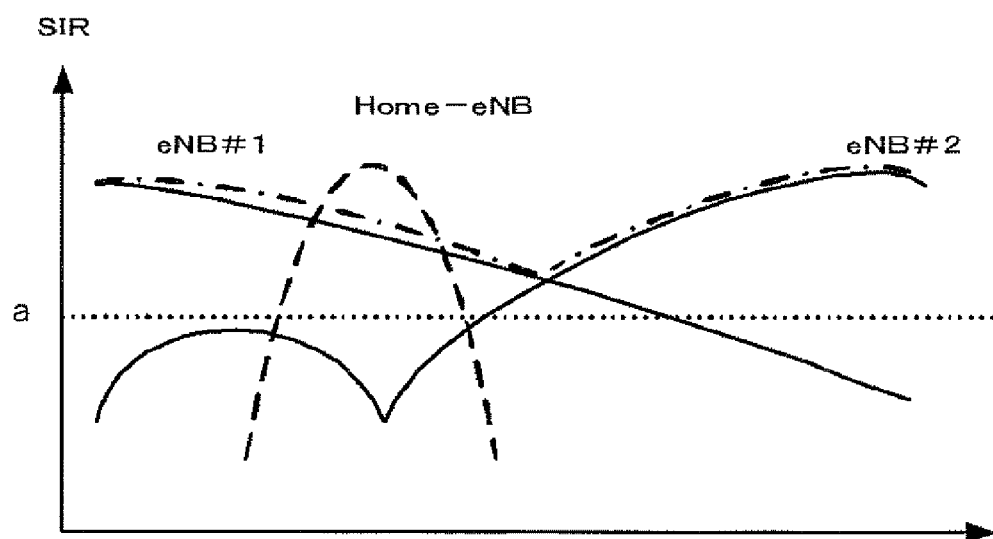
(b)
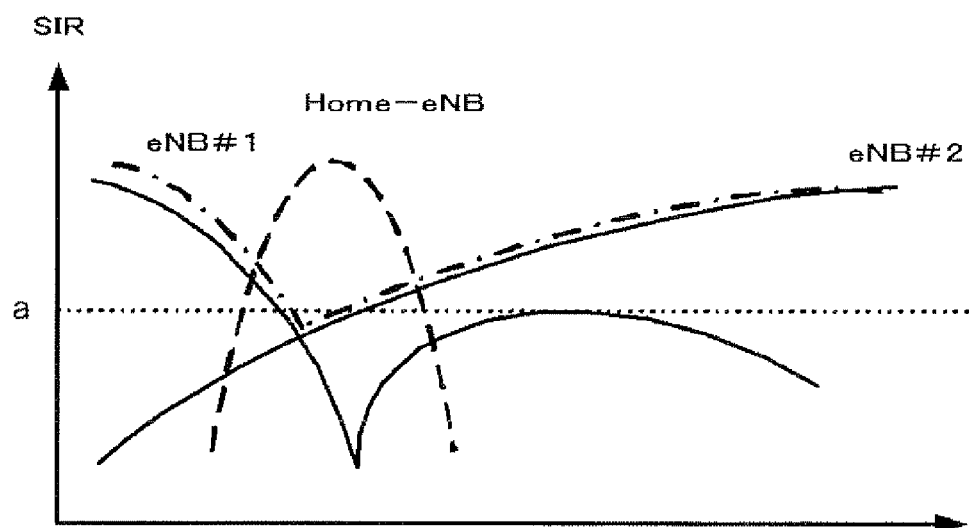

Extension carrier

MOBILE COMMUNICATION SYSTEM

CROSS REFERENCE TO RELATED APPLICATIONS

This application is a continuation of U.S. application Ser. No. 14/707,505 filed May 8, 2015, which is a continuation of U.S. application Ser. No. 13/144,972 filed Jul. 18, 2011, which is a National Phase of PCT/JP2010/000490 filed Jan. 28, 2010, which claims priority to Japanese Application No. 2009-021395 filed Feb. 2, 2009. The entire contents of each of which are incorporated herein by reference.

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed down link packet access (HSDPA) service for achieving higher-speed data transmission using a down link has been offered by adding a channel for packet transmission (high speed-downlink shared channel (HS-DSCH)) to the down link (dedicated data channel, dedicated control channel). Further, in order to increase the speed of data transmission in an uplink direction, service of a high speed up link packet access (HSUPA) has been offered. W-CDMA is a communication system defined by the 3rd generation partnership project (3GPP) that is the standard organization regarding the mobile communication system, where the specifications of Release 8 version are produced.

Further, 3GPP is investigating new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC: also referred to as access gateway (aGW)), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of UEs. This is also referred to as point to multipoint service.

Non-Patent Document 1 describes the current decisions by 3GPP regarding an overall architecture in the LTE system. The overall architecture (Chapter 4 of Non-Patent Document 1) is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol (for example, radio resource management (RRC)) and a user plane (for example, packet data convergence protocol (PDCP), radio link control (RLC), medium access control (MAC), and physical layer (PHY)) for a UE 101 are terminated in the base station 102. The base stations 102 perform scheduling and transmission of paging signaling (also referred to as paging messages) notified from a mobility management entity (MME) 103. The base stations 102 are connected to each other by means of an X2 interface. In addition, the base stations 102 are connected to an evolved packet core (EPC) by means of an S1 interface, more specifically, connected to the mobility management entity (MME) 103 by means of an S1_MME interface and connected to a serving gateway (S-GW) 104 by means of an S1_U_interface. The MME 103 distributes the paging signaling to multiple or a single base station 102. In addition, the MME 103 performs mobility control of an idle state. When the UE is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a PDN gateway (P-GW), which performs per-user packet filtering and UE-ID address allocation.

The current decisions by 3GPP regarding the frame configuration in the LTE system are described in Non-Patent Document 1 (Chapter 5), which are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first (#0) and sixth (#5) subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MB SFN is performed on a per-subframe basis. Hereinafter, a subframe for MBSFN transmission is referred to as an MBSFN subframe. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 describes the current decisions by 3GPP regarding the channel configuration in the LTE system. It is assumed that the same channel configuration is used in a CSG cell (closed subscriber group cell) as that of a non-CSG cell. A physical channel (Chapter 5 of Non- Patent Document 1) is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the UE 101. A BCH transport block is mapped to four subframes within a 40 ms interval. There is no explicit signaling indicating 40 ms timing. A physical control format indicator channel (PCFICH) 402 is transmitted from the base station 102 to the UE 101. The PCFICH notifies the number of OFDM symbols used for PDCCHs from the base station 102 to the UE 101. The PCFICH is transmitted in each subframe. A physical downlink control channel (PDCCH) 403 is a downlink channel transmitted from the base station 102 to the UE 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is referred to as an L1/L2 control signal as well. A physical downlink shared channel (PDSCH) 404 is a downlink channel transmitted from the base station 102 to the UE 101. A DL-SCH (downlink shared channel) that is a transport channel and a PCH that is a transport channel are mapped to the PDSCH. A physical multicast channel (PMCH) 405 is a downlink channel transmitted from the base station 102 to the UE 101. A multicast channel (MCH) that is a transport channel is mapped to the PMCH.

A physical uplink control channel (PUCCH) 406 is an uplink channel transmitted from the UE 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the UE 101 to the base station 102. A UL-SCH (uplink shared channel that is one of the transport channels shown in FIG. 5) is mapped to the PUSCH. A physical hybrid ARQ indicator channel (PHICH) 408 is a downlink channel transmitted from the base station 102 to the UE 101. The PHICH carries ACK/Nack that is a response to uplink transmission. A physical random access channel (PRACH) 409 is an uplink channel transmitted from the UE 101 to the base station 102. The PRACH carries a random access preamble.

A downlink reference signal which is a known symbol in a mobile communication system is inserted in the first, third and last OFDM symbols of each slot. The physical layer measurement objects of a UE includes, for example, reference symbol received power (RSRP).

The transport channel (Chapter 5 of Non-Patent Document 1) is described with reference to FIG. 5. FIG. 5 is a diagram illustrating transport channels used in the LTE communication system. Part [A] of FIG. 5 shows mapping between a downlink transport channel and a downlink physical channel. Part [B] of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH). Retransmission control according to a hybrid ARQ (HARQ) is applied to a downlink shared channel (DL-SCH). Broadcast to the entire base station (cell) is enabled. The DL-SCH supports dynamic or semi-static resource allocation. The semi-static resource allocation is also referred to as persistent scheduling. The DL-SCH supports discontinuous reception (DRX) of a UE for enabling the UE to save power. The DL-SCH is mapped to the physical downlink shared channel (PDSCH). The paging channel (PCH) supports DRX of the UE for enabling the UE to save power. Broadcast to the entire base station (cell) is required. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in part [B] of FIG. 5 is limited to control information. There is a collision risk. The RACH is mapped to the physical random access channel (PRACH). The HARQ is described.

The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system includes "chase combining". In chase combining, the same data sequence is transmitted in the first transmission and retransmission, which is the system for improving gains by combining the data sequence of the first transmission and the data sequence of the retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. Part [A] of FIG. 6 shows mapping between a downlink logical channel and a downlink transport channel. Part [B] of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a UE. The PCCH that is a logical channel is mapped to the paging channel (PCH) that is a transport channel. A common control channel (CCCH) is a channel for transmission control information between UEs and a base station. The CCCH is used in a case where the UEs have no RRC connection with the base station. In downlink, the CCCH is mapped to the downlink shared channel (DL-SCH) that is a transport channel. In uplink, the CCCH is mapped to the UL-SCH that is a transport channel.

A multicast control channel (MCCH) is a downlink channel for point-to-multipoint transmission. The MCCH is a channel used for transmission of MBMS control information for one or several MTCHs from a network to a UE. The MCCH is a channel used only by a UE during reception of the MBMS. The MCCH is mapped to the downlink shared channel (DL-SCH) or multicast channel (MCH) that is a transport channel. A dedicated control channel (DCCH) is a channel that transmits dedicated control information between a UE and a network. The DCCH is mapped to the uplink shared channel (UL-SCH) in uplink and mapped to the downlink shared channel (DL-SCH) in downlink. A dedicated traffic channel (DTCH) is a point-to-point communication channel for transmission of user information to a dedicated UE. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a UE. The MTCH is a channel used only by a UE during reception of the MBMS. The MTCH is mapped to the downlink shared channel (DL-SCH) or multicast channel (MCH).

GCI represents a global cell identity. A closed subscriber group (CSG) cell is introduced in the LTE and universal mobile telecommunication system (UMTS). The CSG is described below (Chapter 3.1 of Non-Patent Document 4). The closed subscriber group (CSG) is a cell in which subscribers who are permitted to use are identified by an operator (cell for identified subscribers). The identified subscribers are permitted to access one or more E-UTRAN cells of a public land mobile network (PLMN). One or more E-UTRAN cells in which the identified subscribers are permitted to access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access permission information. The CSG-ID is broadcast by the CSG cell or cells. A plurality of CSG-IDs exist in a mobile communication system. The CSG-IDs are used by UEs for facilitating access from CSG-related members. 3GPP discusses in a meeting that the information to be broadcast by the CSG cell or cells is changed from the CSG-ID to a tracking area code (TAC). The locations of UEs are traced based on an area composed of one or more cells. The locations are traced for enabling tracing of the locations of UEs and calling (calling of UEs) even in an idle state. An area for tracing locations of UEs is referred to as a tracking area. A CSG whitelist is a list stored in the USIM containing all the CSG IDs of the CSG cells to which the subscribers belong. The whitelist of the UE is provided by a higher layer. By means of this, the base station of the CSG cell allocates radio resources to the UEs.

A "suitable cell" is described below (Chapter 4.3 of Non-Patent Document 4). The "suitable cell" is a cell on which a UE camps to obtain normal service. Such a cell shall fulfill the following: (1) the cell is part of the selected PLMN or the registered PLMN, or part of the PLMN of an "equivalent PLMN list"; and (2) according to the latest information provided by a non-access stratum (NAS), the cell shall further fulfill the following conditions: (a) the cell is not a barred cell; (b) the cell is part of at least one tracking area (TA), not part of "forbidden LAs for roaming", where the cell needs to fulfill (1) above; (c) the cell fulfills the cell selection criteria; and (d) for a cell identified as CSG cell by system information (SI), the CSG-ID is part of a "CSG whitelist" of the UE (contained in the CSG whitelist of the UE).

An "acceptable cell" is described below (Chapter 4.3 of Non-Patent Document 4). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 6 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, the HeNB and HNB are CSG cells where non-CSG members are allowed access at the same time. In other words, a cell in the hybrid access mode is the cell that supports both the open access mode and the closed access mode.

3GPP is studying the operation method for the HNB or HeNB (Non-Patent Document 8). Non-Patent Document 8 describes five operation methods from A to E. In the method A, the HNB/HeNB is operated as the CSG and a dedicated channel with fixed power. In the method B, the HNB/HeNB is operated as the CSG and a dedicated channel with adaptive power. In the method C, the HNB/HeNB is operated as the CSG and a co-channel with adaptive power. In the method D, the HNB/HeNB is operated as the CSG and a partial co-channel. In the method E, the HNB/HeNB is operated in an open access mode on a dedicated channel or co-channel. The operation on a dedicated channel refers to the operation method in which the HNB/HeNB uses a dedicated frequency different from that of the macro cell (NB or eNB). The operation on a co-channel refers to the operation method in which the HNB/HeNB uses the same frequency as that of the macro cell (NB or eNB). The operation on a partial co-channel refers to the operation method in which the frequency used by the HNB/HeNB is part of the frequency used by the macro cell (NB or eNB).

PRIOR ART DOCUMENTS

Non-Patent Documents

Non-Patent Document 1: 3GPP TS36.300 V8.6.0
Non-Patent Document 2: 3GPP R1-072963

Non-Patent Document 3: TR R3.020 V0.6.0
Non-Patent Document 4: 3GPP TS36.304 V8.3.0
Non-Patent Document 5: 3GPP R2-082899
Non-Patent Document 6: 3GPP S1-083461
Non-Patent Document 7: 3GPP R2-086246
Non-Patent Document 8: 3GPP TR25.820 V8.2.0
Non-Patent Document 9: 3GPP TS36.413 V8.4.0 Chapter 8 and Chapter 9
Non-Patent Document 10: 3GPP TS36.423 V8.4.0 Chapter 8 and Chapter 9
Non-Patent Document 11: 3GPP TS36.331 V8.4.0 Chapter 5.2, Chapter 5.5 and Chapter 6.3.1
Non-Patent Document 12: 3GPP TR36.814 V1.5.0 Chapter 5
Non-Patent Document 13: 3GPP R1-094415
Non-Patent Document 14: 3GPP R1-094659

SUMMARY OF INVENTION

Problems to be Solved by the Invention

The HeNB and HNB are required to support various types of service. For example, an operator causes the predetermined HeNB and HNB to register UEs therein and permits only the registered UEs to access the cells of the HeNB and HNB, so that the UEs increase the available radio resources for performing high-speed communication. In such service, the operator sets a higher accounting fee compared with normal service. In order to achieve the above-mentioned service, the CSG cell (closed subscriber group cell) accessible only to the registered (subscribed or member) UEs is introduced. It is required to install a large number of CSG cells (closed subscriber group cells) in shopping malls, apartment buildings, schools, companies and the like. For example, the CSG cells are required to be installed for each store in shopping malls, for each room in apartment buildings, for each classroom in schools, and for each section in companies in such a manner that only the users who have registered the respective CSG cells are permitted to use those CSG cells. The HeNB/HNB is required not only to complement the communication outside the coverage of the macro cell but also to support various types of service as described above. This leads to a case where the HeNB/HNB is installed within the coverage of the macro cell. In the case where the HeNB/HNB is installed within the coverage of the macro cell, interference occurs between the HeNB/HNB and the macro cell. For the UE communicating with the HeNB/HNB within the coverage of the HeNB/HNB, the communication with the HeNB/HNB is hindered due to the interference of a radio wave from the macro cell, leading to a situation in which communication cannot be made if the interference power increases. On the other hand, in a case where the UE communicating with the macro cell within the coverage of the macro cell moves into the coverage of the HeNB/HNB installed within the coverage of the macro cell, communication with the macro cell is hindered due to the interference of a radio wave from the HNB/HeNB, leading to a situation in which communication cannot be made if the interference power increases.

Generally, in a case where the interference power from the other cell increases within the coverage of a cell, the UE is configured to perform handover (HO) or cell reselection to the other cell or other suitable cell for preventing disconnection of communication. In a case where the UE cannot perform handover or cell reselection to such a cell, however, the interference power from the other cell increases, leading to a problem that communication is disconnected. For example, as described above, 3GPP studies the case where the HNB/HeNB is the CSG cell in a closed access mode. Considering that the CSG cell is installed within the coverage of the macro cell, interference occurs between the macro cell and the CSG cell within the CSG coverage as described above. Such a case leads to a problem that the UE that has not performed user registration with the CSG cell cannot communicate with the macro cell due to the interference from the CSG cell.

FIG. 13 is a conceptual diagram showing the situation in which a CSG cell is installed within the coverage of a macro cell and received signal-to-interference ratio (SIR) at the UE in that situation. In a case where a CSG cell 1303 is installed within a coverage 1301 of a macro cell 1302 and a UE 1305 communicating with the macro cell 1302 within the macro cell coverage 1301 moves into a coverage 1304 of the CSG cell 1303 installed in the macro cell coverage 1301 as shown in part (a) of FIG. 13, a radio wave from the CSG cell 1303 becomes interference, which hinders the communication with the macro cell 1302. Part (b) of FIG. 13 shows the SIR at the UE before the HeNB (corresponding to the CSG cell 1303) is installed, while part (c) of FIG. 13 shows the SIR of the UE in a case where the HeNB 1303 is installed. A horizontal axis represents the distance from the base station (eNB) of the macro cell and a vertical axis represents SIR. It is regarded that the UE has not performed user registration with the CSG. As shown in part (b) of FIG. 13, in the case where the HeNB is not installed, the SIR decreases as the UE goes apart from the eNB. Communication is enabled in a case where the SIR is larger than a threshold a and is not enabled in a case where the SIR is smaller than the threshold a. As shown in part (c) of FIG. 13, in a case where the HeNB 1303 is installed within the coverage of the eNB (corresponding to the macro cell 1302), the radio wave from the HeNB 1303, which is indicated by a broken line, is intensified in the vicinity of the HeNB 1303. This radio wave from the HeNB 1303 becomes interference for the UE communicating with the eNB 1302, and the SIR from the eNB 1302 degrades considerably in the vicinity of the HeNB. This leads to a case where the SIR of the UE is smaller than the threshold a in the vicinity of the HeNB. Although the UE attempts to perform handover or cell reselection to the HeNB 1303, handover cannot be made and communication is disconnected because the HeNB 1303 is a CSG cell in a closed access mode.

FIG. 14 is a conceptual diagram showing the situation in which a CSG cell 1404 is installed within the coverages 1402 and 1406 of a plurality of (two in this case) macro cells 1401 and 1407 and the received signal-to-interference ratio (SIR) at the UE in that situation. As shown in part (a) of FIG. 14, in a case where the CSG cell 1404 is installed within the coverages 1402 and 1406 of the two macro cells 1401 and 1407, and a UE 1403 communicating with the macro cells 1401 and 1407 within the macro cell coverages 1402 and 1406 moves into the coverage of the CSG cell 1404 installed in the macro cell coverage 1405, the radio wave from the CSG cell 1404 becomes interference, which hinders the communication with the macro cells 1401 and 1407. Part (b) of FIG. 14 shows the SIR at the UE before the HeNB is installed, while part (c) of FIG. 14 shows the SIR at the UE in a case where the HeNB is installed. It is regarded that the UE has not performed user registration with the CSG. As shown in part (b) of FIG. 14, in the case where the HeNB is not installed, the SIR decreases as the UE goes apart from an eNB#1. The radio wave from an eNB#2 is intensified in the middle, and the UE performs handover or cell reselection to the eNB#2 before the SIR due to a radio wave from the eNB#1 falls below the threshold a. On the other hand, in a case where the HeNB 1404 is installed in the coverages of two cells 1401 and 1407 (eNB#1 and eNB#2 in part (c) of FIG. 14) as shown in part (c) of FIG. 14, the radio wave from the HeNB, which is indicated by a broken line, is intensified in the vicinity of the HeNB. Accordingly, this radio wave from the HeNB becomes interference for the UE communicating with the eNB#1 or eNB#2, and the SIR from the eNB#1 or eNB#2 degrades considerably in the vicinity of the HeNB. This leads to a case where the SIR of the UE is smaller than the threshold a in the vicinity of the HeNB.

In the case where the SIR of the UE is smaller than the threshold a in the vicinity of the HeNB, the UE communicating with the eNB#1 attempts to perform handover or cell reselection to the eNB#2. However, the SIR of the eNB#2 also falls below the threshold a, and thus handover or cell reselection is not allowed. Further, while the UE attempts to perform handover or cell reselection to the HeNB 1404, access cannot be made because the HeNB is the CSG cell in a closed access mode, and handover or cell reselection is not allowed. Therefore, communication is disconnected.

It is described in the example above that a problem occurs in a case where the UE communicating with the macro cell (eNB) cannot perform handover to the CSG cell. Similarly in a case where the UE communicating with the CSG cell cannot perform handover to the macro cell (eNB), a problem arises that communication is disconnected.

As to those problems, Non-Patent Document 8 describes the method in which the HNB/HeNB serving as the CSG cell is operated with adaptive power. However, adjustment of the output power of the CSG cell in accordance with the degree of interference merely broadens or narrows the coverage of the CSG cell. For this reason, there inevitably exists an area with large interference between the CSG cell and the macro cell. Therefore, there still arises a problem that the UE that has moved to the above-mentioned area cannot perform communication.

Means to Solve the Problems

A mobile communication system according to the present invention includes user equipments, a first base station and a second base station, the user equipments performing data transmission/reception using an orthogonal frequency division multiplexing (OFDM) system as a downlink access system and a single career frequency division multiple access (SC-FDMA) system as an uplink access system, the first base station provided to a first cell made open only to specific ones of the user equipments or subscribers and transmitting, to the user equipments, control signals including a downlink synchronization signal using a radio frame including a predetermined number of subframes, the second base station provided to a second cell made available for non-specific ones of the user equipments or users and transmitting, to the user equipments, control signals including a downlink synchronization signal using a radio frame including the same number of subframes as those of the radio frame used in transmission by the first base station, wherein: the first base station assigns the control signals to a first subframe and a second subframe among a plurality of subframes constituting the radio frame; the second base station assigns the control signals to a third subframe and a fourth subframe among the plurality of subframes constituting the radio frame, the third subframe and the fourth subframe being shifted from the first subframe and the second subframe by a predetermined number of subframes, respectively; and the first base station and the second base station transmit the control signals in synchronization.

Another mobile communication system according to the present invention includes user equipments, base stations and a radio network controller, the user equipments performing data transmission/reception using an orthogonal frequency division multiplexing (OFDM) system as a downlink access system and a single career frequency division multiple access (SC-FDMA) system as an uplink access system, the base stations provided to cells for specific subscribers that are communication cells allowed to be used by specific ones of the user equipments or subscribers and cells for non-specific users that are communication cells allowed to be used by non-specific ones of the user equipments or users, the radio network controller managing a desired tracking area in which the user equipments are located through a plurality of the base stations and performing paging on the user equipments, in which the user equipments receive, from the base stations, cell identification information (PCI) being the information assigned to each of the communication cells and provided for identifying the communication cells to select the cell for communication, wherein the user equipments each receive the cell identification information included in a downlink synchronization signal transmitted from the base station, judge whether the received cell identification information coincides with notified cell identification information that is notified from a serving cell performing scheduling for allocating radio resources to the user equipments and indicates a base station having the same identification information as that of the serving cell, and in a case where the received cell identification information and the notified cell identification information do not coincide with each other, eliminate the base station corresponding to the received cell identification information from candidates for cell selection.

Effects of the Invention

The mobile communication system according to the present invention includes user equipments, a first base station and a second base station, the user equipments performing data transmission/reception using an orthogonal frequency division multiplexing (OFDM) system as a downlink access system and a single career frequency division multiple access (SC-FDMA) system as an uplink access system, the first base station provided to a first cell made open only to specific ones of the user equipments or subscribers and transmitting, to the user equipments, control signals including a downlink synchronization signal using a radio frame including a predetermined number of subframes, the second base station provided to a second cell made available for non-specific ones of the user equipments or users and transmitting, to the user equipments, control signals including a downlink synchronization signal using a radio frame including the same number of subframes as those of the radio frame used in transmission by the first base station, wherein: the first base station assigns the control signals to a first subframe and a second subframe among a plurality of subframes constituting the radio frame; the second base station assigns the control signals to a third subframe and a fourth subframe among the plurality of subframes constituting the radio frame, the third subframe and the fourth subframe being shifted from the first subframe and the second subframe by a predetermined number of subframes, respectively; and the first base station and the second base station transmit the control signals in synchronization. Accordingly, in addition to the effect that the interference between the cells of signals, which cannot be scheduled, is reduced to allow the reception of the signals, there is an effect that the received SIR of the cell in UEs being served by the cell does not degrade.

The another mobile communication system according to the present invention includes user equipments, base stations and a radio network controller, the user equipments performing data transmission/reception using an orthogonal frequency division multiplexing (OFDM) system as a downlink access system and a single career frequency division multiple access (SC-FDMA) system as an uplink access system, the base stations provided to cells for specific subscribers that are communication cells allowed to be used by specific ones of the user equipments or subscribers and cells for non-specific users that are communication cells allowed to be used by non-specific ones of the user equipments or users, the radio network controller managing a desired tracking area in which the user equipments are located through a plurality of the base stations and performing paging on the user equipments, in which the user equipments receive, from the base stations, cell identification information (PCI) being the information assigned to each of the communication cells and provided for identifying the communication cells to select the cell for communication, wherein the user equipments each receive the cell identification information included in a downlink synchronization signal transmitted from the base station, judge whether the received cell identification information coincides with notified cell identification information that is notified from a serving cell performing scheduling for allocating radio resources to the user equipments and indicates a base station having the same identification information as that of the serving cell, and in a case where the received cell identification information and the notified cell identification information do not coincide with each other, eliminate the base station corresponding to the received cell identification information from candidates for cell selection. Accordingly, it is possible to judge whether or not the cell is one having the same CSG-ID as that of the serving cell at an early stage of the handover operation, which enables handover to the cell having the same CSG-ID without generating a control delay.

BRIEF DESCRIPTION OF DRAWINGS

FIG. 5 is a diagram illustrating transport channels used in the LTE communication system.

FIG. 13 is a conceptual diagram showing the situation in which a CSG cell is installed within the coverage of a macro cell and received signal-to-interference ratio (SIR) at a UE in that situation.

FIG. 14 is a conceptual diagram showing the situation in which a CSG cell is installed within the coverage of a plurality of (two in this case) macro cells and received signal-to-interference ratio (SIR) at a UE in that situation.

FIG. 15 is a diagram illustrating a frame configuration and signals that cannot be scheduled in the LTE.

FIG. 34 is a conceptual diagram of a problem of a fourth embodiment.

FIG. 35 is a conceptual diagram of the results obtained by reducing a downlink interference amount.

DESCRIPTION OF REFERENCE NUMERALS

101 user equipment
102 base station
103 mobility management entity (MME)
104 serving gateway (S-GW)

EMBODIMENTS FOR CARRYING OUT THE INVENTION

First Embodiment

Figure 1:
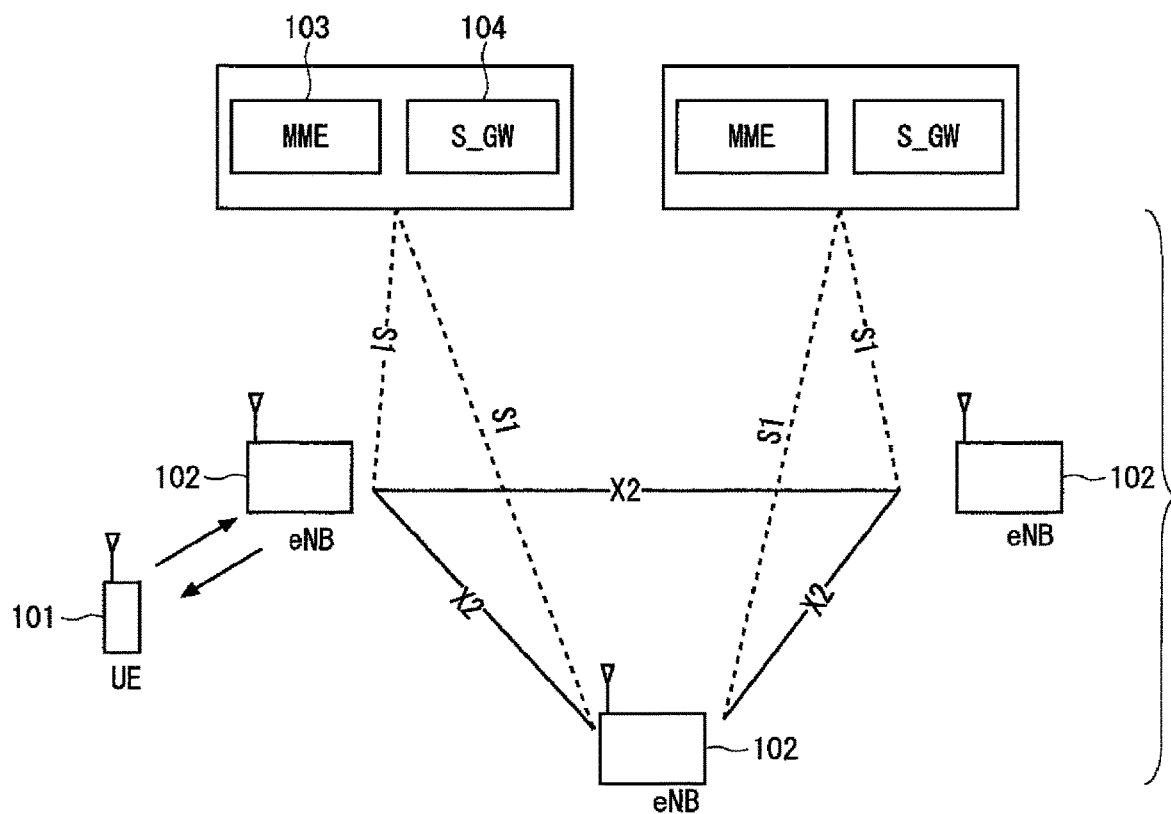
FIG. 1 is a diagram illustrating the configuration of an LTE communication system.
Figure 2:
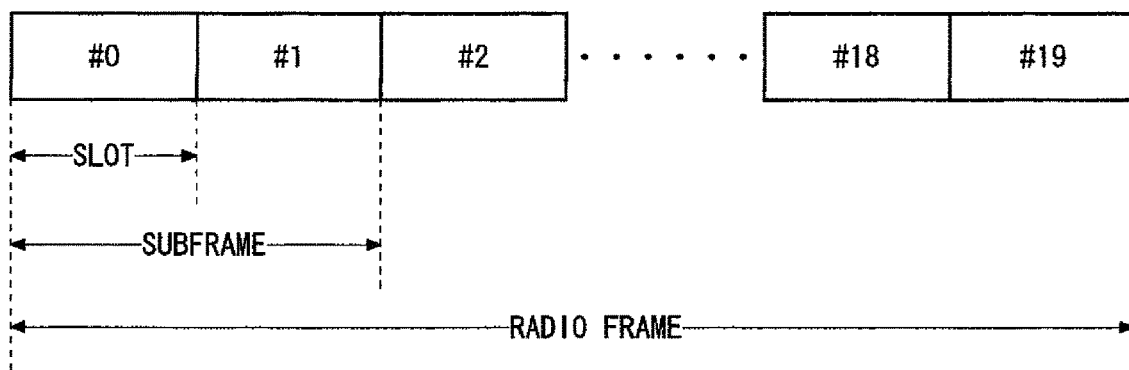
FIG. 2 is a diagram illustrating the configuration of a radio frame used in the LTE communication system.
Figure 3:
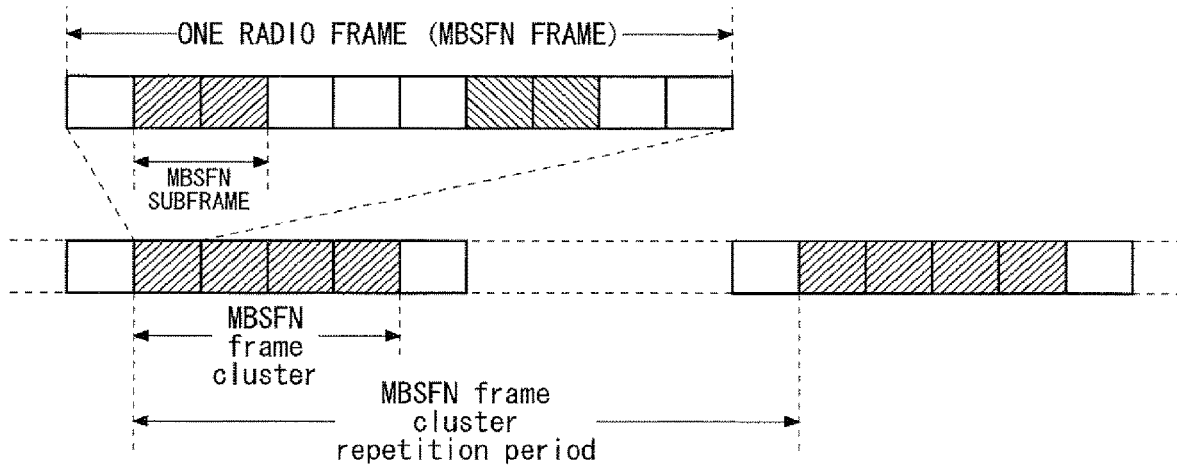
FIG. 3 is a diagram illustrating the configuration of a multimedia broadcast multicast service single frequency network (MBSFN) frame.
Figure 4:
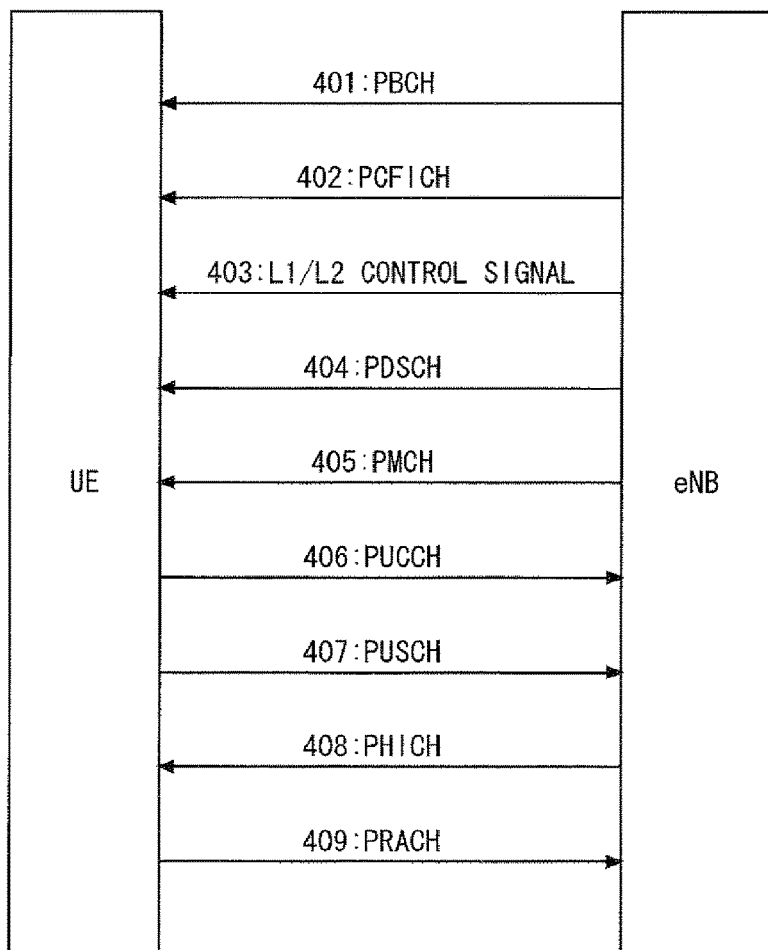
FIG. 4 is a diagram illustrating physical channels used in the LTE communication system.
Figure 6:
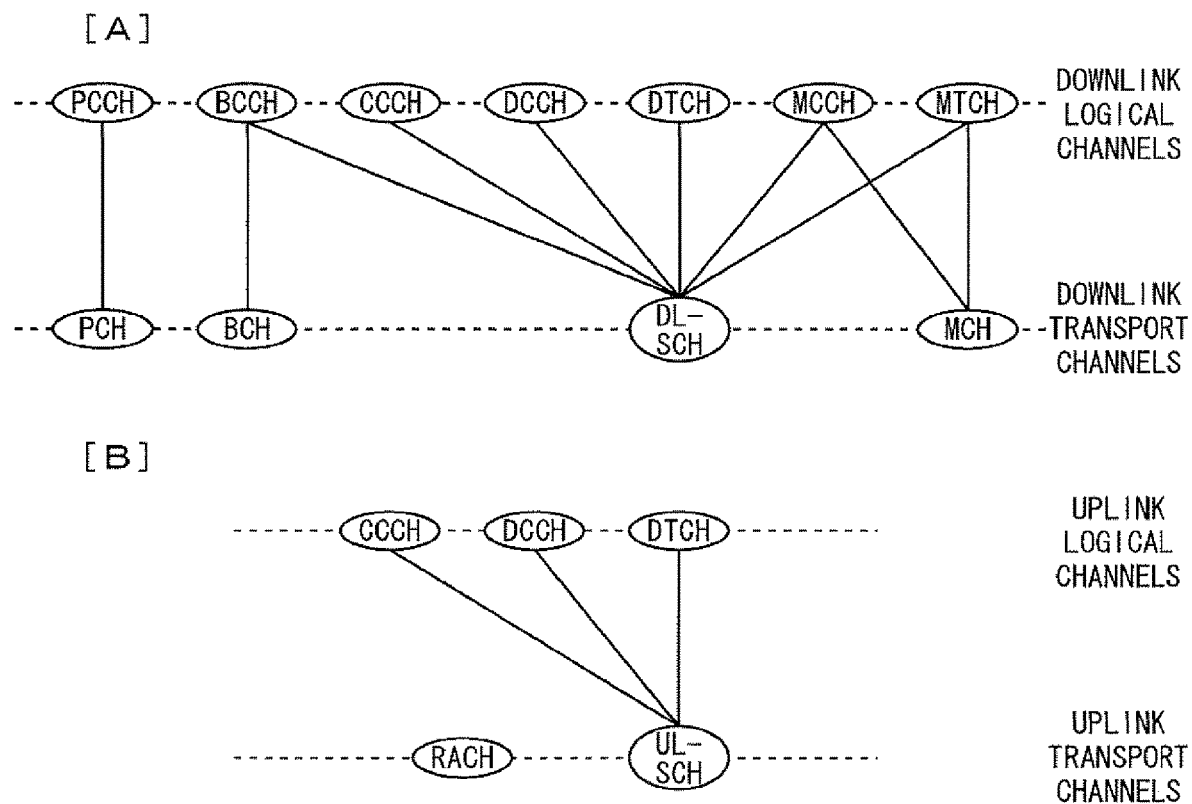
FIG. 6 is a diagram illustrating logical channels used in the LTE communication system.
Figure 7:
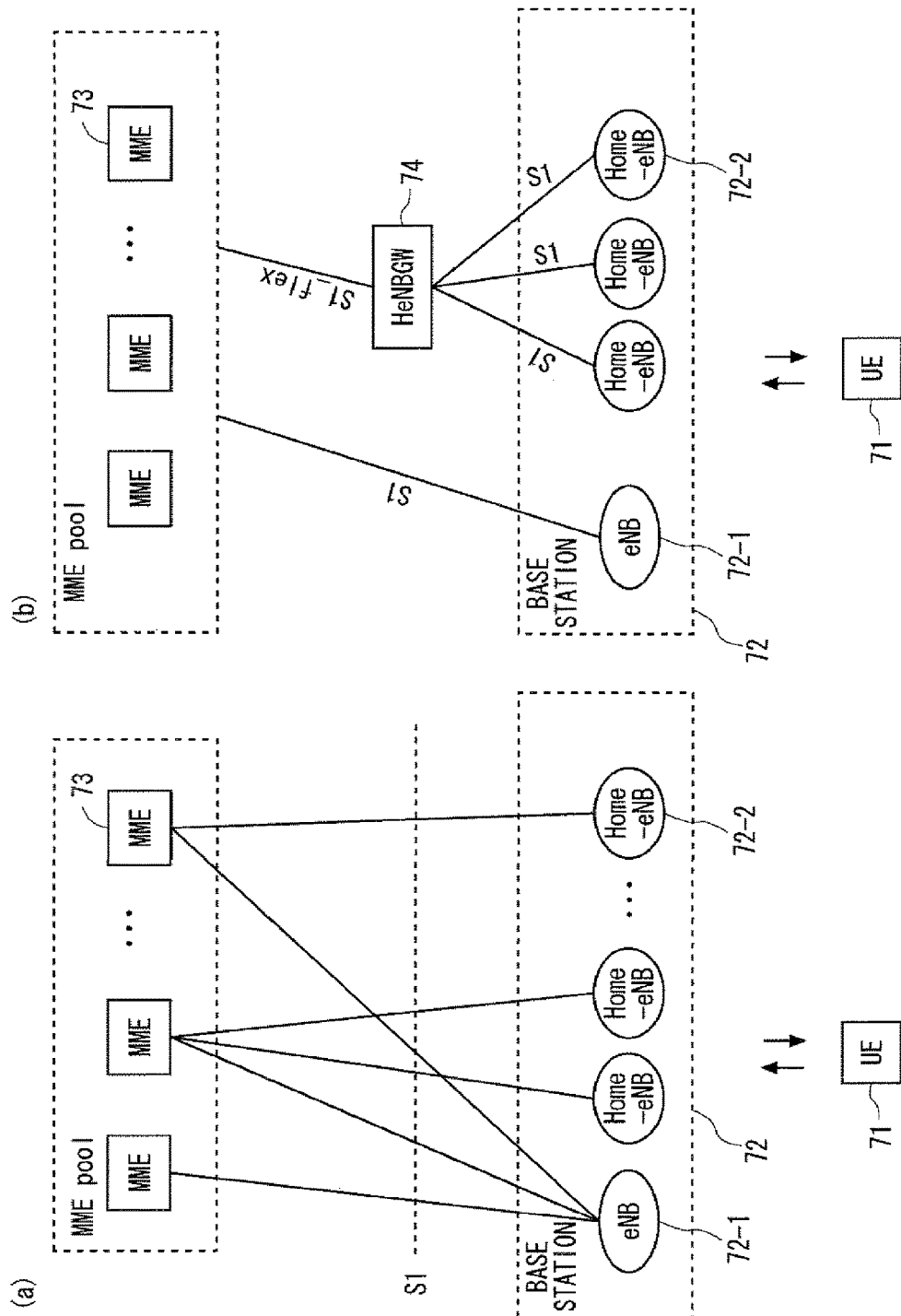
FIG. 7 is a block diagram showing the overall configuration of a mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB and HeNB) of e-UTRAN, Home-NB (HNB) of UTRAN) and non-CSG cells (eNodeB (eNB) of e-UTRAN, NodeB (NB) of UTRAN, and BSS of GERAN) and, as to e-UTRAN, is proposing the configurations of parts (a) and (b) of FIG. 7 (Non-Patent Document 1 and Non-Patent Document 3). Part (a) of FIG. 7 is now described. A user equipment (UE) 71 performs transmission/reception to/from a base station 72. The base station 72 is classified into an eNB (non-CSG cell) 72-1 and Home-eNBs (CSG cells) 72-2. The eNB 72-1 is connected to MMEs 73 through S1 interfaces, and control information is communicated between the eNB and the MMES. A plurality of MMEs are connected to one eNB. The Home-eNB 72-2 is connected to the MME 73 through the S1 interface, and control information is communicated between the Home-eNB and the MME. A plurality of Home-eNBs are connected to one MME.

Next, part (b) of FIG. 7 is described. The UE 71 performs transmission/reception to/from the base station 72. The base station 72 is classified into the eNB (non-CSG cell) 72-1 and the Home-eNBs (CSG cells) 72-2. As in part (a) of FIG. 7, the eNB 72-1 is connected to the MMEs 73 through the S1 interface, and control information is communicated between the eNB and the MMES. A plurality of MMES are connected to one eNB. While, the Home-eNBs 72-2 are connected to the MMEs 73 through a Home-eNB Gateway (HeNBGW) 74. The Home-eNBs are connected to the HeNBGW through the S1 interfaces, and the HeNBGW 74 is connected to the MMEs 73 through a S1 flex interface. One or a plurality of Home-eNBs 72-2 are connected to one HeNBGW 74, and information is communicated therebetween through the S1 interface. The HeNBGW 74 is connected to one or a plurality of MMEs 73, and information is communicated therebetween through the S1 flex interface.

With the configuration of part (b) of FIG. 7, one HeNBGW 74 is connected to the Home-eNBs belonging to the same CSG-ID. As a result, in the case where the same information such as registration information is transmitted from the MME 73 to a plurality of Home-eNBs 72-2 belonging to the same CSG-ID, the information is transmitted to the HeNBGW 74 and then transmitted to the plurality of Home-eNBs 72-2, with the result that signaling efficiency is enhanced more compared with the case where the information is directly transmitted to each of the plurality of Home-eNBs 72-2. While, in the case where each Home-eNB 72-2 communicates dedicated information with the MME 73, the information is merely caused to pass through the HeNBGW 74 (to be transparent) without being processed, which allows communication in such a manner that the Home-eNB 72-2 is directly connected to the MME 73.

Figure 8:
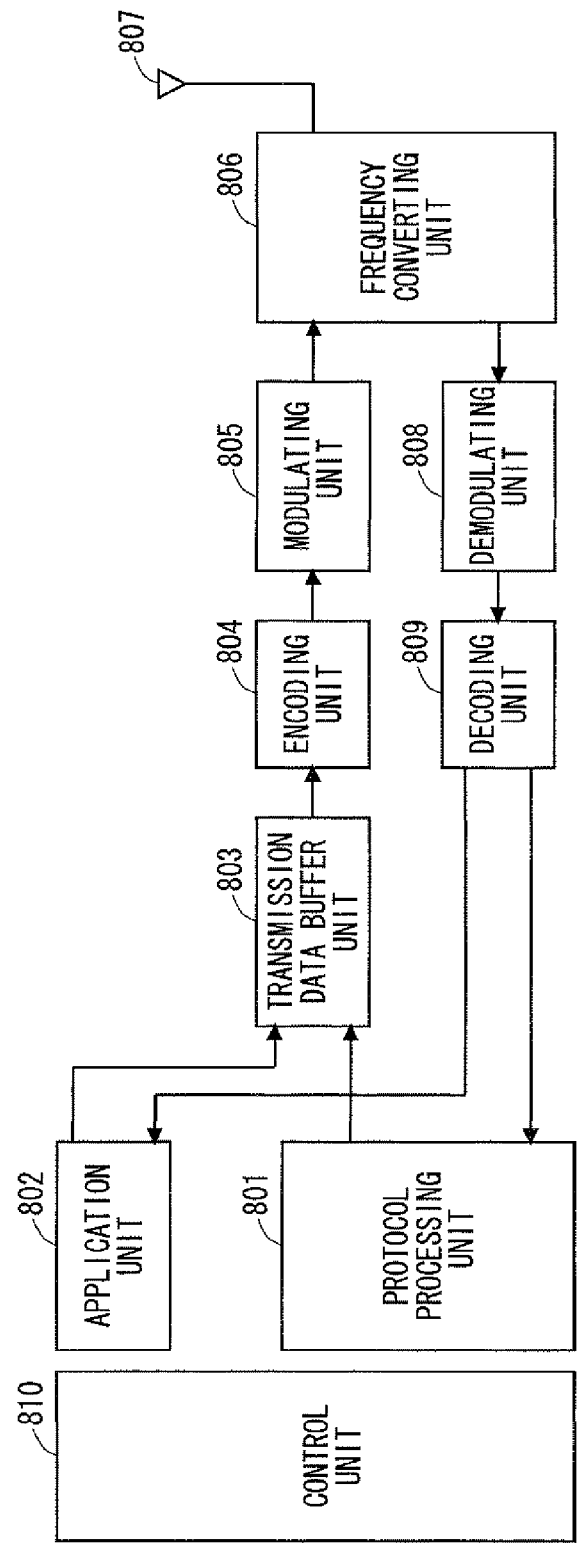
FIG. 8 is a block diagram showing the configuration of a user equipment 71 according to the present invention.

FIG. 8 is a block diagram showing the configuration of the UE (equipment 71 of FIG. 7) according to the present invention. The transmission process of the UE shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 72. A UE 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the UE is controlled by a control unit 810. This means that, though not shown, the control unit 810 is connected to the respective units (801 to 809).

Figure 9:
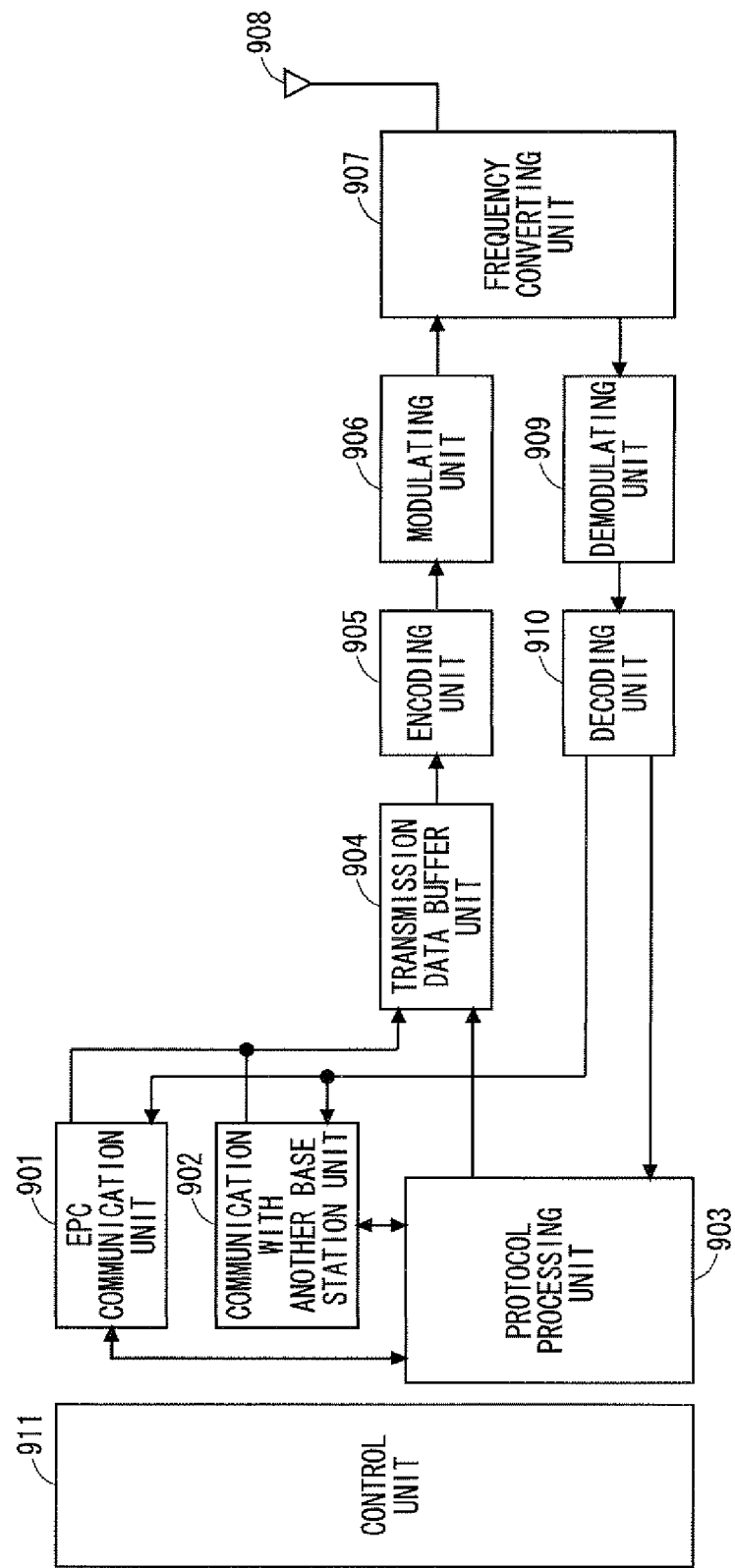
FIG. 9 is a block diagram showing the configuration of a base station 72 according to the present invention.

FIG. 9 is a block diagram showing the configuration of the base station (base station 72 of FIG. 7) according to the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of UEs 71. While, the reception process of the base station 72 is executed as follows. A radio signal from one or a plurality of UEs 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

Figure 10:
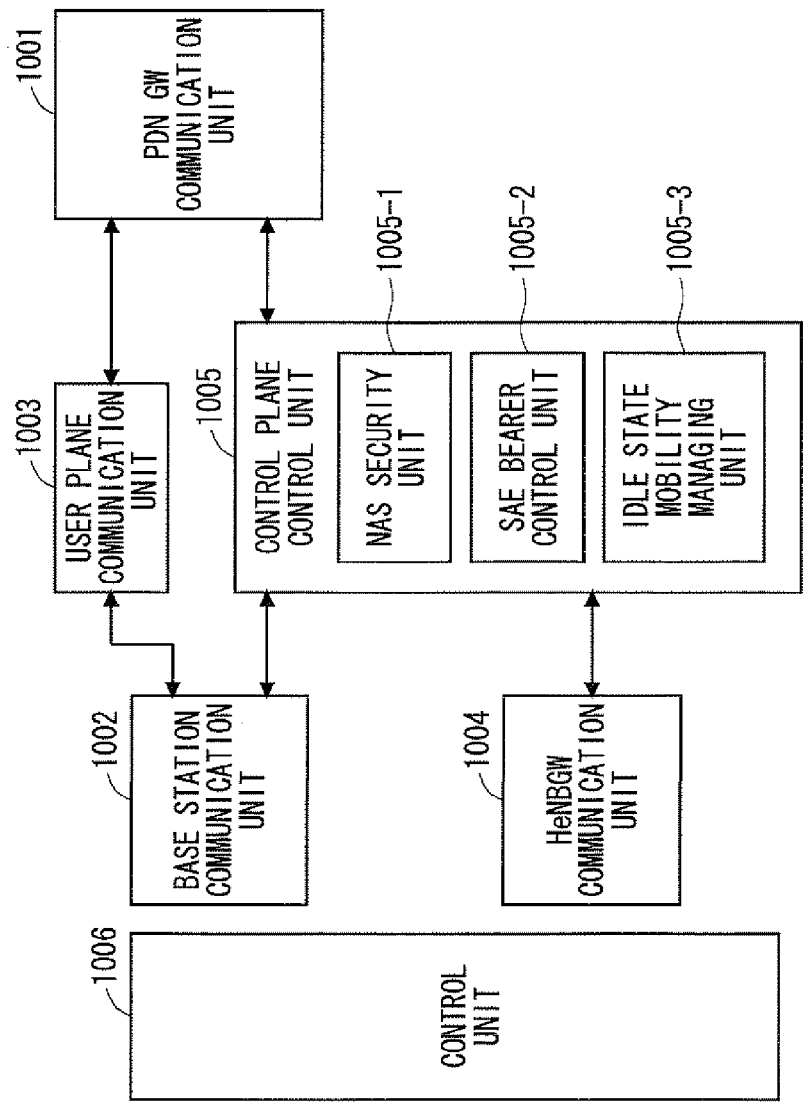
FIG. 10 is a block diagram showing the configuration of an MME according to the present invention.

FIG. 10 is a block diagram showing the configuration of a mobility management entity (MME) according to the present invention. A PDN GW communication unit 1001 performs data transmission/reception between an MME 73 and a PDN GW. A base station communication unit 1002 performs data transmission/reception between the MME 73 and the base station 72 through the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by the S1 interface through the base station communication unit 1002, or are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3 and so on, and performs overall process for the control plane. The NAS security unit 1005-1 provides, for example, security of a non-access stratum (NAS) message. For example, the SAE bearer control unit 1005-2 manages a system architecture evolution (SAE) bearer. For example, the idle state mobility managing unit 1005-3 performs mobility management of an idle state (LTE-IDLE state, which is merely referred to as idle as well), generation and control of paging signaling in an idle state, addition, deletion, update and search of one or a plurality of UEs 71 being served thereby, and tracking area (TA) list management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a UE corresponding to the CSG-ID and the CSG cell is managed (added, deleted, updated or searched). For example, it may be the relationship between one or a plurality of UEs whose user access registration has been performed with a CSG-ID and the CSG cells belonging to this CSG-ID. In the whitelist management, the relationship between the UE and the CSG-ID is managed (added, deleted, updated or searched). For example, one or a plurality of CSG-IDs with which user registration has been performed by a UE may be stored in the whitelist. Although other part of the MME 73 may perform those types of CSG-related management, through execution by the idle state mobility managing unit 1005-3, the method of using a tracking area code in place of a CSG-ID, which is currently under discussion of 3GPP meeting, can be efficiently performed. A series of process by an MME 73 is controlled by a control unit 1006. This means that, though not shown, the control unit 1006 is connected to the respective units (1001 to 1005).

Figure 11:
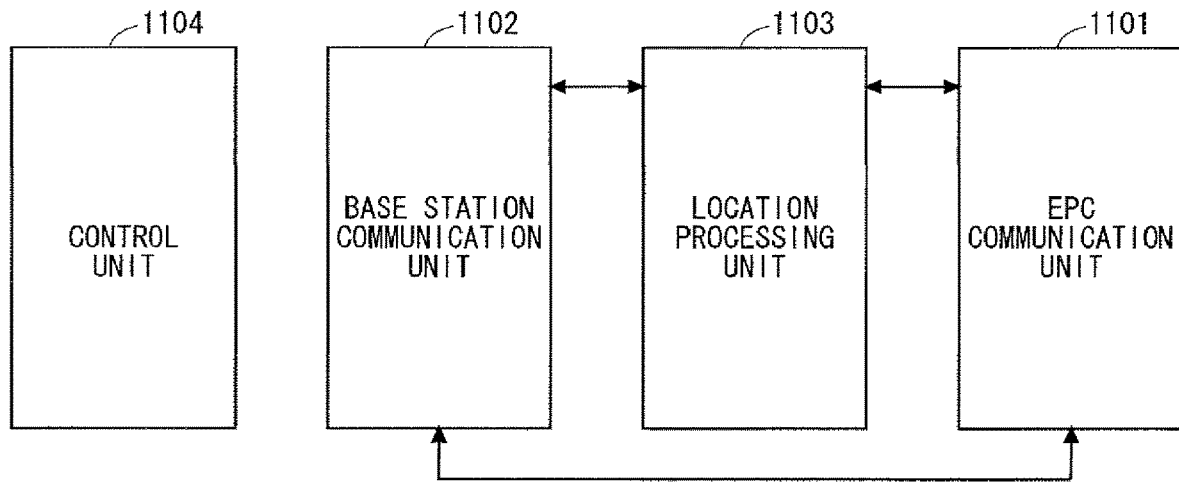
FIG. 11 is a block diagram showing the configuration of a HeNBGW according to the present invention.

FIG. 11 is a block diagram showing the configuration of the HeNBGW according to the present invention. An EPC communication unit 1101 performs data transmission/reception between the HeNBGW 74 and the MME 73 by the S1 flex interface. A base station communication unit 1102 performs data transmission/reception between the HeNBGW 74 and the Home-eNB 72-2 by the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown, the control unit 1104 is connected to the respective units (1101 to 1103).

Figure 12:
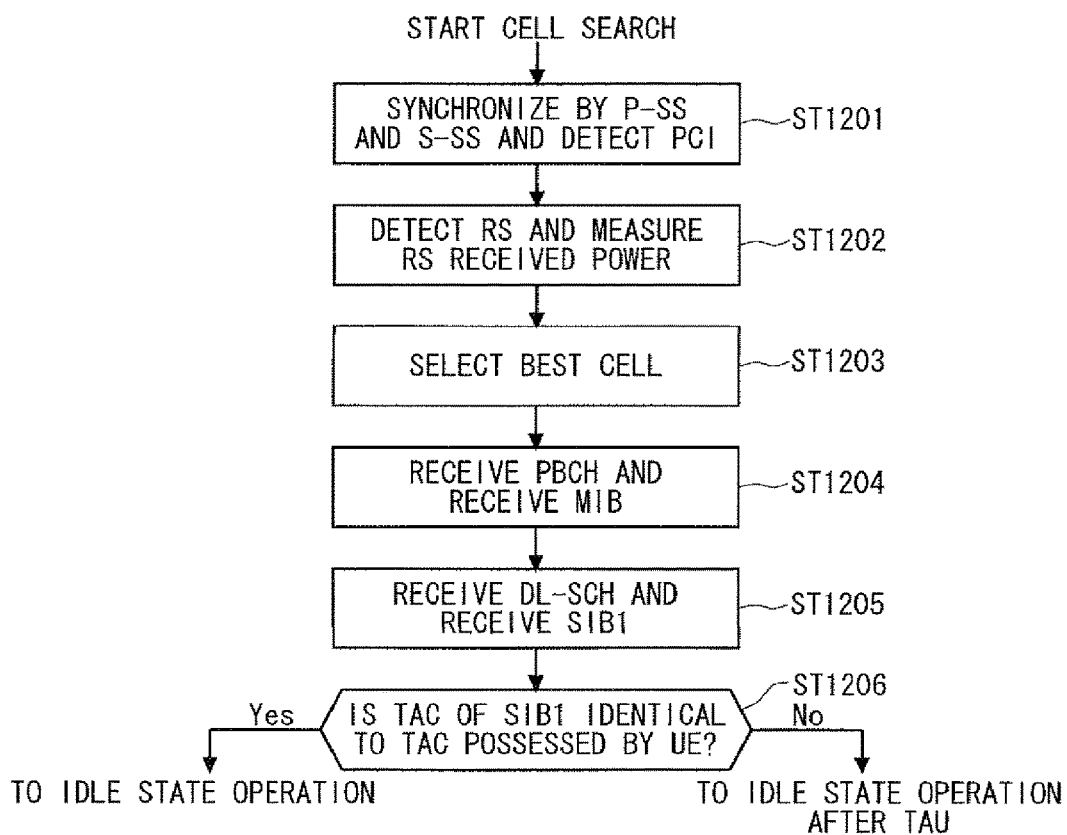
FIG. 12 is a flowchart showing an outline of cell search performed by a user equipment (UE) in the LTE communication system.

Next, an example of a typical cell search method in a mobile communication system is described. FIG. 12 is a flowchart showing an outline from cell search to idle state operation performed by a user equipment (UE) in the LTE communication system. When the cell search is started by the UE, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (identified). Next, in Step ST1202, a reference signal RS of the synchronized cells, which is transmitted from the base station per cell, is detected and the received power is measured. The code corresponding to the PCI one by one is used for the reference signal RS, and separation from other cell is enabled by correlation using the code. The code for RS of the cell is derived from the PCI identified in Step ST1201, which makes it possible to detect the RS and measure the RS received power. Next, in Step ST1203, the cell having the best RS reception quality (for example, cell having the highest RS received power; best cell) is selected from one or more cells that have been detected up to Step ST1202. In Step ST1204, next, the PBCH of the best cell is received, and the BCCH that is the broadcast information is obtained. A master information block (MIB) containing the cell configuration information is mapped on the BCCH on the PBCH. Examples of MIB information include the down link (DL) system bandwidth, transmission antenna number and system frame number (SFN).

In Step ST1205, next, the DL-SCH of the cell is received based on the cell configuration information of the MIB, to thereby obtain a system information block (SIB) 1 of the broadcast information BCCH. The SIB1 contains the information regarding access to the cell, information regarding cell selection and scheduling information of other SIB (SIBk; k is an integer equal to or larger than 2). In addition, the SIB1 contains a tracking area code (TAC). In Step ST1206, next, the UE compares the TAC received in Step ST1205 with the TAC that has been already possessed by the UE. In a case where they are identical to each other as a result of comparison, the UE enters an idle state operation in the cell. In a case where they are different from each other as a result of comparison, the UE requires a core network (EPC) (including MME and the like) to change a TA through the cell for performing tracking area update (TAU). The core network updates the TA based on an identification number (such as a UE-ID) of the UE transmitted from the UE together with a TAU request signal. The core network updates the TA, and then transmits the TAU received signal to the UE. The UE rewrites (updates) the TAC (or TAC list) of the UE. After that, the UE enters the idle state operation in the cell.

In the LTE and universal mobile telecommunication system (UMTS), the introduction of a closed subscriber group (CSG) cell is studied. As described above, access is permitted for only one or a plurality of UEs registered with the CSG cell. One or a plurality of UEs registered with the CSG cell constitute one CSG. A specific identification number referred to as CSG-ID is added to the thus constituted CSG. Note that one CSG may contain a plurality of CSG cells. After being registered with any one of the CSG cells, the UE can access the other CSG cells of the CSG to which the registered CSG cell belongs. Alternatively, the Home-eNB in the LTE or the Home-NB in the UMTS is used as the CSG cell in some cases. The UE registered with the CSG cell has a whitelist. Specifically, the whitelist is stored in the SIM/USIM. The CSG information of the CSG cell with which the UE has been registered is listed in the whitelist. Specific examples of CSG information include CSG-ID, tracking area identity (TAI) and TAC. Any one of the CSG-ID and TAC is adequate as long as they are associated with each other. Alternatively, GCI is adequate as long as global cell identity (GCI) is associated with the CSG-ID or TAC. As can be seen from the above, the UE which does not have a whitelist (including a case where the whitelist is empty in the present invention) is not allowed to access the CSG cell but is allowed to access only the non-CSG cell. On the other hand, the UE which has a whitelist is allowed to access the CSG cell of the CSG-ID with which registration has been performed as well as the non-CSG cell.

3GPP discusses that all physical cell identities (PCIs) are split (referred to as PCI-split) into ones reserved for CSG cells and the others reserved for non-CSG cells (Non-Patent Document 5). Further, 3GPP discusses that the PCI split information is broadcast in the system information from the base station to the UEs being served thereby. Disclosed here is the basic operation of a UE using PCI split. The UE that does not have the PCI split information needs to perform cell search using all PCIs (for example, using all 504 codes). On the other hand, the UE that has the PCI split information is capable of performing cell search using the PCI split information.

In a case where the CSG cell is introduced, it is conceivable that for example, the HNB/HeNB is operated as the CSG cell in a closed access mode and the CSG cell is installed within the coverage of the macro cell. In such a case, interference occurs between the macro cell and the CSG cell within the CSG coverage, leading to a problem that the UE that has not performed user registration with the CSG cell cannot communicate with the macro cell due to the interference from the CSG cell. Similarly, a problem that communication cannot be made arises also in the case where the UE performing communication with the CSG cell cannot perform handover to the macro cell (eNB). Typically, in a case where the interference power from the other cell increases within the coverage of a certain cell, the UE is configured to perform handover (HO) or cell reselection to the other cell or other suitable cell for preventing communication from being disconnected. However, in a case where the UE cannot perform handover or reselection to such a cell, there arises a problem that the interference power from the other cell increases and communication is disconnected.

Non-Patent Document 8 describes the method of operating the HNB/HeNB serving as the CSG cell with adaptive power. In this method, however, there still exists an area in which the interference between the CSG cell and the macro cell is large, and the UE that has moved to the above-mentioned area cannot perform communication, and thus the above-mentioned problem is not solved. In order to solve those problems, the present invention discloses that physical resources of signals that cannot be scheduled are configured so as not to overlap with each other between cells. In the first embodiment, for example, any or both of the times (timings) and frequencies of physical resources to which signals that cannot be scheduled are mapped are configured so as not to overlap with each other between cells.

In a mobile communication system, there are signals that can be scheduled by for example, changing the timing or frequency of physical resources to which signals are mapped, and signals that cannot be scheduled where for example, the timing or frequency of physical resources to which signals are mapped has been determined in advance as a system. In a case where coverages of a plurality of cells overlap with each other, the signal transmitted from the other cell is interference for the own cell. In this case, interference can be avoided for the signals that can be scheduled if the base station performs scheduling by, for example, mapping the signals to the physical resources in a dynamic or semi-static manner so as to avoid interference from the other cell. However, the physical resources to which the signals are mapped have been determined in advance for the signals that cannot be scheduled, and thus the base station cannot map the signals to the physical resources so as to avoid interference from the other cell, leading to a case where interference cannot be avoided.

For example, there is a signal mapped to a specific subframe within a radio frame in a specific frequency domain. Cells are asynchronous with each other, and thus in a case where there are a plurality of cells, the signal is mapped to the physical resources of a specific frequency domain and a specific subframe, leading to a case where the transmission timings of the signals of a plurality of cells may overlap with each other. As a result, the signal of the other cell is interference for the signal of own cell. There arises a problem that the UE cannot receive a signal from a desired cell due to the interference.

Therefore, in the present embodiment, an offset is provided in a time domain such that the physical resources to which the signals that cannot be scheduled are mapped do not overlap with each other between cells. As an example of the offset to be provided, an offset is set for n subframes in units of subframes. The case of LTE is described below as an example thereof. FIG. 15 shows the frame configuration and signals that cannot be scheduled in the LTE. 1501, 1502 and 1503 denote a primary synchronization signal (P-SS), a secondary synchronization signal (S-SS) and a physical broadcast channel (PBCH), respectively. The broadcast information is mapped to the PBCH. As described above, it is determined in all cells in the LTE that the downlink synchronization signals (P-SS and S-SS) are mapped to the first (#0) and sixth (#5) subframes of each radio frame and that the PBCH is mapped to the first (#0) subframe of each radio frame. Further, it is determined that the frequency domain where the synchronization signals and PBCH are mapped is the central 1.08 MHz of the cell frequency band in any cell. Therefore, those signals (P-SS, S-SS, PBCH) in the LTE are the signals that cannot be scheduled.

Figure 16:
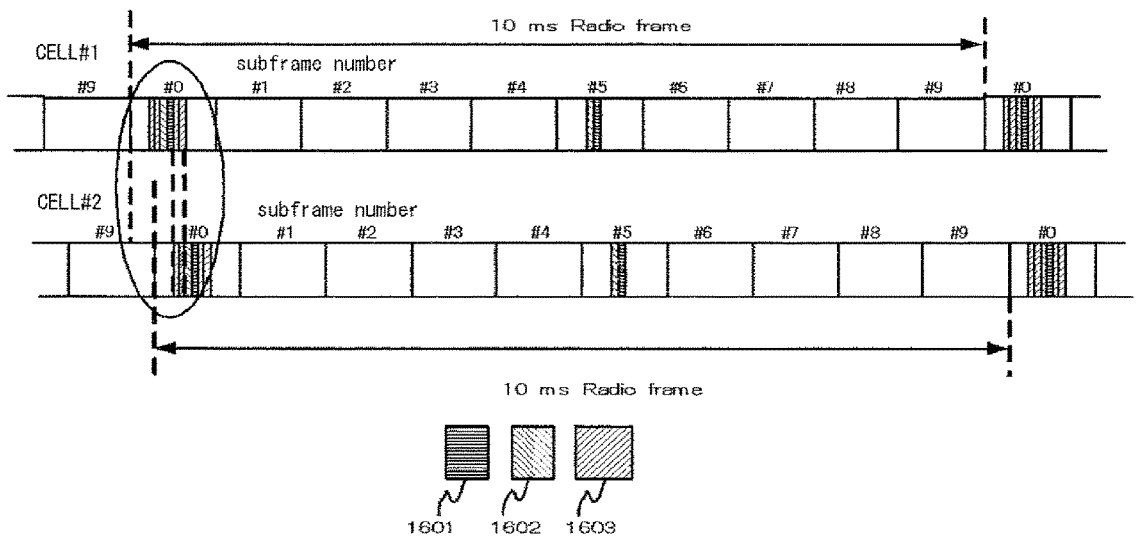
FIG. 16 is a diagram illustrating frame configurations of two cells (cell #1 and cell #2).

Next, the case where coverages of a plurality of cells overlap with each other is described. FIG. 16 shows the frame configurations of two cells (cell #1 and cell #2) as an example. In FIGS. 16, 1601, 1602 and 1603 denote a primary synchronization signal (P-SS), a secondary synchronization signal (S-SS) and a physical broadcast channel (PBCH), respectively. Two cells have the same frame configuration because of the same system. While, the transmission timing differs for each cell because of asynchronization between cells, and accordingly the transmission timing at which the radio frame starts (transmission timing at which the subframe #0 starts) differs for each cell. In a case where two transmission timings are off from each other as shown in the figure, the physical resources to which the PBCH 1603 is mapped are partially transmitted at the same time. The physical resources to which the PBCH 1603 is mapped cannot be scheduled because the frequency domain thereof has been determined in advance, and accordingly in a case where the coverages of those two cells overlap with each other, the physical resources transmitted at the same time are the interference for each other. In a case where the UE being served by the cell #1 moves to the area in which the coverages of the cell #1 and the cell #2 overlap with each other, the PBCH of the cell #1 received by the UE is interfered by the PBCH transmitted from the cell #2. The PBCH of the cell #1 cannot be received depending on the received power of the PBCH of the cell #1 and the interference power of the PBCH from the cell #2. The PBCH is a signal on which the information required for communicating with the cell, such as the system information, is mapped. Therefore, the UE that cannot receive this signal is incapable of communicating with the cell.

Figure 17:
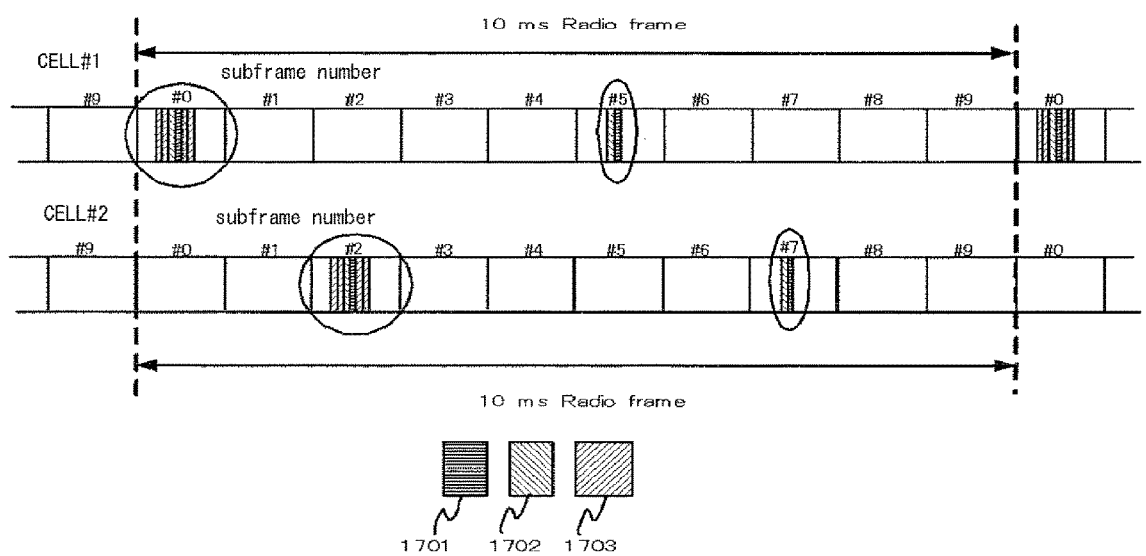
FIG. 17 is a diagram illustrating a case where n subframe offset is provided in physical resources to which signals that cannot be scheduled are mapped, which is disclosed in the present embodiment.

FIG. 17 shows an example in a case where n subframe offset is provided in the physical resources to which signals that cannot be scheduled are mapped, which is disclosed in the present embodiment. In this example, n is equal to 2. In FIGS. 17, 1701, 1702 and 1703 denote a primary synchronization signal (P-SS), a secondary synchronization signal (S-SS) and a physical broadcast channel (PBCH), respectively. Synchronization is achieved between the cells such that the transmission timings at which the radio frame starts are identical to each other between a cell #1 (first cell) and a cell #2 (second cell). Thanks to the synchronization achieved between the cells where interference is an issue, the frame timings of respective cells can coincide with each other, which allows the transmission timings of desired transmission signals for each cell to collaborate with each other. The method of achieving synchronization between the cells where interference is an issue is disclosed in a third embodiment. In the cell #1, as in a conventional case, the downlink synchronization signals (P-SS and S-SS) are mapped to a subframe #0 (first subframe) and a subframe #5 (second subframe) of each radio frame, and the PBCH is mapped to the subframe #0 (first subframe) of each radio frame. In the cell #2, differently from a conventional case, the downlink synchronization signals (P-SS and S-SS) are mapped to a subframe #2 (third subframe) and a subframe #7 (fourth subframe) of each radio frame, and the PBCH is mapped to the subframe #2 of each radio frame. In other words, an offset is provided between cells, and the cell #2 transmits, to the cell #1, the synchronization signals and PBCH in the subframe to which the offset is added. As described above, an offset is provided to the time domain of the physical resources to which signals that cannot be scheduled are mapped between the two cells where interference is an issue, to thereby prevent the transmission timings of the signals from two cells from overlapping with each other, which enables to prevent the signals from interfering with each other. Therefore, even if it is not possible to perform handover or cell reselection between two cells, a UE is capable of receiving those signals that cannot be scheduled.

While the offset is provided to the physical resources to which signals that cannot be scheduled are mapped in subframe units in the example above, it may be provided in time units, symbol units or slot units. In the cases of time units, symbol units and slot units, it is possible to provide an offset amount in respective units, which leads to an effect that the adjustment for preventing the transmission timings from overlapping with each other is made more finely in accordance with the units. However, in the cases of time units, symbol units and slot units, the configuration of the subframe differs for each cell. In the case where the offset is provided in subframe units that is disclosed in the example above, the configuration of the physical resources to which the signals that cannot be scheduled are mapped in the subframe does not need to be changed for each cell, which makes the control in the system simpler. In addition, there can be achieved effects that a control circuit in a base station or a UE is prevented from becoming intricate and power consumption is reduced.

The offset value may be determined in advance or may be changed in a semi-static manner. Alternatively, several types of offset values may be determined in advance and one cell (for example, cell #2 in the example of FIG. 17) may select therefrom. For example, in a case where the CSG cell is installed within the coverage of a macro cell (eNB), the macro cell may have a conventional frame configuration and an offset may be provided to the CSG cell. This enables the macro cell to have a conventional frame configuration, and an offset is only required to be provided to the CSG cell concerned, leading to an effect that the cells that need an offset can be reduced. Alternatively, the offset may be set in the cell to be installed later. For example, in a case where the CSG cell is installed within the coverage of a macro cell (eNB), the offset is provided in the frame configuration of a CSG cell. This enables to use a conventional frame configuration as the frame configuration of the cell installed first (macro cell in this case), which reduces the number of offsets. Accordingly, there can be achieved an effect that in a UE and a base station, the synchronization signals and PBCH can be received without making a receiver circuit for those signals intricate and increasing power consumption.

The signals that can be scheduled are mapped to the physical resources in the cell #2 at the transmission timing of the physical resources to which synchronization signals or PBCH of the cell #1 is mapped. Therefore, in order to avoid interference to the synchronization signal or PBCH of the cell #1, it suffices that at the transmission timing of the cell #1, scheduling may be performed appropriately by for example, avoiding scheduling of a control signal and/or data in the cell #2. This enables to eliminate or reduce the interference to the synchronization signal or PBCH of the cell #1, and accordingly communication with the cell #1 is secured. The same holds true for the transmission timing of physical resources to which the synchronization signals or PBCH of the cell #2 is mapped.

For example, it is assumed that the CSG cell is installed within the coverage of the macro cell. In a case where the UE that communicates with the macro cell and has not performed user registration with the CSG cell moves into the coverage of the CSG cell, the UE cannot perform handover to the CSG cell. Accordingly, in order to allow communication of the UE, it is required to enable the reception of signals that cannot be scheduled from the macro cell. Therefore, the above-mentioned method is applied for eliminating the interference from the CSG cell. At the transmission timing of signals that cannot be scheduled of the macro cell, scheduling of a control signal and/or data is avoided in the CSG cell. This allows the UE to receive the signals that cannot be scheduled of the macro cell, which enables the communication with the macro cell. On the other hand, also at the transmission timing of the physical resources to which the synchronization signals or PBCH of the CSG cell is mapped, the signals that can be scheduled are mapped to the physical resources in the macro cell. If handover from the CSG cell to the macro cell is allowed, scheduling of a control signal and/or data does not need to be avoided at the transmission timing of the macro cell. However, a control signal and/or data of a UE, whose communication quality (CQI) is poor, may be prevented from being mapped at the transmission timing of the macro cell. This is because it is conceivable that the CQI may be poor due to the interference of the synchronization signals or PBCH transmitted from the CSG cell. Therefore, the UE whose CQI is poor may be present within or in the vicinity of the coverage of the CSG cell. Further, the macro cell transmits the PDSCH with high transmission power to the UE whose CQI is poor. Unfortunately, this increases the interference to the synchronization signal or PBCH of the CSG cell. In order to prevent this, a control signal and/or data of a UE whose communication quality is poor may be prevented from being mapped at the transmission timing of the macro cell.

Figure 18:
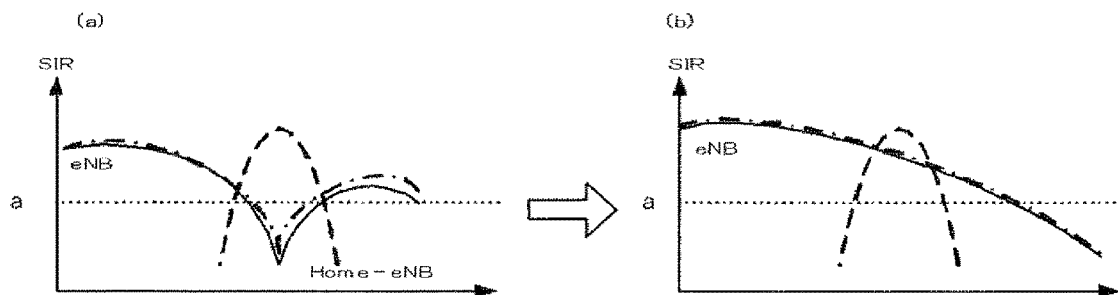
FIG. 18 is a conceptual diagram of received signal-to-interference ratio (SIR) at a UE in the situation in which a HeNB operating as a CSG cell is installed within the coverage of a macro cell.

The configuration disclosed in the present embodiment reduces interference of signals that cannot be scheduled between cells, which allows the UE to receive the signals. This enables to achieve the effect that communication of the UE with those cells is not disconnected in a case where handover and cell reselection to those cells are not allowed. For example, FIG. 18 is a conceptual diagram of the received signal-to-interference ratio (SIR) at the UE in a situation in which a HeNB that operates as a CSG cell is installed within the coverage of the macro cell. Part (a) of FIG. 18 shows the SIR in a conventional case. Part (a) of FIG. 18 is identical to part (c) of FIG. 13, and thus its description is omitted. While, as shown in part (b) of FIG. 18, in the configuration disclosed in the present embodiment reduces interference from the CSG cell to the signals of the eNB that cannot be scheduled also in the vicinity of the HeNB, and accordingly the SIR of the UE becomes larger than the threshold a as indicated by a chain line. This allows the UE to receive the signals that cannot be scheduled, which enables to perform communication with the eNB continuously without disconnection. The configuration disclosed in the present embodiment is applied in a case where the cells to which handover cannot be performed are arranged by being overlapped with each other or a case where the CSG cell is arranged in the macro cell in, for example, the LTE as described above, with the result that the interference of signals that cannot be scheduled between cells is reduced, and the UE is allowed to receive the signals. This enables to perform communication with the macro cell continuously without disconnection.

First Modification

The first embodiment discloses that an offset for n subframes is provided such that the physical resources to which the signals that cannot be scheduled are mapped do not overlap with each other. This modification discloses that the physical resources of signals that cannot be scheduled are prevented from being overlapped with each other between cells.

It has been described that in the mobile communication system, there are signals that can be scheduled by for example, changing the timing or frequency of physical resources to which signals are mapped and the signals that cannot be scheduled where the timing or frequency of the physical resources to which signals are mapped is determined in advance as a system. The signals that cannot be scheduled include signals mapped to specific symbols of each subframe in a specific frequency domain. For example, those are L1/L2 control signals such as PDCCH, PHICH and PCFICH in the LTE. Those signals are determined to be mapped to the physical resources over the entire band of the cell frequency band (system band) within the leading first symbol to third symbol of each subframe. In a case of such signals, the method of providing an offset of n subframes, which is disclosed in the first embodiment, is not applicable. This is because, even if n subframe offset is provided for transmission, the L1/L2 control signals mapped to the subframe are transmitted at the same time, and accordingly interference occurs therebetween. In order to solve the above-mentioned problem, an offset is provided such that physical resources of signals that cannot be scheduled do not overlap with each other within one subframe in the present modification. As an example of the offset to be provided, an offset of m symbols is provided in units of symbols.

Figure 19:
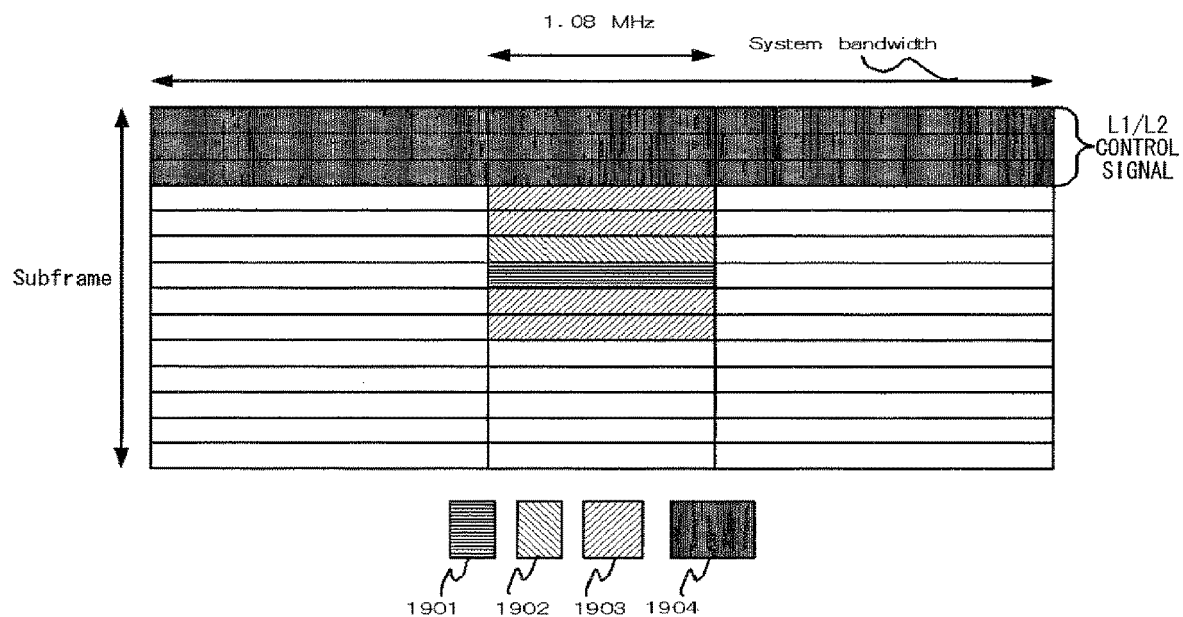
FIG. 19 is a diagram illustrating physical resources to which L1/L2 control signals are mapped that are determined by 3GPP.
Figure 20:
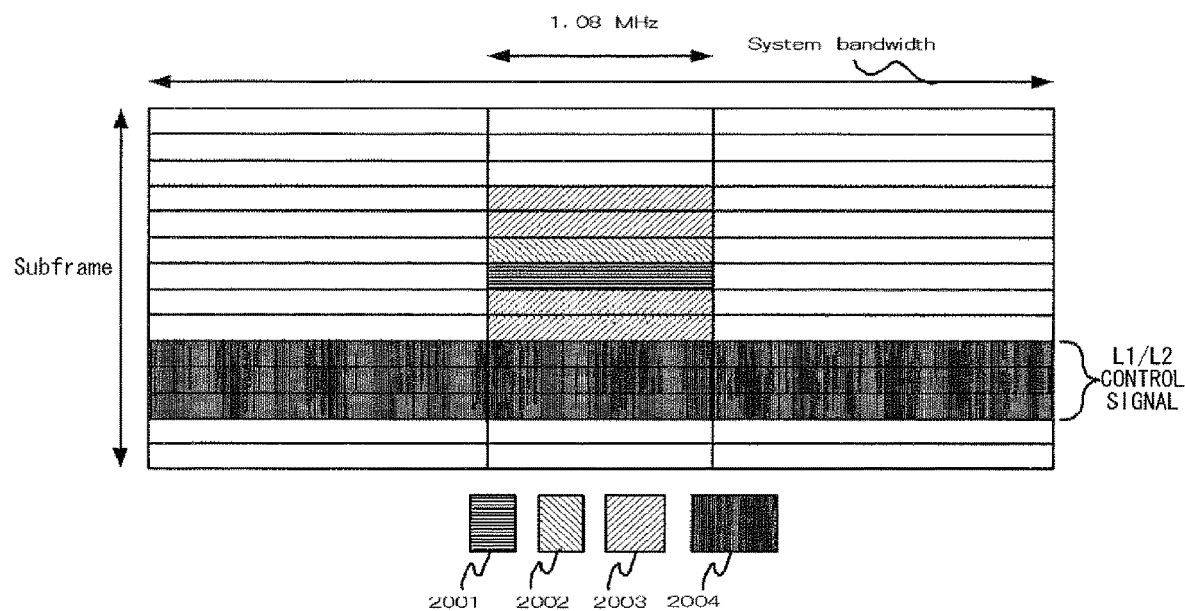
FIG. 20 is a diagram illustrating a case where mapping is performed to a tenth symbol to a twelfth symbol of each subframe.

FIG. 19 shows physical resources to which the L1/L2 control signals are mapped that are determined by 3GPP. The L1/L2 control signals (PDCCH, PHTCH, PCFTCH) are mapped to the physical resources over the entire bandwidth of the cell within three symbols from the start of each subframe. In the figure, 1901, 1902 and 1903 denote the primary synchronization signal (P-SS), secondary synchronization signal (S-SS) and PBCH, respectively. 1904 denotes the L1/L2 control signal. In the present modification, the physical resources of signals that cannot be scheduled are prevented from being overlapped with each other between cells within one subframe. For example, the L1/L2 control signals are mapped to the symbols of each subframe other than the leading three symbols in the LTE. FIG. 20 shows, as an example, the case where mapping is performed to the tenth symbol to the twelfth symbol of each subframe. 2001, 2002 and 2003 denote the primary synchronization signal (P-SS), secondary synchronization signal (S-SS) and PBCH, respectively. 2004 denotes the L1/L2 control signal. As to the frequency, mapping is performed to the entire cell bandwidth. While it suffices that symbols to be mapped are symbols of each subframe other than the leading three symbols, an offset may be provided to the m symbols so as to be off from the leading symbol by the offset amount. In the example of the figure, m is equal to nine. As a result of the offset being provided, the method of mapping the L1/L2 control signals to the physical resources in three symbols is identical to the conventional method, which merely requires shifting by an offset amount, leading to an effect that the control method is simplified. In addition, only an offset value can be taken as a parameter, and thus the control method is simplified, and it is possible to improve signaling efficiency as a system because an information amount can be reduced also in a case where the offset value is signaled among the network, base station and UEs. Further, this achieves the effect that also in the UE, the L1/L2 control signals can be received without making the receiver circuit for those signals considerably intricate or increasing power consumption compared with a conventional case.

The first embodiment describes that in some cases, there are signals that cannot be scheduled to be mapped to specific symbols of a specific subframe within a radio frame. Therefore, mapping is performed to symbols other than the specific symbols for preventing those signals from being transmitted together with the L1/L2 control signals. This enables to avoid the interference between the signals that cannot be scheduled to be mapped over the entire band of the cell bandwidth (system bandwidth) and the signals that cannot be scheduled to be mapped to a partial frequency band of the cell bandwidth. For example, in the LTE, the synchronization signals and PBCH are mapped to the central 1.08 MHz of the band of the fourth symbol to the ninth symbol as shown in FIG. 19 and FIG. 20. Therefore, in order to avoid the transmission of those signals together with the L1/L2 control signals, mapping may be performed to symbols other than the fourth to ninth symbols.

Figure 21:
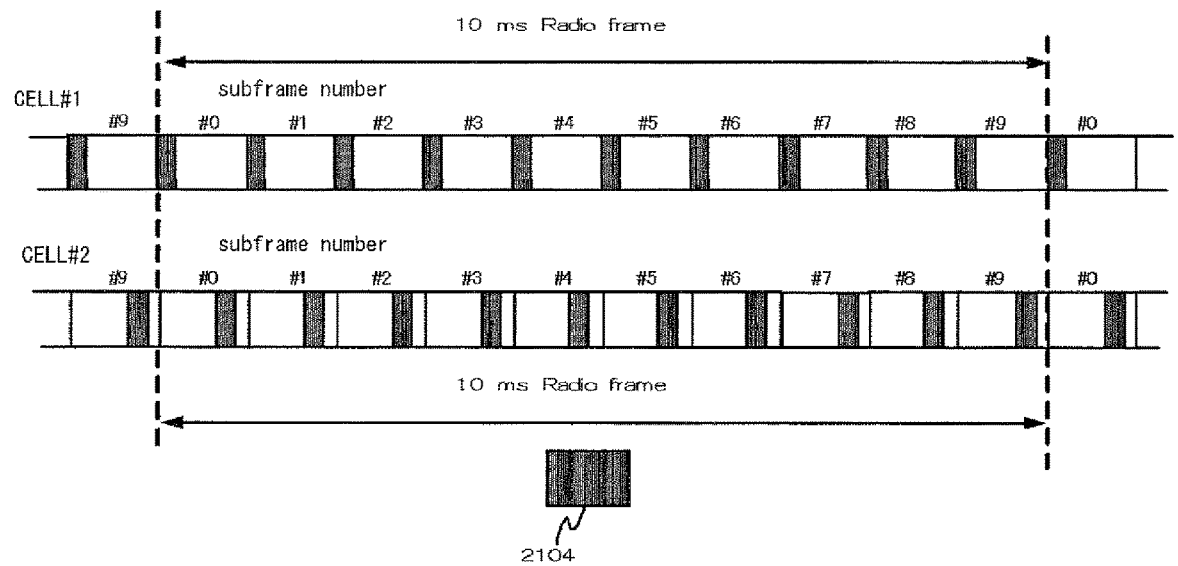
FIG. 21 is a diagram illustrating a frame configuration example in two cells in a case where an offset of m symbols is provided, which is shown in the present modification.

FIG. 21 shows an example of a frame configuration in two cells in a case where an offset of m symbols is provided, which is shown in the present modification. In order to prevent the physical resources to which signals that cannot be scheduled are mapped from overlapping with each other between cells, the physical resources are the leading first symbol to the third symbol over an entire band of each subframe shown in FIG. 19 in the cell #1 and are the tenth to twelfth symbols over an entire band of each subframe shown in FIG. 20 in the cell #2. That is, the cell #2 provides an offset of m symbols to the cell #1 and maps those signals to the physical resources providing that m is equal to nine, and then transmits. Synchronization is achieved between cells such that the transmission timings at which the radio frame starts in the cell #1 and the cell #2 are identical to each other. As described above, an offset of m symbols is provided to the transmission timing of the physical resources to which signals that cannot be scheduled are mapped in the two cells where interference is an issue such that the transmission timings of the signals from two cells do not overlap with each other, which prevents those signals from interfering with each other. Therefore, even if it is not possible to perform handover or cell reselection between two cells, the UE is capable of receiving the signals that cannot be scheduled.

While the offset provided to the physical resources to which signals that cannot be scheduled are mapped is provided in symbol units in the above-mentioned example, it may be provided in time units or slots units as well. In the case of time units, it is possible to provide an offset amount in each unit, there is achieved an effect that adjustment for preventing transmission timings from overlapping with each other is made finer. In the case of slot units, though adjustment is not performed finely, control in the system is made easier because the slot configuration is not required to be changed for each cell. This achieves effects that the control circuit is prevented from becoming intricate in the base station or the UE and that power consumption is reduced. However, in the case of slot units, the offset value that can be set is made small. When an offset is provided in symbol units, there can be achieved effects that adjustment is made finely, control is performed easily and a large number of offset values are set at the same time.

The offset value may be determined in advance or changed in a semi-static manner. Alternatively, several types of offset values may be determined in advance so that one cell (for example, cell #2 in the example of FIG. 21) selects one therefrom. For example, in a case where the CSG cell is installed within the coverage of the macro cell (eNB), the macro cell may have a conventional frame configuration and an offset may be provided to the CSG cell. As a result, the frame of the macro cell is configured as conventionally, and an offset is merely required to be provided to the CSG cell concerned, whereby there is achieved an effect that fewer number of cells requires an offset. Alternatively, the offset may be set in the cell to be installed later. For example, in a case where the CSG cell is installed within the coverage of the macro cell (eNB), the offset is set in the frame configuration of the CSG cell. As a result, it is possible to use a conventional frame configuration as the frame configuration of the cell installed first (macro cell in this case), and the number of offsets can be made small. Accordingly, there is achieved an effect that the L1/L2 control signals can be received without making the receiver circuit for those signals considerably intricate or increasing power consumption in a UE and a base station.

At the transmission timing of physical resources to which the L1/L2 control signals of the cell #1 are mapped, signals that can be scheduled are mapped to the physical resources in the cell #2. Therefore, in order to avoid the interference to the L1/L2 control signals of the cell #1, it suffices that at the transmission timing of the cell #1, appropriate scheduling may be performed by for example, avoiding scheduling of the control signal and/or data of the cell #2. This enables to eliminate or reduce the interference to the L1/L2 control signals of the cell #1, and accordingly communication with the cell #1 is secured. The same holds true for the transmission timing of the physical resources to which the L1/L2 control signals of the cell #2 are mapped. For example, it is assumed that the CSG cell is installed in the coverage of the macro cell. In a case where the UE that communicates with the macro cell and has not performed user registration with the CSG cell moves into the coverage of the CSG cell, the UE cannot perform handover to the CSG cell. Accordingly, in order to allow the UE to perform communication, the signals that cannot be scheduled from the macro cell should be received. Therefore, the above-mentioned method is applied for eliminating the interference from the CSG cell. At the transmission timing of the signals that cannot be scheduled of the macro cell, scheduling of the control signals and/or data is avoided in the CSG cell. This allows the UE to receive the signals that cannot be scheduled of the macro cell, which enables communication with the macro cell.

While, also at the transmission timing of the physical resources to which the L1/L2 control signals of the CSG cell are mapped, the signals that can be scheduled are mapped to the physical resources in the macro cell. If the handover from the CSG cell to the macro cell is allowed, it is not required to avoid scheduling of the control signals and/or data at the transmission timing of the macro cell. However, the control signals and/or data of a UE whose communication quality (CQI) is poor may be prevented from being mapped at the transmission timing of the macro cell. This is because it is conceivable that poor CQI may result from the interference by the L1/L2 control signals transmitted from the CSG cell. Accordingly, a UE whose CQI is poor may be present within or in the vicinity of the coverage of the CSG cell. Further, the macro cell transmits the PDSCH with high transmission power to a UE whose CQI is poor. This results in an increase in the interference of the CSG cell to the L1/L2 control signals. In order to prevent this, the control signals and/or data of a UE whose CQI is poor may be prevented from being mapped at the transmission timing of the macro cell.

The configuration disclosed in the present modification reduces the interference of the signals that cannot be scheduled between cells, which allows the UE to receive the signals. In particular, when the present modification is applied in a case where mapping is performed to a specific subframe that is a specific frequency domain of each subframe as signals that cannot be scheduled, the interference of the signals that cannot be scheduled between cells is reduced, whereby the UE is capable of receiving the signals. As a result, there can be achieved an effect that the communication of the UE with those cells is not disconnected in a case where handover and cell reselection to those cells are not allowed. For example, the conceptual diagram of the received signal-to-interference ratio (SIR) at the UE in the situation in which the HeNB operating as the CSG cell is installed within the coverage of the macro cell is as shown in FIG. 18 as in the first embodiment described above. As shown in part (b) of FIG. 18, the interference from the CSG cell to the signals that cannot be scheduled of the eNB is reduced also in the vicinity of the HeNB, and the SIR of the UE becomes larger than the threshold a as indicated by a chain line. This allows the UE to receive the signals that cannot be scheduled and communicate with the eNB continuously without disconnection. When the configuration disclosed in the present embodiment is applied in a case where the cells to which handover cannot be performed are arranged in an overlapped manner or a case where the CSG cell is arranged in the macro cell in, for example, the LTE as described above, the interference of the signals that cannot be scheduled between cells is reduced, and the UE is capable of receiving the signals. Accordingly, the UE is capable of communicating with the macro cell continuously without disconnection.

Disclosed here is the method of preventing, in a case where there are a signal mapped to a specific subframe within a radio frame in a specific frequency domain and a signal mapped to a specific symbol within each subframe in a specific frequency domain as the signals that cannot be scheduled, the physical resources of the signals that cannot be scheduled from overlapping with each other within one subframe between cells for preventing the signals from becoming the interference between the cells. In this case, it suffices that the method disclosed in the first embodiment and the method disclosed in the first modification are combined with each other. As to the signal mapped to a specific subframe within a radio frame in a specific frequency domain, n subframe offset is provided such that the physical resources to which the signal is mapped do not overlap with each other between cells, whereas as to the signal mapped to a specific symbol within each subframe in a specific frequency domain, the physical resources of the signals are prevented from overlapping with each other between cells in one subframe. Further, the physical resources of the signal are prevented from overlapping with the physical resources of the signal mapped to a specific subframe within the radio frame.

For example, in the LTE, signals within subframes are mapped as shown in FIG. 19 and FIG. 20. The synchronization signals (P-SS and S-SS) and the PBCH that are signals to be mapped to specific subframes within a radio frame in a specific frequency domain are mapped to the same symbol with any of the configurations. An offset is provided to the subframes to which mapping is performed for preventing those signals from becoming interference between cells. As to the L1/L2 control signals that are signals mapped to specific symbols within each subframe in the entire frequency domain of the cell, the physical resources of those signals are prevented from overlapping with each other in one subframe. Further, the physical resources are prevented from overlapping with the symbols within a specific subframe to which the synchronization signals and PBCH are mapped. FIG. 20 shows the case where, for example, an offset of nine symbols is provided.

Figure 22:
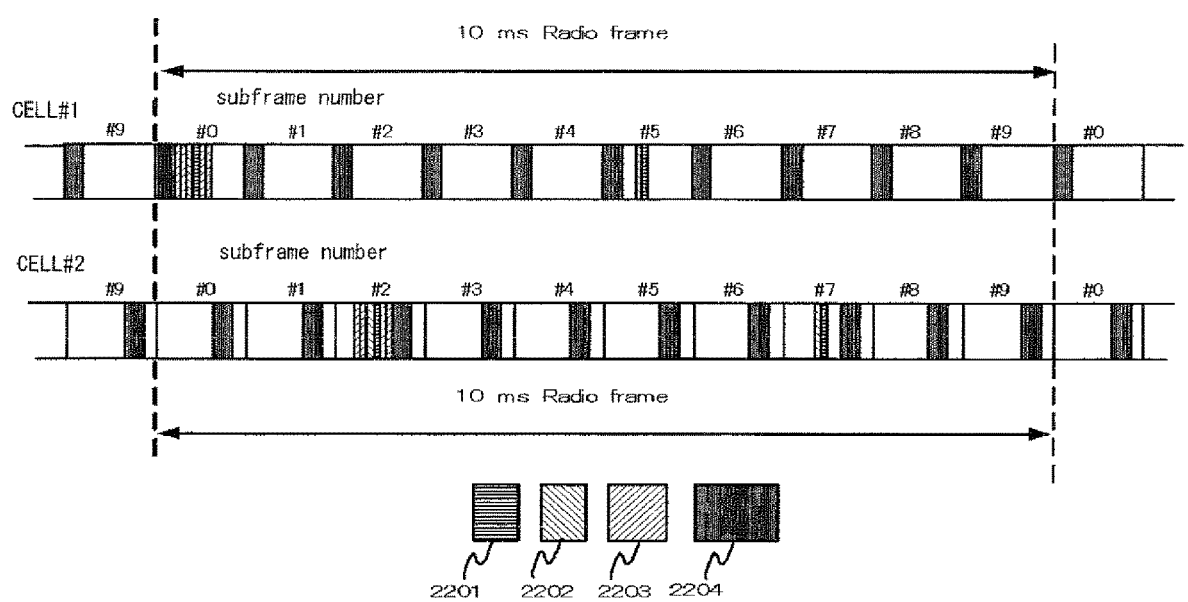
FIG. 22 is a diagram illustrating a frame configuration example described in the present modification.

FIG. 22 shows a frame configuration example. The physical resources to which signals that cannot be scheduled are mapped are prevented from overlapping with each other between cells. As shown in FIG. 19, in the cell #1, the L1/L2 control signals are mapped to the leading first symbol to the third symbol over the entire band of each subframe, and the synchronization signals (P-SS and S-SS) and PBCH are mapped to the fourth symbol to the ninth symbol. The synchronization signals (P-SS and S-SS) and PBCH are mapped to a subframe #0 not to each subframe, and the synchronization signals (P-SS and S-SS) are further mapped to a subframe #5. As shown in FIG. 20, in the cell #2, the L1/L2 control signals are mapped to the tenth to twelfth symbols over an entire band of each subframe, and the synchronization signals (P-SS and S-SS) and PBCH are mapped to the fourth symbol to the ninth symbol similarly to the cell #1. However, differently from the cell #1, the synchronization signals (P-SS and S-SS) and PBCH are mapped to the subframe #2 and the synchronization signals are further mapped to a subframe #7. In other words, the signal that is mapped to each subframe and cannot be scheduled is provided with an offset of m symbols within a subframe, and the signal that is mapped to a specific subframe and cannot be scheduled is provided with an offset of n subframes within a radio frame, which are respectively mapped to the physical resources and transmitted.

Synchronization is achieved between cells such that the transmission timings at which the radio frame starts are identical to each other between the cell #1 and the cell #2. This prevents the transmission timings of signals that cannot be scheduled from two cells from overlapping with each other, which prevents the signals from interfering with each other. Accordingly, even if it is not possible to perform handover or cell reselection between two cells, the UE is capable of receiving those signals that cannot be scheduled. As to the offset value, the methods disclosed in the first embodiment and the present modification may be used. Alternatively, at the transmission timing of a signal that cannot be scheduled in a cell, the methods disclosed in the first embodiment and the present modification may be used as the method of transmitting a signal from another cell.

The method disclosed above prevents, also in a case of the communication system in which there are the signal mapped to a specific subframe within a radio frame in a specific frequency domain and a signal mapped to a specific symbol within each subframe in a specific frequency domain as the signals that cannot be scheduled, those signals from becoming the interference between cells. Therefore, the UE is capable of receiving those signals, which enables communication with a macro cell continuously without disconnection. This method enables adaptability to more types of frame configurations.

Second Modification

The first embodiment and the first modification disclose that an offset of a predetermined number of symbols within n subframes or one subframe is provided such that the physical resources to which the signals that cannot be scheduled are mapped do not overlap with each other between cells. In other words, this means that there are cells having different frame configurations in a system. This makes the transmitter circuit or receiver circuit in a base station or a UE more intricate compared with the system having only one frame configuration, and the information amount signaled among a network, a base station and UEs is increased. For example, in a case of two frame configurations, it is required in a base station and a UE to configure a transmitter circuit or receiver circuit suitable for those two frame configurations. As a result, the circuit becomes intricate and power consumption increases as well. In addition, signaling is required among a network, a base station and UEs as to what frame configuration is used by each cell. This increases a signaling amount and reduces the signaling efficiency. In order to solve the above-mentioned problems, the present modification discloses that the physical resources of signals that cannot be scheduled are prevented from overlapping with each other between cells and that one frame configuration is provided as a system.

Figure 23:
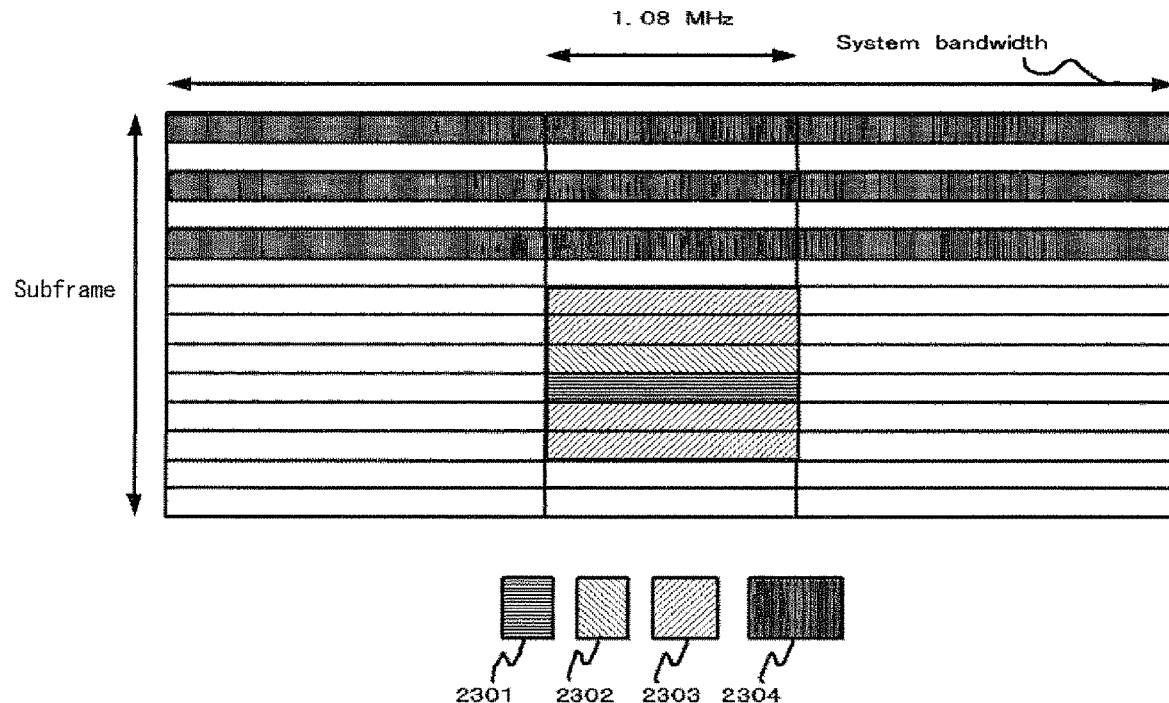
FIG. 23 is a diagram illustrating an example of mapping to symbols of a subframe in the present modification.

FIG. 23 shows an example of mapping to symbols of a subframe in the present modification. Signals that cannot be scheduled, which are mapped in each frame in a specific frequency domain, are mapped to the first, third and fifth symbols. Mapping is not required for all those three symbols but may be performed within those three symbols. The signals that cannot be scheduled, which are mapped to a specific subframe being a specific frequency domain, are mapped to the seventh to twelfth symbols. Further, as shown in FIG. 23, the synchronization signals and PBCH are mapped to the central 1.08 MHz of the band of the seventh symbol to the twelfth symbol in a specific subframe within a radio frame. For example, in the LTE, the L1/L2 control signals (PDCCH, PHICH, PCFICH) are mapped to the first, third and fifth of each subframe. In the figure, 2301, 2302 and 2303 denote the primary synchronization signal (P-SS), secondary synchronization signal (S-SS) and PBCH, respectively. 2304 denotes the PDCCH among the L1/L2 control signals. This enables to use only one frame configuration in all cells of a system and prevent the physical resources of the signals that cannot be scheduled from overlapping with each other between cells.

Figure 24:
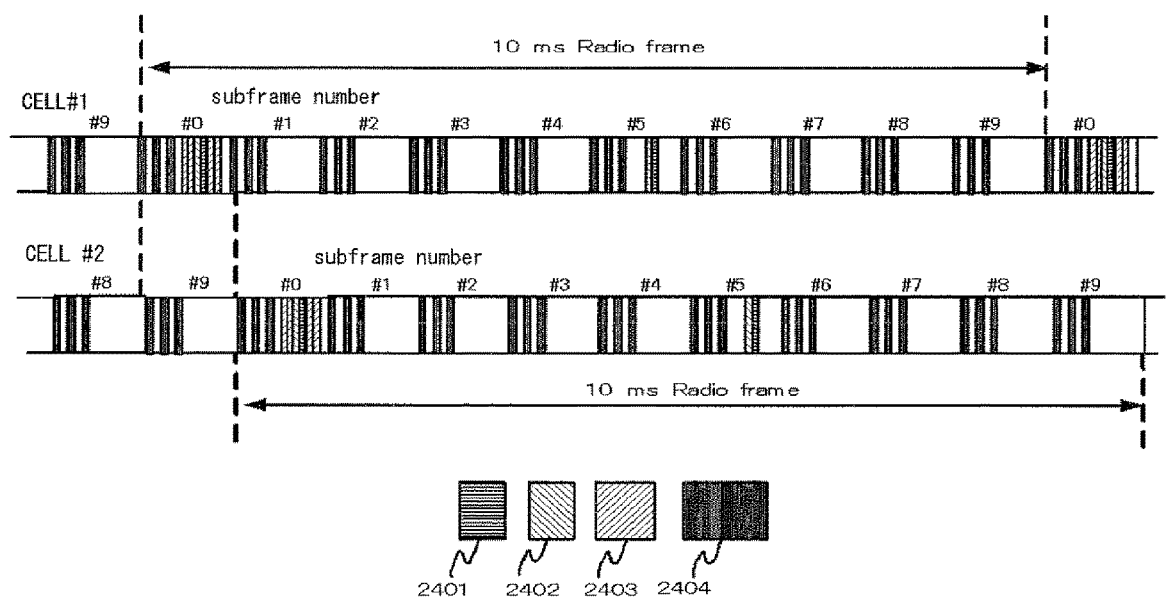
FIG. 24 is a diagram illustrating transmission timings in two cells in a case where a unified frame configuration is used in all cells in a system, which is disclosed in the present modification.

FIG. 24 shows the transmission timings in two cells in a case where one frame configuration is used in all cells in a system, which is disclosed in the present modification. In order to prevent the physical resources to which the signals that cannot be scheduled are mapped from overlapping with each other between cells with one frame configuration, the configuration of the subframe as shown in FIG. 23 is provided, and in the cell #2, an offset for a time interval td is provided to the cell #1 for transmission. A symbol unit may be used for td. For example, td is the time period for an amount of 15 symbols (one subframe and one symbol) in FIG. 24. The configuration of the subframe as shown in FIG. 23 is provided, and the transmission timings are shifted from each other between cells by an amount for one symbol, whereby the signals that cannot be scheduled, which are mapped to the same symbol of each subframe, achieve the above. Accordingly, when two cells have the same frame configuration, the signals that cannot be scheduled are prevented from being transmitted from the two cells at the same time. Further, the transmission timings are shifted from each other by one subframe as shown in FIG. 24, and accordingly the signals that cannot be scheduled, which are mapped to a specific subframe within a radio frame, are prevented from being transmitted at the same time. Therefore, for example, the time period for an amount of 15 symbols (one subframe and one symbol) is taken for td as shown in FIG. 24, and accordingly both signals that cannot be scheduled are prevented from being transmitted from two cells at the same time.

Accordingly, it is possible to prevent the signals that cannot be scheduled from interfering with each other. Therefore, even if it is not possible to perform handover or cell reselection between two cells, the UE is capable of receiving those signals that cannot be scheduled. The offset value that is the time interval for shifting is not limited to 15 symbols, which includes 29 symbols and 43 symbols in the case of the configuration of the subframe shown in FIG. 23. Alternatively, not only limited to the configuration of the subframe shown in FIG. 23, for example, the signals that cannot be scheduled, which are mapped within each subframe in a specific frequency domain, may be mapped to the eighth, tenth and twelfth symbols, and the signals that cannot be scheduled, which are mapped to a specific subframe being a specific frequency domain, may be mapped to the first to sixth symbols. In this case, td may be, for example, the time period for an amount of 13 symbols. That is, in the case where a unified frame configuration is transmitted to be shifted by a certain time period, it suffices that the transmission timings of the signals that cannot be scheduled are prevented from overlapping with each other. As to the offset value, the methods disclosed in the first embodiment and the first modification may be used. Alternatively, at the transmission timings of the signals that cannot be scheduled in a cell, the methods disclosed in the first embodiment and the first modification may be used as the method of transmitting a signal from another cell.

The method disclosed above is capable of achieving effects similar to those of the first embodiment and the first modification and providing one frame configuration as a system. This achieves an effect that the problem that the transmitter/receiver circuit in a base station and a UE becomes intricate can be solved, and further achieves an effect that a problem of an increase in information amount signaled among the network, base station and UEs can be solved.

The present modification describes that between the cells where interference is an issue, transmission is performed by providing an offset to the transmission timing between cells such that the signals that cannot be scheduled are prevented from overlapping with each other, and accordingly the frame configuration or the symbol configuration in a subframe does not need to be changed for each cell. The present modification is also applicable in a case where the signals that cannot be scheduled are mapped to specific subframes being a specific frequency domain, which is described in the first embodiment. For example, transmission is not performed by providing an offset to the subframe to which the signals that cannot be scheduled are mapped between cells, but transmission may be performed by providing an offset to the transmission timing with the same frame configuration between cells without change. This requires merely one frame configuration, and thus control is performed easier as a system and a transmitter/receiver circuit is configured with ease in a base station or a UE, leading to reductions in control delay and power consumption.

The units of offset of the transmission timing may be time units, symbol units, slot units or subframe units. In the cases of time units, symbol units and slot units, it is possible to provide an offset amount in each units, leading to an effect that the adjustment for preventing the transmission timings from overlapping with each other is made more finely in accordance with the units. Further, the present modification is also applicable in a case where the signals that cannot be scheduled are mapped to each subframe in a specific frequency domain, which is described in the first modification. For example, transmission is not performed by providing an offset to the symbols where signals that cannot be scheduled are mapped between cells, but may be performed by providing an offset to the transmission timing with the same symbol configuration of a subframe between cells without change. This requires merely one symbol configuration in a subframe, and thus control can be performed easily as a system and a transmitter/receiver circuit in a base station or a UE can be configured with ease. Accordingly, it is possible to reduce the control delay and power consumption. The units of offset of transmission timing may be time units, symbol units or slot units. In the case of time units, it is possible to provide an offset amount in each unit, leading to an effect that adjustment for preventing the transmission timings from overlapping with each other is made more finely. In the cases of symbol units and slot units, adjustment cannot be made finely, but control for adjustment is simplified. This achieves effects that a control circuit in a base station or a UE is prevented from becoming intricate and that power consumption is reduced.

Third Modification

In the first embodiment to the second modification, the transmission periods (timings) of the physical resources to which the signals that cannot be scheduled are mapped are prevented from overlapping with each other between cells, so that the physical resources of the signals that cannot be scheduled are prevented from overlapping with each other between cells. The patterns of the frame configurations and patterns of the time intervals for shifting the transmission timing are small in number only by preventing the transmission timings from overlapping with each other between cells. In order to increase the number of patterns, an offset is also provided to the frequency such that the physical resources to which the signals that cannot be scheduled are mapped are prevented from overlapping with each other between cells. Non-Patent Document 8 describes that the physical resources to which the signals are mapped on a frequency axis are different from each other in each cell for preventing the synchronization signals and PBCH from overlapping with each other between a plurality of cells, as the operation on a partial co-channel. This is the method of operation in which the frequency used by the HNB/HeNB is a part of the frequency used by the macro cell (NB or eNB) and the frequency domain to which the synchronization signals and PBCH of the HNB/HeNB are mapped is varied from the frequency domain to which the synchronization signals and PBCH of the macro cell are mapped. However, Non-Patent Document 8 does not show the concept of the signals that cannot be scheduled, and does not show that the signals that cannot be scheduled include the signal that is mapped over the entire frequency band of the cell. Further, Non-Patent Document 8 does not show that an offset is provided to the frequency, and further does not show how to set the offset in each cell. In a case where there is a signal that is mapped over the entire frequency band of the cell, unfortunately, the signals that cannot be scheduled, which are mapped over the entire frequency band of the cell, overlap with each other between a plurality of cells even by varying the frequency domain to which only the synchronization signals and PBCH are mapped between a plurality of cells as described in Non-Patent Document 8. Therefore, an increase of interference between cells cannot be prevented only by the operation on the partial co-channel that is described in Non-Patent Document 8, and the UE is unable to receive the signals that cannot be scheduled, which are mapped over the entire frequency band, whereby communication is disconnected.

In order to solve those problems, in the present modification, the frequency domains are prevented from overlapping with each other between cells for the signals that are mapped to a partial frequency domain of the cell among the signals that cannot be scheduled, whereas the transmission periods (timings) of the physical resources to which those signals are mapped are prevented from overlapping with each other between cells for the signals that are mapped over the entire frequency band of the cell among the signals that cannot be scheduled.

As the first method of preventing the frequency domains of the signals mapped to a partial frequency domain of a cell among the signals that cannot be scheduled from overlapping with each other between cells, all frequency bands of cells are made to be identical to each other, and the frequency domains are different from each other. For example, in the cell #1 and the cell #2 having the frequency band of 20 MHz, the frequency domain of the cell #1 is set to the central 1.08 MHz of the entire band of the cell, and the frequency domain of the cell #2 is set to be 1.08 MHz off from the end of the low frequency of the cell. This enables to prevent the frequency domains from overlapping with each other even when transmission is performed at any transmission timing, and accordingly it is possible to prevent an increase of the interference due to the signals between the cells. Further, all frequency bands of the cells are made to be identical to each other, and thus the largest frequency bandwidth permitted by a system is applicable to the cell, which enables large capacity communication.

As the second method, the entire bandwidths of the cells are varied and the center frequencies (carriers) of the cells are varied such that the frequency domains of the cells do not overlap with each other. For example, the frequency domains of both cells are set to the central 1.08 MHz of the entire band of the cell in the cell #1 and the cell #2. Further, the entire bandwidth of the cell #1 is set to 20 MHz, whereas the entire bandwidth of the cell #2 is set to 10 MHz. Further, the center frequency (carrier) of the cell #1 and the center frequency (carrier) of the cell #2 are caused to be different from each other by 5 MHz. By doing this, it is possible to prevent the frequency domains from overlapping with each other even when the transmission is performed at any transmission timing, which prevents an increase in interference due to the signals between the cells.

As the third method, the entire bandwidths of the cells are varied, and the center frequencies (carriers) of the cells are varied such that the frequency domains of the cells do not overlap with each other, whereby the frequency band of one cell is varied from the frequency band of the other cell. For example, the frequency domains of both cells are set to the central 1.08 MHz of the entire band of the cell in the cell #1 and the cell #2. Further, the entire bandwidth of the cell #1 is 20 MHz, whereas the entire bandwidth of the cell #2 is 5 MHz. Further, the center frequency (carrier) of the cell #1 and the center frequency (carrier) of the cell #2 are caused to be different from each other by 5 MHz. As a result, the above-mentioned effects are achieved and, further, it is possible to prevent the signals that cannot be scheduled, which are mapped over the entire frequency band of one cell, and the signals that cannot be scheduled, which are mapped to the frequency domain of the other cell, from overlapping with each other even when they are transmitted at any transmission timings, which prevents an increase in interference between cells.

While the above-mentioned methods show the case of two cells as examples, it is possible to use those methods even in a case of three or more cells. For example, in the third method, the frequency bandwidth of the cell #1 may be 20 MHz, and the frequency bandwidths of the cell #2 and cell #3 may be 5 MHz, so that the center frequency of the cell #2 is varied from that of the cell #1 by −5 MHz and that the center frequency of the cell #3 is varied from that of the cell #1 by +5 MHz.

However, there is a system in which the signals that cannot be scheduled include not only the signals mapped to a partial frequency domain of the cell but also the signals mapped over the entire frequency band of the cell. In such a case, it is not possible to prevent the signals that cannot be scheduled, which are mapped over the entire frequency band of the cell, from overlapping with each other between cells only by the methods disclosed above. Therefore, in a case where the coverages of a plurality of cells overlap with each other, interference due to the signals that cannot be scheduled, which are mapped over the entire frequency bands of the cells, increases, and the UE is incapable of receiving the signals and communication thereof is disconnected. In order to solve this problem, as to the signals that are mapped over the entire frequency band of the cell among the signals that cannot be scheduled, the transmission periods (timings) of the physical resources to which those signals are mapped are prevented from overlapping with each other between cells. The methods disclosed in the first embodiment, the first modification and the second modification are applicable as this method.

Figure 25:
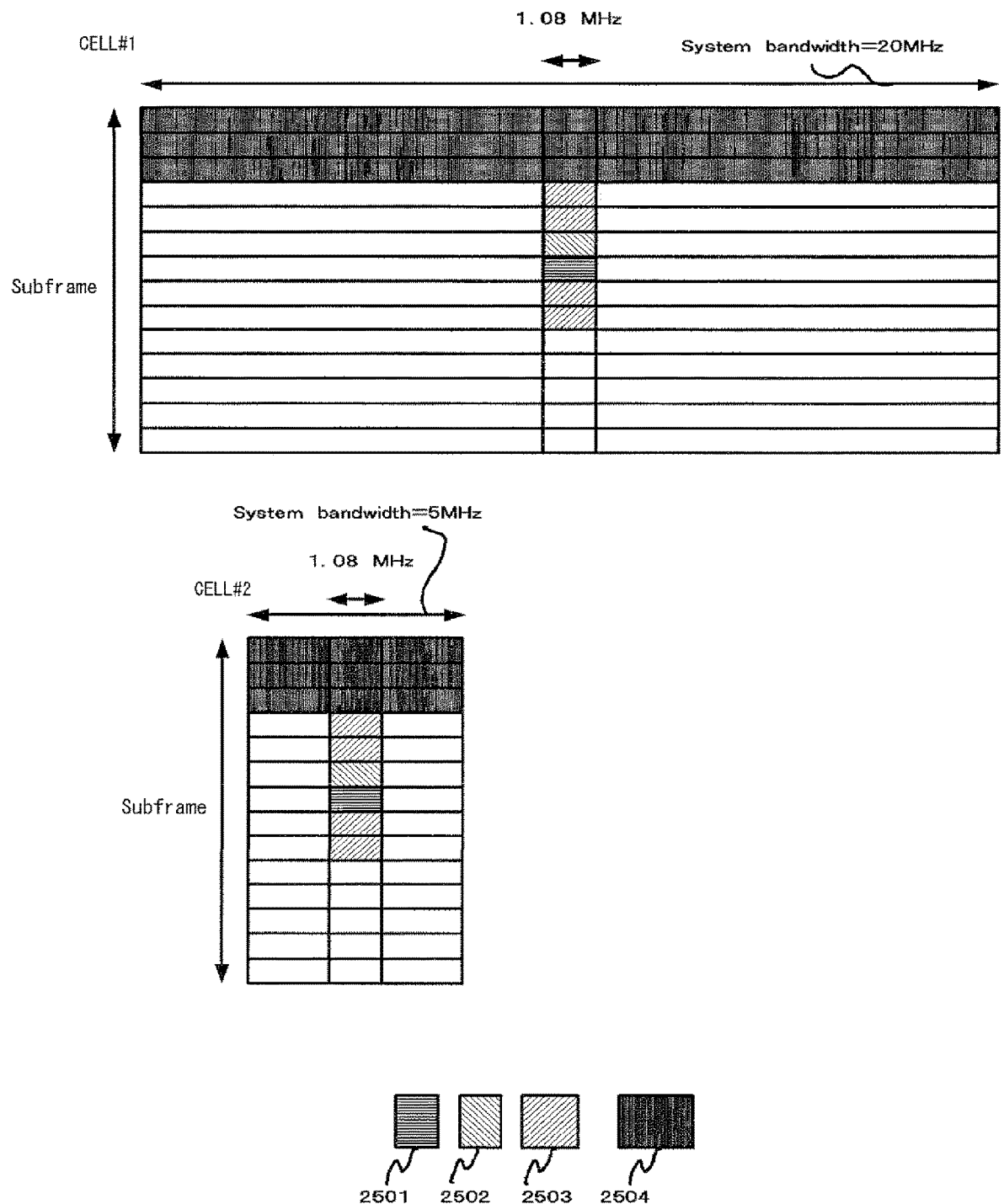
FIG. 25 is a diagram illustrating a mapping method for symbols within one subframe in the present modification.

FIG. 25 shows the mapping method for symbols within one subframe in the present modification. The entire bandwidths of the cells are varied, the frequency domains of the signals mapped to a partial frequency domain of the cell among the signals that cannot be scheduled are prevented from overlapping with each other between the cells, and the frequency band of one cell is varied from the frequency domain of the other cell. For example, in the cell #1 and the cell #2, the frequency domains of both cells are the central 1.08 MHz of the entire band of the cell. Further, the entire bandwidth of the cell #1 is set to 20 MHz, whereas the entire bandwidth of the cell #2 is set to 5 MHz. Further, the center frequency (carrier) of the cell #1 and the center frequency (carrier) of the cell #2 are varied from each other by 5 MHz. For example, in the LTE, the signals that cannot be scheduled, which are mapped to a partial frequency domain of a cell, include the synchronization signals and PBCH. 2501, 2502 and 2503 denote P-SS, S-SS and PBCH, respectively. As shown in the figure, those signals are mapped from the fourth symbol to the ninth symbol of a specific subframe.

As a result, it is possible to prevent the frequency domains of the signals mapped to a partial frequency domain of a cell among the signals that cannot be scheduled from overlapping with each other between cells. The signals mapped over the entire frequency band of the cell are mapped to the first to third symbols of each subframe. The signals mapped over the entire frequency band of the cell include, for example, the L1/L2 control signal in the LTE. In the figure, 2504 denotes the L1/L2 control signal. The cell #1 and the cell #2 have the same frame configuration. The above does not prevent the signals that are mapped over the entire frequency band of the cell from overlapping with each other between cells.

Figure 26:
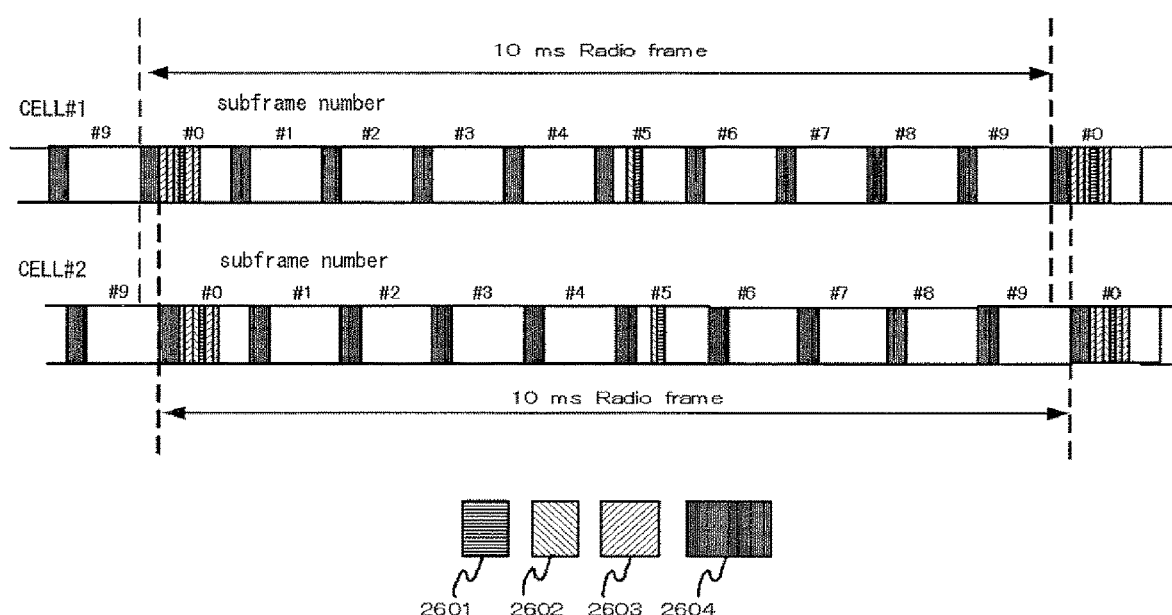
FIG. 26 is a diagram illustrating transmission timings in two cells in a case where the above-mentioned mapping method for symbols within the subframe, which is described in the present modification.

FIG. 26 shows the transmission timings in two cells in a case where the above-mentioned mapping method for symbols within the subframe is used. In the figure, 2601, 2602, 2603 and 2604 denote P-SS, S-SS, PBCH and L1/L2 control signal, respectively. In order to prevent the signals that cannot be scheduled, which are mapped over the entire frequency band, from overlapping with each other between cells, in the cell #2, an offset for the time interval td is provided to the cell #1 for transmission. A symbol unit may be td. For example, td is the time period for an amount of 3 symbols in FIG. 26. This prevents the signals that cannot be scheduled, which are mapped over the entire frequency band, from overlapping with each other as shown in the figure. While the transmission timings of the signals that are mapped to a partial frequency domain of the cell overlap with each other between cells in some cases, the frequency domains to which the signals are mapped are different from each other between the cells, whereby the transmission signals do not overlap with each other between the cells.

Accordingly, with the same frame configuration in two cells, the signals that cannot be scheduled are not transmitted from those two cells in the same frequency-time domain. This prevents the signals that cannot be scheduled from interfering with each other. Even if it is not possible to perform handover or cell reselection between two cells, the UE will be capable of receiving the signals that cannot be scheduled.

Even when the transmission timings of the signals mapped to a partial frequency domain of the cell overlap with each other between the cells, the frequency domains to which those signals are mapped are different from each other between the cells, whereby the signals do not overlap with each other between the cells. Accordingly, it is not required to prevent those signals from overlapping with each other between the cells. Further, those signals and the signals that cannot be scheduled, which are mapped over the entire frequency band, are prevented from overlapping with each other between cells. Through the above, it is possible to increase the number of patterns for preventing the signals that cannot be scheduled from being transmitted from a plurality of cells in an overlapping manner. Therefore, even when the number of cells where interference is an issue increases, it is possible to prevent the signals that cannot be scheduled from being transmitted from a plurality of cells in an overlapping manner by increasing the number of patterns. Then, even if it is not possible to perform handover or cell reselection between a plurality of cells, a UE is capable of receiving these signals that cannot be scheduled.

The methods disclosed in the first embodiment, first modification and second modification are applicable as the method of preventing the transmission periods (timings) of the physical resources to which the signals that are mapped over the entire frequency band of the cell are mapped from overlapping with each other between cells. As a result, similar effects are achieved. Further, as to the offset value, the methods disclosed in the first embodiment, first modification and second modification may be used. Further, at the transmission timing of the signals that cannot be scheduled in a cell, the methods disclosed in the first embodiment, first modification and second modification may be used as the method of transmitting a signal from other cell. As a result, similar effects are achieved.

In FIG. 25, the entire bandwidths of the cells are varied, the frequency domains of the signals mapped to a partial frequency domain of the cell among the signals that cannot be scheduled are prevented from overlapping with each other between cells, and the frequency band of one cell is varied from the frequency domain of the other cell. However, the above-mentioned methods may be used, such as the method of causing the entire frequency bands of the cell to be identical to each other and varying the frequency domains. This enables to obtain a large band of the cell, which allows larger capacity communication. The frequency offset may be a frequency difference of the center frequency (carrier) of the cells in a case of the method in which the entire bandwidths of the cells are varied and the frequency domains of the signals mapped to a partial frequency domain of the cell among the signals that cannot be scheduled are prevented from overlapping with each other between cells. Alternatively, the frequency offset may be the frequency difference of the center frequency of the frequency domains of the cells in a case of the method in which the entire frequency bands of the cells are caused to be identical to each other and the frequency domains are varied. A frequency offset value may be set based on the center frequency of any one of the cells. The frequency difference provided between cells is taken as an offset value, and accordingly there is achieved an effect that signaling of setting or changing of the offset value can be performed among the network, base station and UEs by a small information amount. Further, also as to the above-mentioned frequency offset, it is possible to apply the methods of setting an offset value of the subframe and symbol and an offset value of the transmission timing, which are disclosed in the first embodiment, first modification and second modification. As a result, similar effects can be achieved. As to the frequency offset values, in actuality, the frequency to which offset is provided may be determined considering the frequency that may be taken by a carrier in a system (frequency raster) or the subcarrier frequency in a case of the OFDMA (for example, 15 kHz in the case of LTE).

It is possible to achieve similar effects to those described in the first embodiment to the second modification by the method disclosed in the present modification, and increase the number of patterns for preventing the signals that cannot be scheduled from being transmitted from a plurality of cells in an overlapping manner. Accordingly, even if the cells where interference is an issue increase, it is possible to prevent the signals that cannot be scheduled from being transmitted from a plurality of cells in an overlapping manner by increasing the number of patterns. Then, even if it is not possible to perform handover or cell reselection between a plurality of cells, a UE is capable of receiving these signals that cannot be scheduled. For example, in a case where a large number of CSG cells are installed within the coverage of the macro cell, the interference between the CSG cells is also an issue in some cases. Alternatively, even in a case where the macro cell and the CSG cell respectively use a separate dedicated channel (frequency), the interference between the CSG cells is an issue in some cases if a large number of CSG cells are installed. In such a case, it is possible to prevent the signals that cannot be scheduled from being transmitted from those cells in an overlapping manner by application of the method described in the present modification. Therefore, even if it is not possible to perform handover or cell reselection between a plurality of cells, a UE is capable of receiving these signals that cannot be scheduled, which enables communication.

The present invention describes the case where the number of symbols in one subframe is 14. However, the number of symbols in one subframe does not need to be 14, and may be any other value. For example, the number of symbols may be determined in accordance with the following relational expression. The number of symbols required for the signals mapped to each subframe among the signals that cannot be scheduled is represented by x. The number of symbols required for the signals mapped to each subframe among the signals that cannot be scheduled is represented by y. Further, the transmission timings of the physical resources of the signals that cannot be scheduled are prevented from overlapping with each other between z cells. In this case, the number of symbols in one subframe may be determined by the following relational expression (1) ns≥x*z+y.

As a system, the use of this relational expression enables to provide the frame configurations of z patterns in the first embodiment or the first modification and provide time offsets of z patterns in the second modification. This allows to prevent the transmission timings of the physical resources of the signals that cannot be scheduled from overlapping with each other between z cells. For example, in a case where two CSG cells are installed within the coverage of the macro cell, and the coverages of the two CSG cells overlap with each other, the number of symbols in a subframe is set to the value satisfying the above-mentioned relational expression providing that z is equal to three. As a result, it is possible to prevent the transmission timings of the physical resources of the signals that cannot be scheduled from overlapping with each other among the above-mentioned three cells. This enables to reduce the interference among a large number of cells to which handover cannot be performed, and there can be achieved an effect that the communication between the UE and the cell is enabled.

Fourth Modification

As disclosed in Non-Patent Document 12, 3GPP is pursuing specifications standard of "long term evolution advanced (LTE-A)" as Release 10. It is considered in the LTE-A system that frequency bandwidths wider than the frequency bandwidths (transmission bandwidths) of the LTE system are supported (Chapter 5 of Non-Patent Document 12). Therefore, an LTE-A-compliant UE is considered to simultaneously receive one or a plurality of component carriers (CCs). The LTE-A-compliant UE is considered to have the capability to enable simultaneous reception and transmission, only reception or only transmission on a plurality of component carriers, that is the capability of carrier aggregation.

Figure 42:
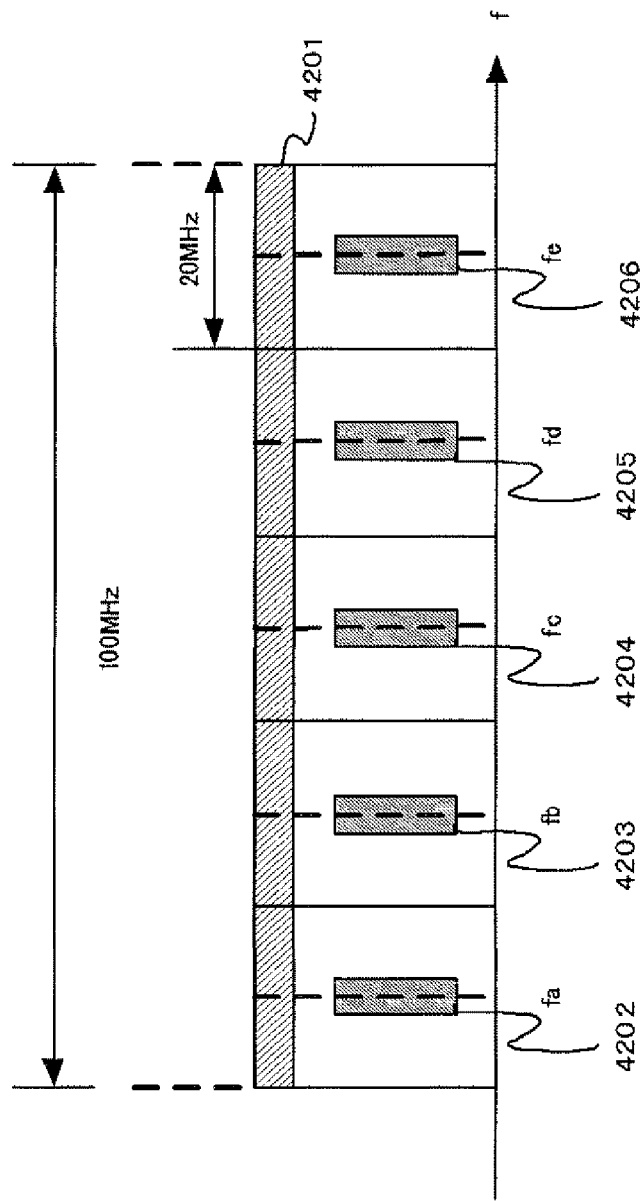
FIG. 42 is a conceptual diagram showing the configuration of a frequency band of an LTE-A system.

FIG. 42 is a conceptual diagram of the configuration of a frequency band of the LTE-A system. 4201 of FIG. 42 denotes the physical downlink control channel (PDCCH). FIG. 42 shows the example where the physical downlink control channel is mapped for each of all component carriers, which is not limited thereto. For example, the case where a component carrier to which the physical downlink control channel is mapped and a component carrier to which the physical downlink control channel is not mapped coexist is conceivable as another example. 4202, 4203, 4204, 4205 and 4206 denote the downlink synchronization signal (SS) and the physical broadcast channel (PBCH). FIG. 42 shows the example where the downlink synchronization signal and the physical broadcast channel (or broadcast information) are mapped for each component carrier, which is not limited thereto. For example, the case where the component carrier to which the downlink synchronization signal and the physical broadcast channel are mapped and the component carrier to which the downlink synchronization signal and the physical broadcast channel are not mapped coexist is conceivable as still another example.

In FIG. 42, a base station that has a bandwidth of 20 MHz as a component carrier and includes five component carriers described above is considered in the LTE-A system. The carrier frequencies of the respective component carriers are represented by fa, fb, fc, fd and fe. That is, the base station that has the downlink transmission bandwidth is 100 MHz is considered. 3GPP has discussed at the meeting that the bandwidth of the component carrier is not limited to 20 MHz but is equal to or smaller than 20 MHz. Further, the bandwidth of the component carrier supported by one base station is not limited to one type. Further, 3GPP has discussed at the meeting that the downlink transmission bandwidth of the base station in the LTE-A system is not limited to 100 MHz but is equal to or smaller than 100 MHz. Moreover, FIG. 42 shows the case where each component carrier continues, not limited thereto, and carrier aggregation is enabled in the receiver even in a non-continuous manner.

Three types of component carriers are studied as follows (Non-Patent Document 13).

The first type is a backwards compatible carrier. This is a carrier accessible to UEs complying with all existing LTE releases.

The second type is a non-backwards compatible carrier. This is a carrier that cannot be accessed by UEs complying with existing LTE releases but is easily accessible to UEs complying with the release defining a non-backwards compatible carrier. Further, in a case where the non-backwards compatible carrier is provided due to a duplex distance, this carrier can be operated stand-alone or as a part of the carrier aggregation.

The third type is an extension carrier. This carrier allows additional resources to aggregate to one component carrier. A carrier segment is always adjacent to the component carrier. The carrier segment is associated with one component carrier. The carrier segment does not exist independently of the component carrier. In the carrier segment, the downlink synchronization signal, system information (or broadcast information) and paging signal are not provided.

Figure 43:
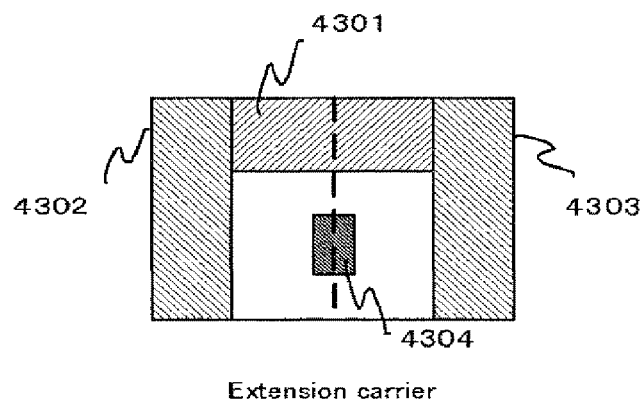
FIG. 43 is a conceptual diagram of an extension carrier.

FIG. 43 is a conceptual diagram of the extension carrier. 4301 of FIG. 43 denotes the physical downlink control channel (PDCCH). 4302 and 4303 denote a carrier segment. 4304 denotes the downlink synchronization signal (SS) and the physical broadcast channel (PBCH). As described above, in the carrier segment, the downlink synchronization signal, system information (or broadcast information) and paging signal are not provided.

Non-Patent Document 14 discloses that the base station that has been newly switched on selects the primary component carrier for downlink transmission when being switched on, based on the interference of the neighboring cells. This is performed for interference management.

As shown in FIG. 42, the number of component carriers supported by one base station is determined by the downlink transmission bandwidth of the base station and the bandwidth of the component carrier. In FIG. 42, the number of component carriers supported by a base station is five. As described above, the number of component carriers supported by one base station is limited.

The number of component carriers available as a replacement for a component carrier with large interference is limited, and thus it is not possible to avoid the downlink interference with a large number of surrounding base stations with the use of Non-Patent Document 14. It is expected that a large number of HeNBs are installed as described above. Therefore, in a case where a large number of HeNBs are installed within a coverage of a macro cell with the use of Non-Patent Document 14, there arises a problem that the problem of downlink interference cannot be solved.

The solution in the fourth modification is disclosed below. The first embodiment, first modification of the first embodiment, second modification of the first embodiment and third modification of the first embodiment are used for each component carrier. Alternatively, in a case where there exists a component carrier with a little interference amount, a component carrier may be selected based on, for example, the interference of neighboring cells, whereas in a case where there exists no component carrier with a little interference amount, the first embodiment, first modification of the first embodiment, second modification of the first embodiment and third modification of the first embodiment may be used for each component carrier.

A threshold may be used as criteria of judgment as to whether to use the first embodiment, first modification of the first embodiment, second modification of the first embodiment and third modification of the first embodiment. As specific examples of the judgment, in the case where there exists no component carrier whose interference amount is equal to or smaller than (or less than) the threshold, the first embodiment, first modification of the first embodiment, second modification of the first embodiment and third modification of the first embodiment are used. The threshold may be determined in a static manner or may be broadcast as the system information.

The following effects are achieved by this fourth modification. It is possible to increase the number of patterns for preventing the signals that cannot be scheduled from overlapping with each other to be transmitted, compared with Non-Patent Document 14. Accordingly, even when the cells where interference is an issue increase, it is possible to prevent the signals that cannot be scheduled from overlapping with each other to be transmitted from a plurality of cells. As a result of the signals that cannot be scheduled being prevented from overlapping with each other to be transmitted, even if it is not possible to perform handover or cell reselection between a plurality of cells as in, for example, the first embodiment, the UE is capable of receiving the signals that cannot be scheduled.

Fifth Modification

The following problem arises by the method described in the fourth modification of the first embodiment. In a case where a frame configuration differs for each component carrier or in a case where the transmission timing differs for each component carrier, the load for carrier aggregation increases in a receiver, that is, in a UE. An increase in processing load of a UE leads to a problem of an increase in power consumption.

The solution in the fifth modification is disclosed below. The first embodiment, first modification of the first embodiment, second modification of the first embodiment and third modification of the first embodiment are used for each aggregated carrier having aggregated component carriers which support carrier aggregation, for each node or for each base station.

Alternatively, in a case where there exists a component carrier with a little interference amount, a component carrier may be selected based on, for example, the interference of neighboring cells, whereas in a case where there exists no component carrier with a little interference amount, the first embodiment, first modification of the first embodiment, second modification of the first embodiment and third modification of the first embodiment may be used for each aggregation carrier, each node or each base station.

A threshold may be used as criteria of judgment as to whether to use the first embodiment, first modification of the first embodiment, second modification of the first embodiment and third modification of the first embodiment. As specific examples of the judgment, in the case where there exists no component carrier whose interference amount is equal to or smaller than (or less than) the threshold, the first embodiment, first modification of the first embodiment, second modification of the first embodiment and third modification of the first embodiment are used. The threshold may be determined in a static manner or may be broadcast as the system information.

This fifth modification achieves the following effects in addition to the effects of the fourth modification of the first embodiment. The same frame configuration or same transmission timing is provided for each aggregation carrier or the like. This enables the UE that performs carrier aggregation to reduce the processing load and power consumption.

Sixth Modification

The sixth modification discloses a solution regarding the prevention of downlink interference in the LTE-A, which is different from that of Non-Patent Document 14. In the sixth modification, one node maps the signals that cannot be scheduled with the use of the frequency band of the physical resources to which the signals that cannot be scheduled are mapped in the other node. Alternatively, one node uses the frequency band of the physical resources to which the signals that cannot be scheduled are mapped in the other node as the frequency band of the physical resources to which the signals that cannot be scheduled are not mapped.

Still alternatively, it may be assumed that a component carrier is generally selected based on, for example, the interference of neighboring cells and that the sixth modification is performed in a case where there exists no component carrier with a little interference amount.

The node may be a cell.

Specific examples of the signals that cannot be scheduled in the LTE and LTE-A include the synchronization signal (SS), physical broadcast channel (PBCH), and L1/L2 control signals such as PDCCH, PHICH and PCFICH.

Specific examples of the frequency band of the physical resources to which the signals that cannot be scheduled are not mapped in the LTE-A include a carrier segment of an extension carrier. Specific examples of the frequency band of the physical resources to which the signals that cannot be scheduled are mapped include the transmission bandwidth of a base station in the LTE, the band where the L1/L2 control signals are mapped in a backwards compatible carrier, non-backwards compatible carrier and an extension carrier in the LTE-A.

Figure 44:
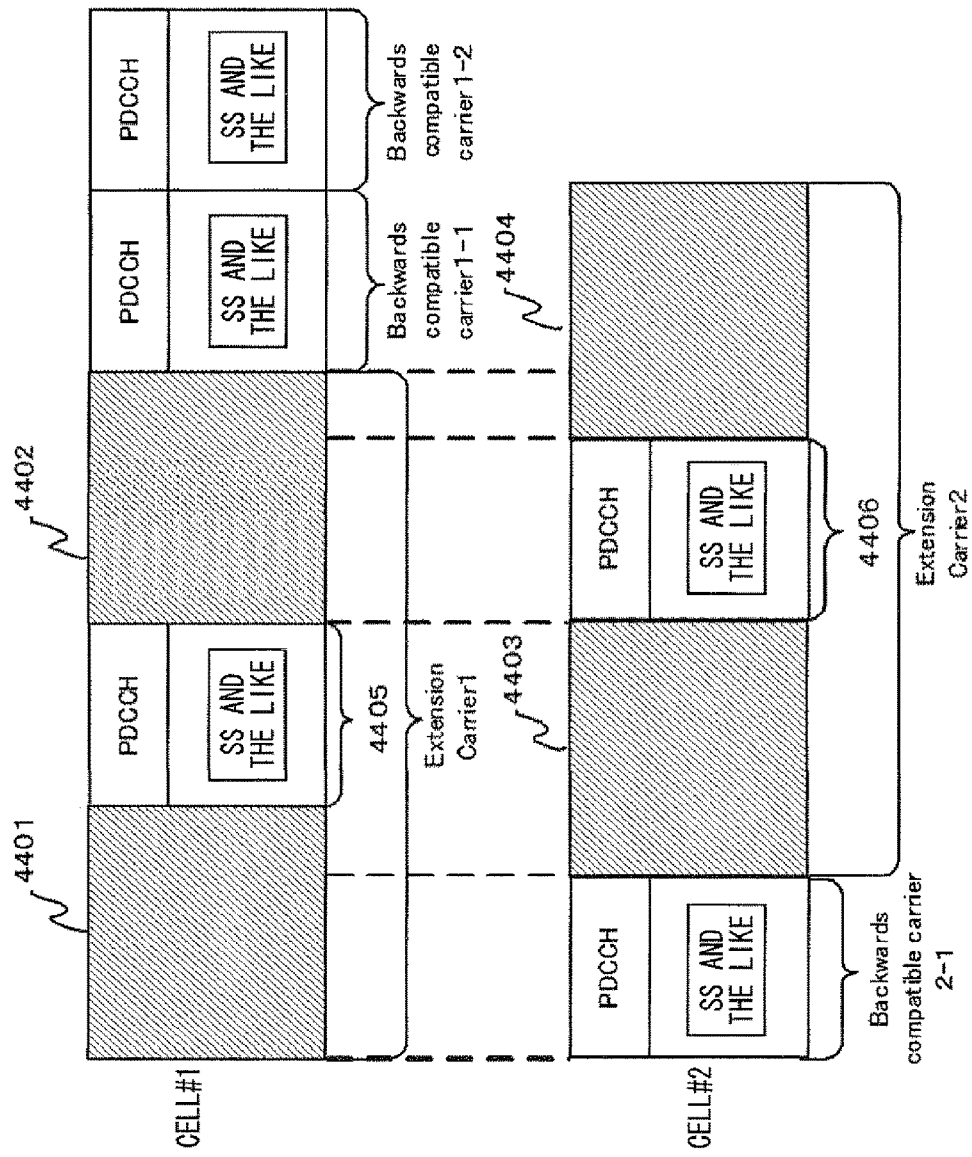
FIG. 44 is a conceptual diagram of a solution in a sixth modification of the first embodiment.

A specific example of the solution in the sixth modification of the first embodiment is described with reference to FIG. 44. The component carrier configuration within the downlink transmission bandwidth of a cell #1 (first cell) is described. The cell #1 includes an extension carrier 1 and backwards compatible carriers 1-1 and 1-2. The extension carrier 1 includes a band 4405 to which the L1/L2 control signal is mapped in the extension carrier and carrier segments 4401 and 4402. The synchronization signal (SS) and the physical broadcast channel (PBCH) are mapped in the band 4405.

The component carrier configuration within the downlink transmission bandwidth of a cell #2 (second cell) is described. The cell #2 includes a backwards compatible carrier 2-1 and an extension carrier 2. The extension carrier 2 includes a band 4406 to which the L1/L2 control signal is mapped in the extension carrier and carrier segments 4403 and 4404. The synchronization signal (SS) and the physical broadcast channel (PBCH) are mapped in the band 4406.

One node (cell #2) maps the signals that cannot be scheduled (PDCCH and SS in FIG. 44) with the use of the frequency bands (4401 and 4402 of FIG. 44) of the physical resources to which the signals that cannot be scheduled are not mapped in the other node (cell #1). Alternatively, one node (cell #2) uses the frequency bands (4405 and backwards compatible carrier 1-1 of FIG. 44) of the physical resources to which the signals that cannot be scheduled are mapped in the other node (cell #1) as the frequency bands (4403 and 4404 in FIG. 44) of the physical resources to which the signals that cannot be scheduled are not mapped.

The sixth modification is capable of achieving the following effects in addition to the effects of the fourth modification of the first embodiment. It is possible to separate the signals that cannot be scheduled among a plurality of cells where interference is an issue, in accordance with a frequency domain. This enables to achieve effects similar to those of the first embodiment. That is, the interference between cells of the signals that cannot be scheduled is reduced, and thus a UE is capable of receiving those signals. This enables to achieve the effect of preventing the communication of a UE with those cells from being disconnected in a case where handover to those cells or cell reselection are not allowed.

Further, merely one symbol configuration is required within a subframe, and accordingly what is needed is only one type of receiver circuit and transmitter circuit for signals that cannot be scheduled in a UE and a base station. As a result, it is possible to achieve an effect that those signals can be received and transmitted without making a circuit intricate and increasing power consumption. In addition, it is not required to achieve synchronization among a plurality of cells where interference is an issue, which enables to achieve the effect that a mobile communication system is prevented from becoming intricate.

It is possible to use the sixth modification in combination with the first embodiment, first modification of the first embodiment, second modification of the first embodiment, third modification of the first embodiment, fourth modification of the first embodiment or fifth modification of the first embodiment.

Seventh Modification

While the first embodiment, first modification of the first embodiment, third modification of the first embodiment, fourth modification of the first embodiment and fifth modification of the first embodiment disclose that an offset is provided to the physical resources to which the signals that cannot be scheduled are mapped in a time domain, in a seventh modification, the same signals that cannot be scheduled are mapped in the original time domain as well as in the time domain to which an offset is provided. In other words, the signals that cannot be scheduled are transmitted in the original time domain, while replications of the signals that cannot be scheduled are provided in the time domain to which an offset is provided. Alternatively, the signals that cannot be scheduled may be transmitted in the time domain to which an offset is provided, whereas replications of the signals that cannot be scheduled may be provided in the original time domain. Still alternatively, replications may be transmitted in both two cells (cell #1 and cell #2) where downlink interference occurs, or replications may be transmitted in one of those (only cell #1 or only cell #2).

Further, the transmission power may be changed between the signal in the original time domain and the signal in the time domain to which an offset is provided.

A specific example of the original time domain in the LTE is described below.

The downlink synchronization signals (P-SS and S-SS) are mapped to the first (#0) and sixth (#5) subframes of each radio frame (see FIG. 15). Further, the downlink synchronization signals (P-SS and S-SS) are mapped to the sixth symbol (#5) and seventh symbol (#6) of the subframe. Therefore, the original time domains of the downlink synchronization signals are the first (#0) and sixth (#5) subframes of each radio frame. In addition, the sixth symbol and the seventh symbol of the subframe are the original time domains of the downlink synchronization signal.

The PBCH is mapped to the first (#0) subframe of each radio frame (see FIG. 15). In addition, the PBCH is mapped to the fourth symbol (#3), fifth symbol (#4), eighth symbol (#7) and ninth symbol (#8) of the subframe. Therefore, the original time domain of the PBCH is the first (#0) subframe of each radio frame. Further, the fourth symbol, fifth symbol, eighth symbol and ninth symbol of the subframe are original time domains of the PBCH.

The L1/L2 control signals (PDCCH, PHICH, PCFICH) are mapped within the leading three symbols of each subframe (see FIG. 19). Accordingly, the original time domains of the L1/L2 control signals are the leading three symbols of each subframe.

This enables to receive the signals that cannot be scheduled in the original time domains even when a receiver circuit for receiving the signals that cannot be scheduled in the time domain to which an offset is provided is not provided in the receiver (that is, UE). That is, it is possible to receive the signals that cannot be scheduled even if there is not provided a receiver circuit for a plurality of frame configurations. Accordingly, even if a UE, which is complying with the existing releases, does not include a receiver circuit for receiving the signals that cannot be scheduled in the time domains to which an offset is provided, it is possible to achieve the effect of receiving the service from a mobile communication system by being served by a base station in which a measure against interference is taken.

Figure 45:
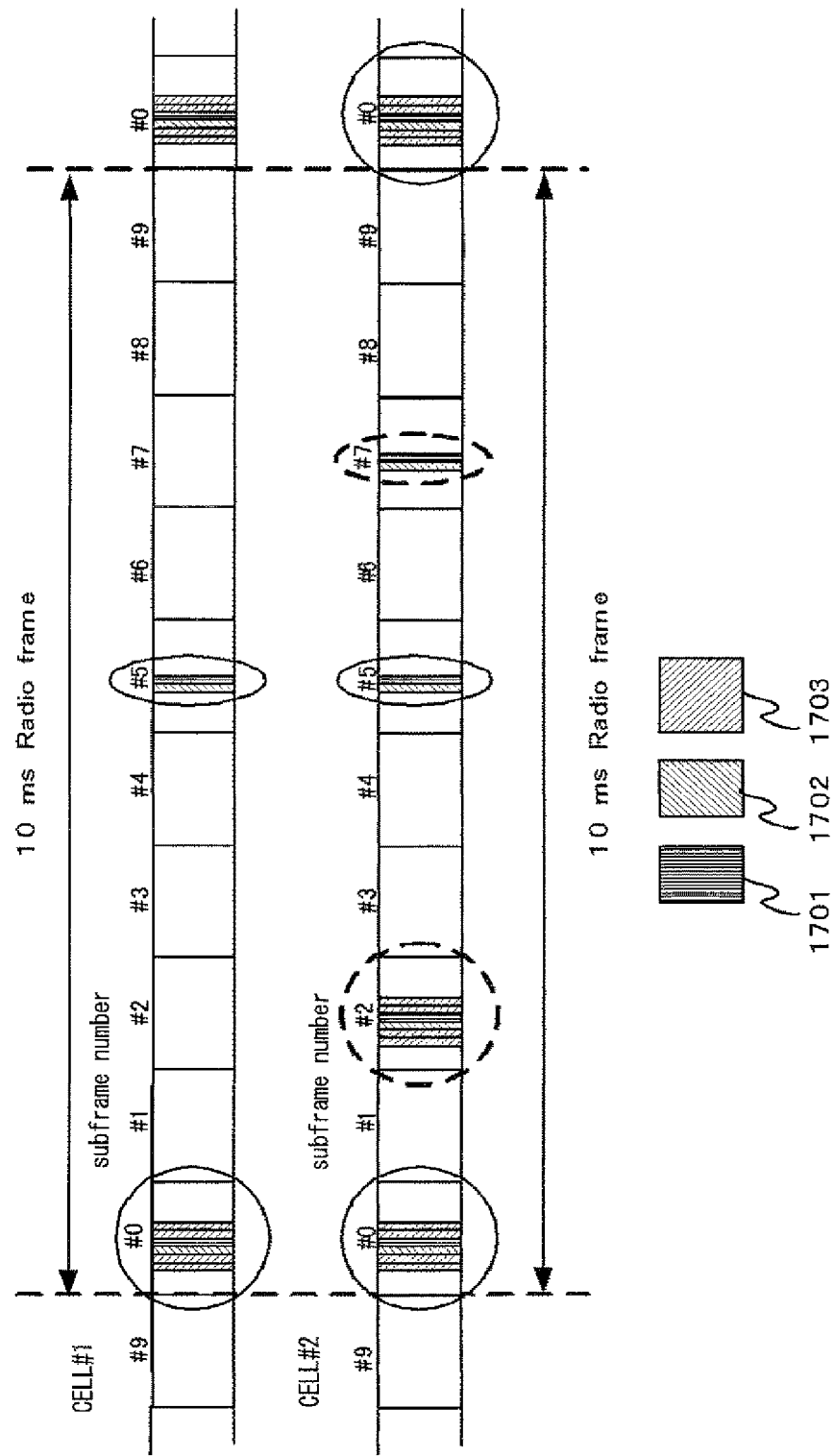
FIG. 45 is a diagram illustrating a specific example in which replications of signals that cannot be scheduled are provided in the first embodiment.

A specific example in which replications of the signals that cannot be scheduled are provided in the first embodiment is descried with reference to FIG. 45. The numbers same as those of FIG. 17 represent identical components, which are not described. It is assumed that in the cell #1, the P-SS, S-SS and PBCH are transmitted in a subframe #0 and the P-SS and S-SS are transmitted in a subframe #5. In the cell #2, the P-SS, S-SS and PBCH are transmitted in the subframe #0 and the P-SS and S-SS are transmitted in the subframe #5. Moreover, the replication of the subframe #0, that is, the P-SS, S-SS and PBCH are transmitted in the subframe #2 and the replication of the subframe #5, that is, the P-SS and S-SS are transmitted in the subframe #7. In FIG. 45, a solid line represents the signal in the original time domain, whereas a broken line represents the signal of a replication in the time domain to which an offset is provided.

Figure 46:
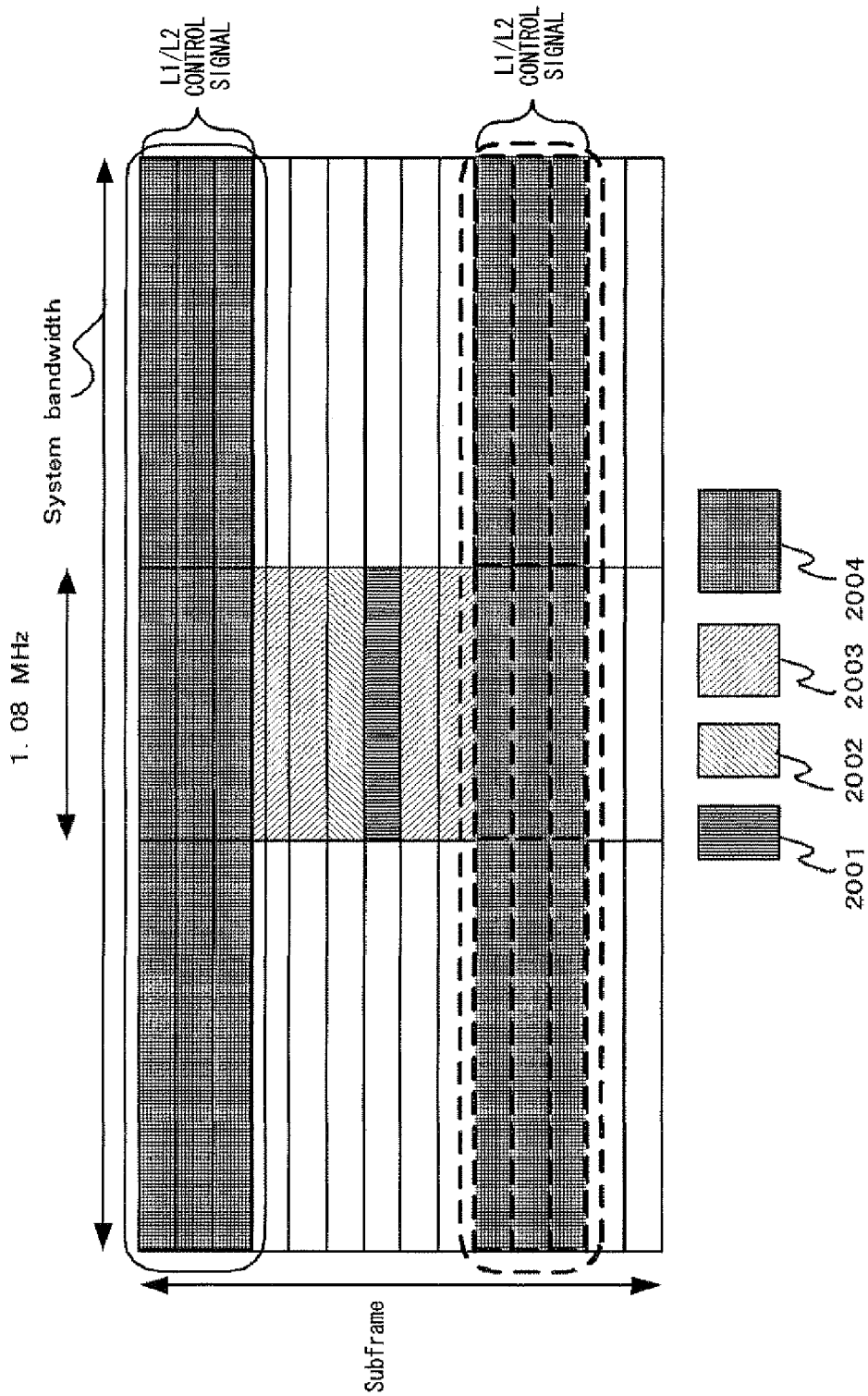
FIG. 46 is a diagram illustrating a specific example in which replications of signals that cannot be scheduled are provided in the first modification of the first embodiment.

A specific example in which replications of the signals that cannot be scheduled are provided in the cell #2 in the first modification of the first embodiment is described with reference to FIG. 46. The numbers same as those of FIG. 20 represent identical portions, which are not described. It is assumed that in the cell #1, the L1/L2 control signals are transmitted in the first symbol to the third symbol of each frame. In the cell #2, the L1/L2 control signals are transmitted in the first symbol to the third symbol of each subframe. In addition, the replications of the first symbol to third symbol, that is, L1/L2 control signals are transmitted in the tenth symbol to the twelfth symbol within each subframe. In FIG. 46, a solid line represents the signal in the original time domain, whereas a broken line represents a replicated signal in the time domain to which an offset is provided.

The method of mapping the same signals that cannot be scheduled in the original time domain as well as the time domain to which an offset is provided is also applicable to the second modification of the first embodiment. The second modification of the first embodiment is the solution in which one system does not include a plurality of frame configurations. In a case where a receiver (that is, UE) searches for a cell other than the serving cell assuming that synchronization is achieved between the cells, it is possible to achieve the effect that the search operation can be simplified owing to the fact that the P-SS, S-SS and L1/L2 control signals that cannot be scheduled exist in the original time domain. Specifically, it is possible to omit the process of achieving synchronization between the slot timing and frame timing with the use of the primary synchronization signal (P-SS) and the secondary synchronization signal (S-SS) transmitted from a nearby base station in the Step ST1201 of FIG. 12.

Second Embodiment

The first embodiment discloses that any or both of the times (timings) and the frequencies of the physical resources to which the signals that cannot be scheduled are mapped are prevented from overlapping with each other. In addition, the first embodiment discloses that an offset is provided between cells to the physical resources to which the signals that cannot be scheduled are mapped, the transmission timings of the physical resources and the frequencies to which the signals that cannot be scheduled are mapped. The conceivable range of those offsets is limited depending on a system, and by the method disclosed in the first embodiment. This is because, for example, there is a signal that is mapped over the entire frequency band to a specific symbol within each subframe among the signals that cannot be scheduled. For example, there are the L1/L2 control signals in the LTE. The method of the first modification of the first embodiment is applied as to the above-mentioned signal, and assuming that the offset m of the symbol is equal to 12, the L1/L2 signals are mapped to the first to third symbols of the subframe in one cell, whereas the L1/L2 signals are mapped to the first, thirteenth and fourteenth symbols of the subframe in the other cell. In such a case, the leading symbols overlap with each other between cells. As a result, a conceivable range of the offset is limited.

The second embodiment discloses conceivable ranges of the offsets of the physical resources to which the signals that cannot be scheduled are mapped, the transmission timings of the physical resources and the frequencies to which the signals that cannot be scheduled are mapped, the offsets being provided between the cells.

Disclosed here is the case of the method of providing an offset of n subframes when the signals that cannot be scheduled are mapped to specific subframes within the radio frame, which is disclosed in the first embodiment. The number of subframes in a radio frame is represented by nsub, and the subframe are numbered #0 through #(nsub−1). A specific subframe number of k subframes to which the signals that cannot be scheduled are mapped is represented by xk. The specific subframe number of any cell is represented by xa or xb. In this case, a conceivable range of n is a value of n where Expression (2) below holds.

$$xa \approx (xb+n) \bmod (nsub), xa, xb \in \{xk\} \quad (2)$$

For example, the case of LTE is described. The number of subframes in a radio frame is 10. The subframes to which any or both of the synchronization signals and PBCH that cannot be scheduled are mapped are #0 and #5. Therefore, the conceivable range of an offset is such that n is equal to 1, 2, 3, 4, 6, 7, 8 and 9. Note that the offset may take a minus value, and the number of subframes in a radio frame is 10. Therefore, an offset n of 9 is identical to an offset n of −1. As a result, it is possible to prevent the physical resources to which those signals are mapped from overlapping with each other between cells even in a case where the signals that cannot be scheduled are mapped to specific subframes within a radio frame. This enables to eliminate the interference of the signals between cells.

Disclosed next is the case of the method of providing an offset of m symbols when the signals that cannot be scheduled are mapped to specific symbols of each subframe within a radio frame, which is disclosed in the first modification of the first embodiment. The number of symbols in a subframe is represented by nsym, and the symbols are numbered #0 through #(nsym−1). The number of specific k symbols to which the signals that cannot be scheduled are mapped is represented by xk. The specific symbol number of any cell is represented by xa or xb. In this case, a conceivable range of m is a value of m where Expression (3) below holds.

$$xa \approx (xb+m) \bmod (nsym), xa, xb \in \{xk\} \quad (3)$$

Further, in a case where the signals that cannot be scheduled are mapped to specific subframes within a radio frame, and the signals that cannot be scheduled are further mapped to specific symbols of each subframe within a radio frame, n may be derived from the relational expression (2) to map the signals that cannot be scheduled to specific subframes within a radio frame, and the number of symbols of the signals that cannot be scheduled, which are mapped to specific subframes in the radio frame, may be included in xa of the relational expression (3) to provide an offset of m symbols.

For example, the case of the LTE is described. The number of symbols in a subframe is 14. The symbols to which the L1/L2 control signals that cannot be scheduled are mapped are within the first symbol (symbol #0) to the third symbol (symbol #2) of each subframe. In addition, the symbols of the signals that cannot be scheduled, which are mapped in specific subframes within a radio frame, are from the fourth symbol (symbol #3) to the ninth symbol (symbol #8). Therefore, the conceivable range of offset is such that m is equal to 9, 10 and 11. For example, assuming that m is equal to 11, the signals are mapped to the twelfth symbol (symbol #11) to fourteenth symbol (symbol #13) of each subframe in the cell to which an offset is provided, whereas the signals are mapped to the first (symbol #0) to third (symbol #2) of each subframe in the cell to which an offset is not provided. Note that an offset may take a minus value, and the number of symbols in a subframe is 14, whereby, for example, the offset m of 14 is identical to the offset m of −1. As a result, it is possible to prevent the physical resources to which those signals are mapped from overlapping with each other between cells even in a case where the signals that cannot be scheduled are mapped to specific symbols of each subframe within a radio frame. This enables to eliminate the interference of the signals between cells.

Disclosed next is the case of the method of providing an offset td to the transmission timing between cells with one frame configuration, which is disclosed in the second modification of the first embodiment. For example, the case where mapping is performed to the symbols of a subframe is disclosed as shown in FIG. 23. The number of subframes in a radio frame is 10 and the number of symbols in a subframe is 14. The subframes are numbered #0 through #9 and the symbols are numbered #0 through #13. Further, specific subframes in a radio frame, to which the signals that cannot be scheduled are mapped, are numbered #0 through #5. In this case, the offset td is as expressed by Expression (4) below. Here, the unit of the offset td is a symbol.

$$td = n \times 14 + 1, \text{ where } n = 1,2,3,4,6,7,8,9 \quad (4)$$

While the unit of the offset td is symbol, the unit may be time through conversion of symbol to time.

Further, specific subframes in a radio frame are numbered #0 and #5, which is not limited thereto. It suffices in this case that the value of n in Expression (4) does not cause overlapping even when an offset is added thereto and, for example, the value of n may be derived by using the relational expression of Expression (2). As a result, it is possible to prevent the physical resources to which those signals are mapped from overlapping with each other between cells even in a case where the offset td is provided to the transmission timing between cells, with one frame configuration. This enables to eliminate the interference of the signals between cells.

Disclosed next is the case of using the method of preventing, between cells, the frequency domains of the signals that are mapped in a partial frequency domain of the cell among the signals that cannot be scheduled, which is disclosed in the third modification of the first embodiment. In the first method disclosed in the third modification of the first embodiment, the all frequency bands of the cells are made identical to each other and the frequency domains are varied, and thus an offset fd of a partial frequency domain to which the signals that cannot be scheduled are mapped is expressed by the following relational expression (5). BW represents the system bandwidth of the cell, and SBW represents the bandwidth of the partial frequency domain to which the signals that cannot be scheduled are mapped.

$$(BW/2-SBW/2) \leq fd \leq -SBW \text{ or}$$

$$SBW \leq fd \leq BW/2-SBW/2 \quad (5)$$

For example, the system bandwidth (entire frequency bandwidth) of the cell #1 and the cell #2 is 20 MHz, and the bandwidth of a partial frequency domain to which the signals that cannot be scheduled are mapped is 1.08 MHz. The partial frequency domain in the cell #1, to which the signals that cannot be scheduled are mapped, is the center of the system band. In this case, an offset fd of the partial frequency domain, to which the signals cannot be scheduled are mapped, of the cell #2 with respect to the cell #1 is such that $-9.46$ MHz$\leq$fd$\leq-1.08$ MHz or $1.08$ MHz$\leq$fd$\leq9.46$ MHz. In the second method disclosed in the third modification of the first embodiment, the entire bandwidths of the cells are varied and the center frequencies (carriers) of the cells are varied such that the frequency domains do not overlap with each other between the cells, and thus an offset fc of the center frequency (carrier) of the cell is expressed by the following relational expression (6). SBW represents the bandwidth of the partial frequency domain of the cell to which the signals that cannot be scheduled are mapped.

$$fc \leq -SBW \text{ or } SBW \leq fc \quad (6)$$

Further, a conceivable range of fc may be limited based on the system band of each cell such that the system band of the cell that has a narrow system bandwidth is included in the system band of the cell that has a wide system bandwidth. For example, the system bandwidth of the cell #1 is 20 MHz. The system band of the cell #2 is 10 MHz. The bandwidth of the partial frequency domain to which the signals that cannot be scheduled are mapped is 1.08 MHz, which is the center of the system band. In this case, the offset fc of the center frequency (carrier) of the cell #2 with respect to the cell #1 is such that $-5$ MHz$\leq$fc$\leq-1.08$ MHz or $1.08$ MHz$\leq$fd$\leq5$ MHz. In the third method disclosed in the third modification of the first embodiment, the entire bandwidths of the cells are varied, the center frequencies (carriers) of the cells are varied so as to prevent the frequency domains from overlapping with each other between the cells, and the frequency band of one cell is varied from that of the other frequency domain, whereby the offset fc of the center frequency (carrier) of the cell is expressed by the following relational expression (7). SBW represents the bandwidth of the partial frequency domain of the cell to which the signals that cannot be scheduled are mapped in each cell.

$$fc \leq -SBW-BW2/2 \text{ or } SBW+BW2/2 \leq fc$$

where BW2$\leq$(BW1-SBW)/2.

Further, a conceivable range of fc may be limited based on the system band of each cell such that the system band of the cell that has a narrow system bandwidth is included in the system band of the cell that has a wide system bandwidth. For example, the system bandwidth of the cell #1 is 20 MHz. The system band of the cell #2 is 5 MHz. The bandwidth of the partial frequency domain to which the signals that cannot be scheduled are mapped is 1.08 MHz, which is the center of the system band. In this case, the offset fc of the center frequency (carrier) of the cell #2 with respect to the cell #1 is such that $-7.5$ MHz$\leq$fc$\leq-3.58$ MHz or $3.58$ MHz$\leq$fd$\leq7.5$ MHz.

The method in the case of the first embodiment, the method in the case of the first modification of the first embodiment or the method in the case of the second modification of the first embodiment, which is disclosed in the present modification, may be used as the method of preventing the signals that are mapped over the entire frequency band of the cell from overlapping with each other between the cells, which is disclosed in the third modification of the first embodiment. The offset described in the third modification of the first embodiment is provided as described above, whereby it is possible to prevent the physical resources to which the signals that cannot be scheduled are mapped from overlapping with each other between cells. This enables to eliminate the interference of the signals between cells.

It is possible to prevent an offset setting mistake by setting the offset, which is provided between cells, in a conceivable range of the offsets of the physical resources to which the signals that cannot be scheduled are mapped, the transmission timings of the physical resources and the frequencies to which the signals that cannot be scheduled are mapped, which is disclosed in the present embodiment. In other words, it is possible to ensure that the physical resources to which the signals that cannot be scheduled are prevented from overlapping with each other between cells without fail by prohibiting setting of the offset to the value different from that in a conceivable range of the offset. This allows the reliable elimination of the interference of signals between cells. In addition, the offset value is selected in a range of conceivable values, and accordingly the selection range is narrowed, which requires a small amount of information required in the case of selection. As a result, the memory in a UE or a base station is reduced, leading to an effect that the configuration of a control circuit is simplified.

Third Embodiment

The interference of downlink signals is a problem between the cells where handover cannot be made or with the cell operated in a closed access mode. As the solution thereto, the first embodiment discloses that the radio resources of signals that cannot be scheduled are prevented from overlapping with each other between the cells. As the method therefor, it is disclosed that synchronization is achieved between the cells or the resources of the signals that cannot be scheduled are shifted (an offset is provided) between the cells. Further, the second embodiment discloses the value used as the offset amount so as to solve the problem of the interference between downlink cells. The third embodiment discloses the method of determining the offset amount (or may be a frame configuration). Herein, the cell that has already been installed is referred to as a "first cell". A cell to be newly installed, that is, a cell to be installed after the installation of the first cell is referred to as a "second cell". The eNodeB, NodeB, macro cell, HeNB, HNB, pico cell, micro cell and CSG cell are conceivable as specific examples of the first cell and second cell.

Figure 27:
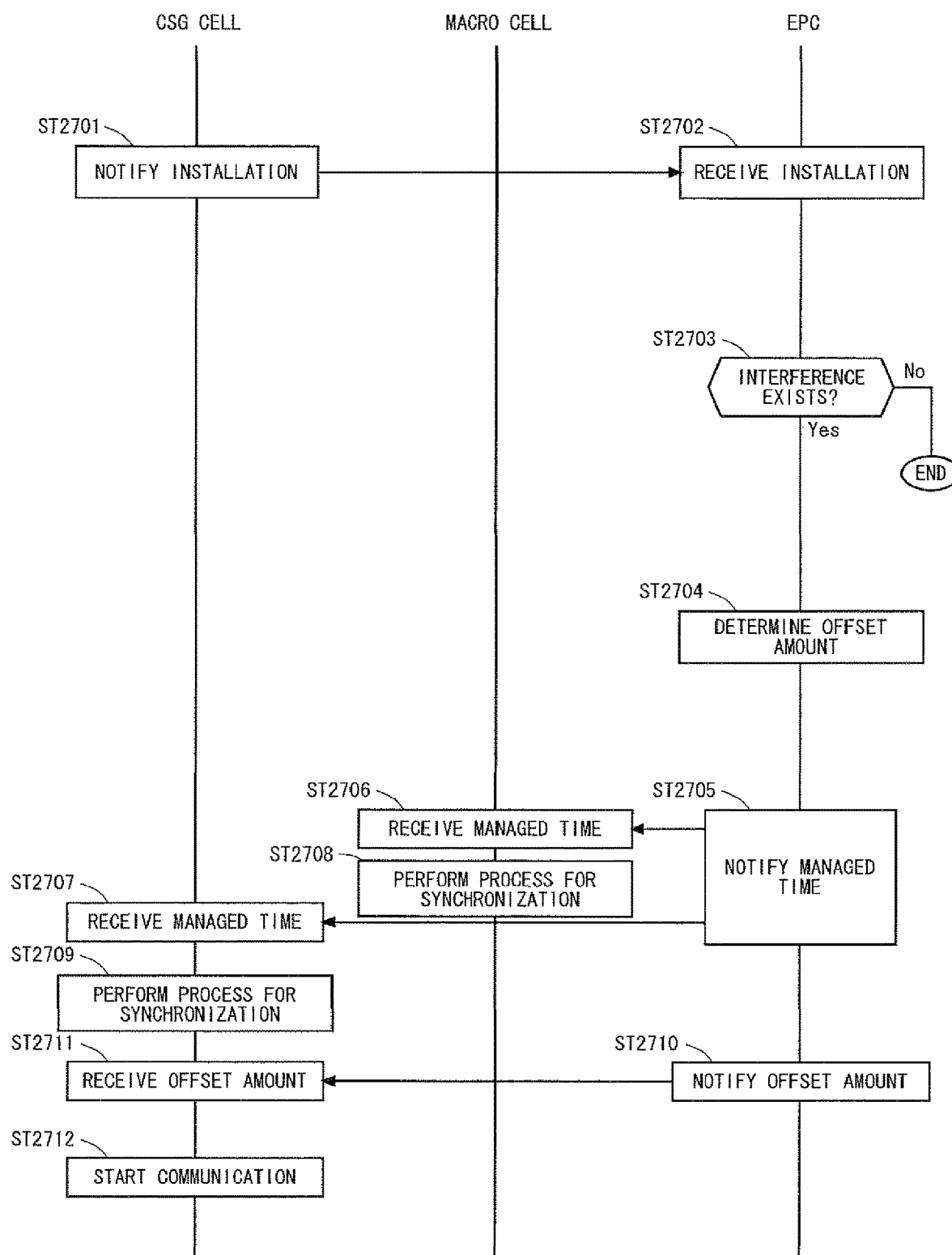
FIG. 27 is a sequence diagram until an offset amount of a mobile communication system is determined in a third embodiment.

The method of determining an offset amount (or may be a frame configuration) by an entity of the network is disclosed. The evolved packet core (EPC), serving gateway (S-GW), access gateway (aGW) and mobility management entity (MME) are conceivable as specific examples of the entity of the network that determines an offset amount in the LTE system. FIG. 27 shows an example of a sequence until the offset amount of a mobile communication system is determined in the third embodiment. Description is given in FIG. 27 with the use of the LTE system as an example. Further, description is given using a macro cell as the first cell, a CSG cell as the second cell, and an EPC as the entity of the network that determines an offset amount. In a case where a CSG is newly installed, the network (EPC in FIG. 27) is notified that the cell has been installed (Step ST2701). The information for identifying the own cell, as a specific example thereof, PCI or GCI may be notified in notifying the installation. The second cell notifies the information for identifying the own cell, which facilitates the judgment or notification as to what cell has been newly installed in the process after that. In Step ST2702, the EPC receives the notification of the installation from the CSG cell. Specific examples of the notification of installation include the location information of the CSG cell. The location information can be obtained by the CSG cell with the use of a global positioning system (GPS) that is the existing technology. The S1 interface is conceivable as a specific example of the notification method from the CSG cell to the EPC. It is possible to achieve an effect that a mobile communication system is prevented from becoming intricate by notifying the location information as new information by means of the S1 interface (Non-Patent Document 9).

Further, it is conceivable that the location information may be newly added as a new element to an information element (IE) of the message "S1 SETUP REQUEST" of the S1 interface. The following effects can be achieved in a case where the location information is the information element of "S1 SETUP REQUEST". Currently, it is aimed in 3GPP that a message for exchanging the data required for the eNodeB and the entity of the network to use the S1 interface properly is mapped to "S1 SETUP REQUEST". This enables to perform initial data exchange in the same message in a case where a cell is newly installed as a mobile communication system, that is, this eliminates the need for newly providing a message, and accordingly it is possible to achieve the effects that the operation of a mobile communication system is prevented from becoming intricate and that a control delay is prevented. Further, it is conceivable that the location information may be newly added as a new element to the information element of the "ENB CONFIGURATION UPDATE" message of the S1 interface. In a case where the location information is the information element of "ENB CONFIGURATION UPDATE", the following effects can be achieved. Currently, it is aimed in 3GPP that the data required for update of a configuration of a base station is mapped in "ENB CONFIGURATION UPDATE". This enables to update the configuration of a base station in a case where a cell is newly installed as a mobile communication system in the same message, that is, this eliminates the need for providing a new message, leading to effects that the operation of a mobile communication system is prevented from becoming intricate and that a control delay is prevented.

In Step ST2703, the EPC determines whether or not the first cell that interferes with the CSG cell exists upon the installation of the CSG cell. The method of notifying installation and determination as to whether there is a cell that interferes with the CSG cell are performed, which is disclosed in the present embodiment, whereby it is possible to selectively determine the cell to which an offset is provided. It is possible to select the cell that requires setting of an offset amount or synchronization. In a case where the first cell that interferes with the CSG cell exists, the EPC proceeds to Step ST2704, or ends the process when it does not exist. Alternatively, in a case where such a first cell does not exist, the EPC may notify the information indicating "ignore", "none" or "0" as an offset amount in Step ST2710. As a result, it is possible to achieve the effect that the process is unified irrespective of the results of the judgment in Step ST2703. In addition, the second cell receives any information regarding the offset amount from the network irrespective of the results of the judgment in Step ST2703. Accordingly, in a case where the CSG cell cannot receive the offset amount, it is possible to recognize an error of communicating the notification of installation from the CSG cell to the EPC or an error of communicating an offset amount from the EPC to the CSG cell. This enables to achieve the effect that a communication error can be detected at an early stage. As a specific example of the method of judging whether or not the first cell that interferes with the CSG cell exists, it is conceivable that judgment may be made as to whether or not the CSG cell has been installed within the coverage area of the already installed cell (first cell). As a specific example, it is judged whether or not the CSG cell has been installed within the coverage area of the macro cell. The EPC is capable of using the information received in Step ST2702 for that judgment. As a specific example, the location information of the CSG cell can be used.

In Step ST2704, the EPC performs the process such that the resources of the signals that cannot be scheduled are prevented from overlapping with each other between cells. As a specific example, the resources of the signals that cannot be scheduled are shifted from each other between cells (an offset amount is provided). The EPC determines the offset amount. The configuration so as to prevent the resources of the signals that cannot be scheduled from overlapping with each other between cells allows the use of the methods of the first embodiment including the modifications. Further, as to the offset amount, the methods of the second embodiment including the modifications can be used. Further, the offset amount may be set to the same value in the base stations within a multimedia broadcast multicast service single frequency network (MBSFN) synchronization area. Further, the offset amount may be set to the same value in the base stations within MBSFN areas. In a case where the offset amount is set to the same value in the base stations within the MBSFN synchronization area or MBSFN area, the following effects can be achieved. The UEs that receive MBMS data are required to transmit the MBSFN subframes at the same timing for improving the received quality. When the MBSFN subframes are controlled in order to be at the same timing, it is possible to achieve the effect that the process of the network is simplified if the offset amounts are identical to each other. Further, in a case where a plurality of antennas are combined to achieve multiple input multiple output (MIMO) that is the radio technology for broadening the band for data transmission/reception with the use of an antenna of another cell, the offset values may be set to the same value in the plurality of cells. In this case, the following effects can be achieved. In order to broaden the band for transmission/reception to/from UEs in a plurality of cells, it is required to transmit data to the UEs at the same timing. When the transmission timings to UEs are controlled to be identical to each other, it is possible to achieve the effect that the process of the network is simplified if the offset amounts are identical to each other.

In Step ST2705, the EPC performs synchronization. "Synchronization" in this case refers to using the time managed by the network in the first cell and the second cell. Alternatively, a timing may be derived from the time managed by the network in the first cell and the second cell. Specific examples of the timing include the beginnings of the radio frames used in the first cell and the second cell and the system frame number (SFN). As a specific example of the synchronization in Step ST2705, the EPC notifies the macro cell and the CSG cell of the time managed by the EPC. Through the synchronization performed in Step ST2705, it is possible to achieve the effect that the second cell can recognize the timing (specific examples thereof include the transmission timing and SFN) used in the first cell. As a result of the second cell recognizing the timing used in the first cell, it is possible to achieve an effect that the times (timings) of the physical resources can be controlled so as not to overlap with each other, which is disclosed in the first embodiment. Specific examples of the method of notifying the macro cell and the CSG cell from the EPC include the S1 interface. In addition, it is conceivable that the EPC may notify the macro cell and the CSG cell of the time using a layer 1 of the S1 interface.

Further, it is conceivable that the time may be newly added to the information element in the "S1 SETUP RESPONSE" message of the S1 interface as a new element. In the case where the time is the information element of "S1 SETUP RESPONSE", the following effects can be achieved. Currently, it is aimed in 3GPP that a message for exchanging the data required for the eNodeB and the entity of the network to properly use the S1 interface is mapped in "S1 SETUP RESPONSE". This enables to perform initial data exchange in the same message in a case where a cell is newly installed as a mobile communication system, that is, this does not require to newly provide a message, and accordingly effects that the operation of a mobile communication system is prevented from becoming intricate and that a control delay is prevented can be achieved. Further, it is conceivable that the time may be newly added as a new element to the information element of the "ENB CONFIGURATION UPDATE ACKNOWLEDGE" message of the S1 interface. In a case where the time is the information element of "ENB CONFIGURATION UPDATE ACKNOWLEDGE", it is possible to achieve the following effects. Currently, it is aimed in 3GPP that "ENB CONFIGURATION UPDATE ACKNOWLEDGE" is used as a response to "ENB CONFIGURATION UPDATE" to which the data required for update of a configuration of a base station is mapped. This enables a response of the network to the update of the configuration of a base station in a case where a cell is newly installed as a mobile communication system in the same message, that is, this does not require to newly provide a message, and accordingly it is possible to achieve effects that the operation of a mobile communication system is prevented from becoming intricate and that a control delay is prevented.

Further, it is conceivable that the time may be newly added as a new element to the information element in the "MME CONFIGURATION UPDATE" message of the S1 interface. In a case where the time is the information element of "MME CONFIGURATION UPDATE", the following effects can be achieved. Currently, it is aimed in 3GPP that the data required for update of a configuration of the MME is mapped to "MME CONFIGURATION UPDATE". This enables to update of the network in the same message as a mobile communication system, that is, this does not require to newly provide a message, and accordingly effects that the operation of a mobile communication system is prevented from becoming intricate and that a control delay is prevented can be achieved.

In Step ST2706, the macro cell receives the time managed by the EPC, which has been notified from the EPC. In Step ST2707, the CSG cell receives the time managed by the EPC, which has been notified from the EPC. In Step ST2708, the macro cell achieves synchronization using the time managed by the network, which has been received in Step ST2706. As a specific example of synchronization, the timing (specific examples thereof include transmission timing and SFN) used in the first cell is derived by the same method as that of the network using the time managed by the network. Further, the SFN used in the macro cell is derived from the time managed by the network. Expression (1) can be used as a specific example of derivation.

$$SFN=(time)\bmod(cycle\ of\ SFN) \quad\quad \text{Expression (1)}$$

In Expression (1), (time) represents the time managed by the network, which has been received in Step ST2706. (cycle of SFN) is a cycle in which the SFN is repeated. The cycle may be a value defined in a static manner or may be notified to the macro cell and the CSG cell from the network as a semi-static value. In Step ST2709, the CSG cell performs the process for synchronization with the use of the time managed by the network, which has been received in Step ST2707. A specific example thereof is similar to that of Step ST2708, and thus description thereof is omitted. The following effects can be achieved as a result of deriving the timings (specific examples thereof include transmission timing and SFN) used in the first cell and the second cell by the same method as that of the network with the use of the same time managed by the network in Step ST2708 and Step ST2709. There can be achieved an effect that the second cell can recognize the timing (specific examples thereof include transmission timing and SFN) used in the first cell. An effect that control can be made so as to prevent the times (timings) of the physical resources, which is disclosed in the first embodiment, is achieved as a result of recognizing the timing used in the first cell by the second cell. In Step ST2710, the EPC notifies the CSG cell of the offset amount determined in Step ST2704. The method described in Step ST2705 can be used as the notification method. Step ST2705 and Step ST2710 may be performed at the same time. In addition, they may be performed in an appropriate order. In Step ST2711, the CSG cell receives an offset amount from the EPC. In Step ST2712, the CSG cell starts communication in accordance with the offset amount received in Step ST2711, that is, at the timing shifted by an offset amount. Alternatively, the CSG cell starts communication in accordance with the frame configuration received in Step ST2711.

According to the third embodiment, in a case where a cell is newly installed, it is possible to perform operation so as to prevent the resources of the signals that cannot be scheduled from overlapping with those of the already installed cell. As a result, it is possible to achieve an effect that the interference between downlink cells can be alleviated. Further, in a case where a plurality of antennas are combined to achieve multiple input multiple output (MIMO) that is the radio technology for broadening the band of data transmission/reception with the use of an antenna of another cell, which is described above, the judgement, which is in Step ST2701 to Step ST2703, on whether or not the plurality of cells include the cell that causes interfere may be performed. As a result, the following effects can be achieved. The cell to which an offset is provided is selectively determined, whereby it is possible to provide the offset to the cell required to be operated by MIMO. Further, synchronization from Step ST2705 to Step ST2709 may be performed. Accordingly, the following effects can be achieved. This enables to achieve an effect that the timings (specific examples thereof include transmission timing and SFN) used in a plurality of cells can be respectively recognized. It is possible to derive the timings (specific examples thereof include transmission timing and SFN) used in a plurality of cells with the use of the same time managed by the network. This leads to an effect that, when the transmission timings to the UEs are controlled to be at the same timing, the process of the network is simplified if the timings are identical to each other.

First Modification

The following problem occurs by the synchronization described in the third embodiment. In some cases, the already installed cell is required to perform synchronization upon installation of a new cell. In a case where the already installed cell performs synchronization, the timing (specific examples thereof include the beginning of a radio frame and SFN) used in the cell needs to be derived from the time managed by the network and used in communication with the cell. In a case where the timing varies between before and after the performance of synchronization, there arises a problem that the communication between the cell and UEs being served by the cell is interrupted. The first modification discloses the method different from the process for synchronization disclosed in the third embodiment for solving the above-mentioned problem.

Figure 28:
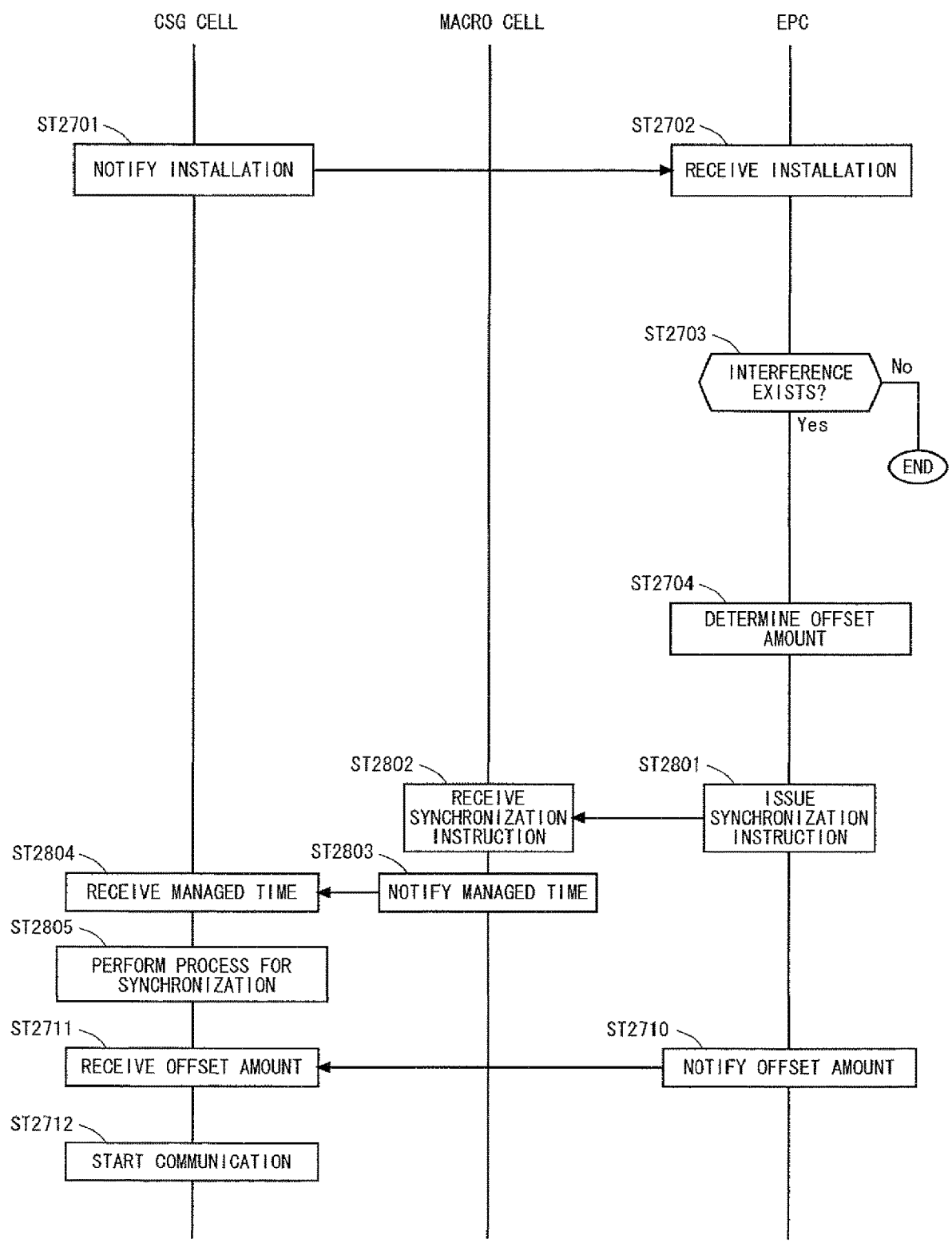
FIG. 28 is a sequence diagram until an offset amount of a mobile communication system is determined in a first modification of the third embodiment.

FIG. 28 shows an example of the sequence until the offset amount of a mobile communication system is determined in the first modification. The same or equivalent processes are executed in the same steps as those of FIG. 27 in FIG. 28, and thus description thereof is omitted. In Step ST2801 of FIG. 28, the EPC transmits a synchronization instruction to the macro cell. The method described in Step ST2705 can be used as the method of notifying a synchronization instruction. The synchronization instruction may include the information for identifying the second cell, as a specific example, the PCI and GCI. As a result of the information for identifying the second cell being included, it is possible to identify a cell on which the first cell has to execute Step ST2803. In Step ST2802, the macro cell receives the synchronization instruction from the EPC. "Synchronization" in this case refers to the use of the time managed by the first cell by the second cell. Alternatively, certain timing may be derived from the time managed by the first cell by the second cell. The beginning of a radio frame used in the second cell, the system frame number (SFN) and the like are conceivable as specific examples of certain timing. In Step ST2803, the macro cell notifies the CSG cell of the time managed by the macro cell. An X2 interface is conceivable as a specific example of the method of notifying the CSG cell from the macro cell. There can be achieved an effect that a mobile communication system is prevented from becoming intricate by notification of the time managed by the macro cell, which is new information, using the X2 interface (Non-Patent Document 10) that is an existing interface.

Further, it is conceivable that the time may be newly added as a new element to the information elements in "X2 SETUP REQUEST" and "X2 SETUP RESPONSE" messages of the X2 interface. The following effects can be achieved in a case where the time is the information element of "X2 SETUP REQUEST" and "X2 SETUP RESPONSE". Currently, it is aimed in 3GPP that the message required for exchanging the data required for properly using the X2 interface by the eNodeB is mapped to "X2 SETUP REQUEST" and "X2 SETUP RESPONSE". This enables to perform initial data exchange in the same message in a case where a cell is newly installed as a mobile communication system, that is, this does not require to provide a new message, and thus effects that the operation of a mobile communication system is prevented from becoming intricate and that a control delay is prevented can be achieved. Further, it is conceivable that the time may be newly added as a new element to the information elements of "ENB CONFIGURATION UPDATE" and "ENB CONFIGURATION UPDATE ACKNOWLEDGE" messages of the X2 interface. The followings effects can be achieved in a case where the time is the information element of "ENB CONFIGURATION UPDATE" and "ENB CONFIGURATION UPDATE ACKNOWLEDGE". Currently, it is aimed in 3GPP that the data required for update of a configuration of a base station is mapped in "ENB CONFIGURATION UPDATE" and "ENB CONFIGURATION UPDATE ACKNOWLEDGE". This enables to update, in the same message, the configuration of a base station in a case where a new cell is provided as a mobile communication system, that is, this does not require to provide a new message, and thus effects that the operation of a mobile communication system is prevented from becoming intricate and that a control delay is prevented can be achieved.

Further, the method of notifying the "time" from the macro cell to the EPC and then notifying the "time" from the EPC to the CSG cell is conceivable as another specific example of the notification method from the macro cell to the CSG cell. In this case, the method described in Step ST2701 can be used as a specific example of the notification method from the macro cell to the EPC. Further, the method described in Step ST2705 can be used as the notification method from the EPC to the CSG cell. In Step ST2804, the CSG cell receives the time managed by the macro cell from the macro cell. In Step ST2805, the CSG cell performs the process for synchronization with the use of the time managed by the macro cell, which has been received in Step ST2804. As a specific example of synchronization, the timing (specific examples thereof include transmission timing and SFN) used in the CSG cell is derived by the same method as that of the first cell with the use of the time managed by the macro cell. Further, the SFN used in the CSG cell is derived from the time managed by the macro. A method similar to that of Step ST2708 of the third embodiment can be used as a specific example of derivation.

According to the first modification, the following effects can be achieved in addition to the effects of the third embodiment. The timing used in the second cell can be derived with the use of the time managed by the first cell. That is, it is not required to change the timing of the first cell as a result of synchronization. Even in a case where interference occurs upon installation of the second cell, it is possible to achieve the effect that the interference between downlink cells can be alleviated without interrupting communication in the first cell. Further, in a case where the above-mentioned multiple input multiple output (MIMO), which is a radio technology for broadening the band of data transmission/reception through combination of a plurality of antennas, is achieved with the use of an antenna of another cell, the judgment in Step ST2701 to Step ST2703 as to whether or not a cell that causes interfere is included in the plurality of cells. As a result, the following effects can be achieved. The cell to which an offset is provided is selectively determined, which enables to provide the offset to the cell that requires the operation of MIMO. Further, synchronization in Step ST2801 to Step ST2805 may be performed on the plurality of cells. As a result, the following effects can be achieved. It is possible to achieve the effect that a plurality of cells can recognize the timings (specific examples thereof include transmission timing and SFN) used therein each other. It is possible to derive the timings (specific examples thereof include transmission timing and SFN) used in a plurality of cells with the use of the same time managed by the network. This enables to achieve the effect that the process of the network is simplified in controlling the timings of transmission to UEs to be at the same timing, if the timings are identical to each other.

Second Modification

Figure 29:
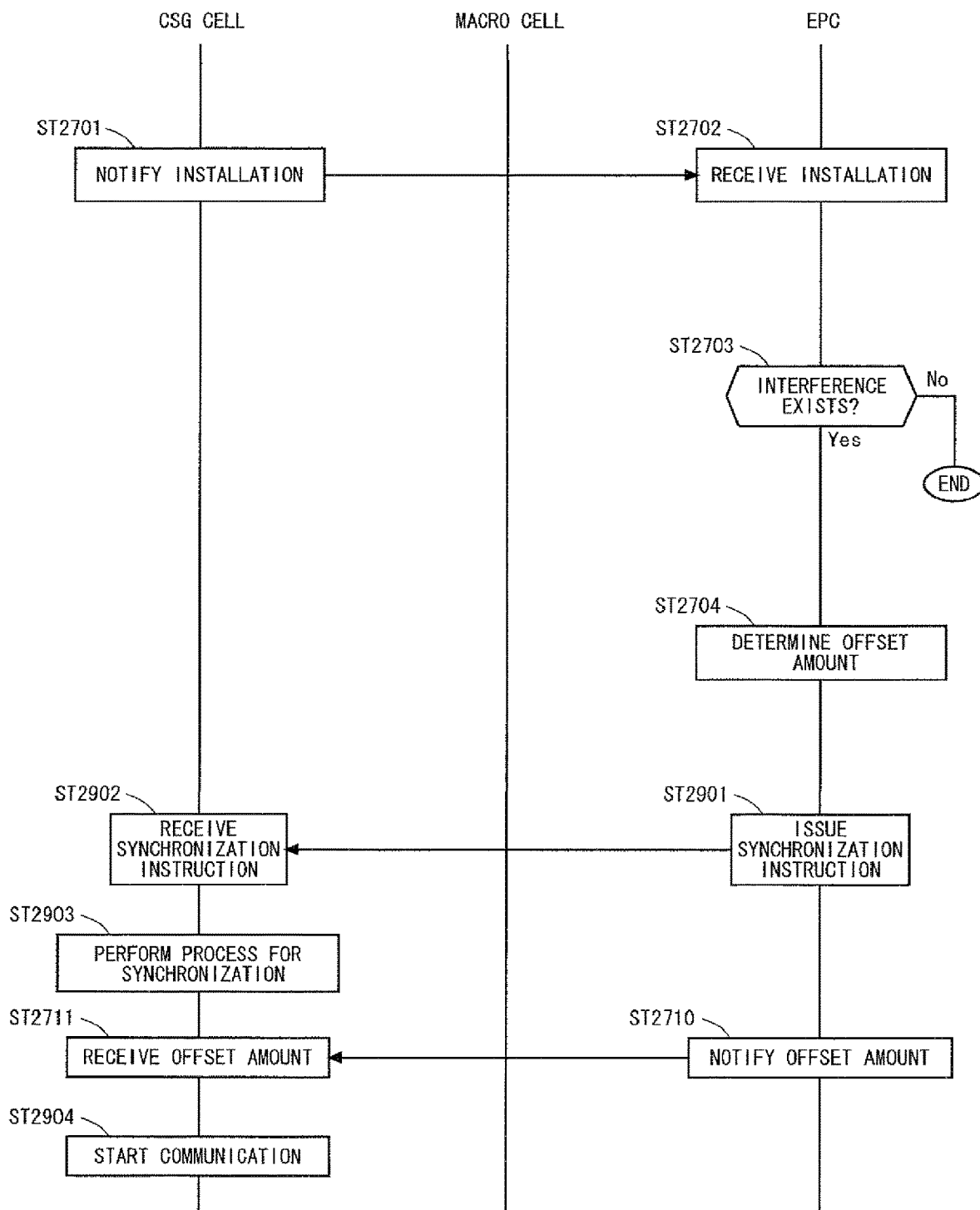
FIG. 29 is a sequence diagram until an offset amount of a mobile communication system is determined in a second modification of the third embodiment.

The second modification describes the method of performing the process for synchronization by the second cell and discloses another solution to a problem similar to that of the first modification. FIG. 29 shows an example of the sequence until the offset amount of a mobile communication system is determined in the second modification. The same or equivalent processes are executed in the same steps as those of FIG. 27 in FIG. 29, and thus description thereof is omitted. In Step ST2901, the EPC transmits a synchronization instruction to the CSG cell. The method described in Step ST2705 can be used as the method of notifying a synchronization instruction. In Step ST2902, the CSG cell receives the synchronization instruction from the EPC. "Synchronization" in this case includes recognizing a certain timing of the first cell by the second cell. The beginning of a radio frame used in the first cell, the system frame number (SFN) and the like are conceivable as specific examples of certain timing. In Step ST2903, the CSG cell performs the process for synchronization. A certain timing (such as radio frame and SFN) of the macro cell is recognized as a specific example of synchronization. As a specific example of recognizing a timing, the CSG cell performs a process similar to cell search of a UE. Specifically, the slot timing and radio frame timing are recognized with the use of the primary synchronization signal (P-SS) and secondary synchronization signal (S-SS) transmitted from the macro cell as in Step ST1201 of FIG. 12. Further, the BCCH on the PBCH may be received and the master information block (MIB) information mapped on the BCCH may be obtained, to thereby obtain the SFN in the information of the MIB.

In Step ST2904, the CSG cell starts communication in accordance with the offset amount received in Step ST2711, that is, by shifting the timing by the offset amount from the timing of the macro cell that has been obtained in Step ST2903. Alternatively, the CSG cell starts communication in accordance with the frame configuration received in Step ST2711.

According to the second modification, it is possible to achieve the following effects in addition to the effects of the third embodiment. The second cell performs cell search, and thus it is possible to recognize the timing (radio frame or SFN) of the first cell. That is, it is not required to change the timing of the first cell by synchronization. Even in a case where interference occurs as a result of installation of the second cell, it is possible to achieve the effect that the interference between downlink cells can be alleviated without interrupting communication in the first cell. Further, in a case where the above-mentioned multiple input multiple output (MIMO), which is a radio technology for broadening the band of data transmission/reception in combination with a plurality of antennas, is achieved with the use of an antenna of another cell, the judgment in Step ST2701 to Step ST2703 as to whether or not the plurality of cells include the cell that causes interfere may be performed. As a result, the following effects can be achieved. The cell to which an offset is provided is selectively determined, whereby it is possible to provide the offset to the cell that requires to be operated by MIMO. Further, synchronization in Step ST2901 to Step S2903 may be performed on the plurality of cells. As a result, the following effects can be achieved. It is possible to achieve the effect that a plurality of cells can recognize the timings (specific examples thereof include transmission timing and SFN) used therein each other. It is possible to derive the timings (specific examples thereof include transmission timing and SFN) used in a plurality of cells with the use of the same time managed by the network. This enables to achieve the effect that the process of the network is simplified in controlling the timings of transmission to UEs to the same timing, if the timings are identical to each other.

Third Modification

The "location information" is used as a specific example of the method of judging whether or not the first cell that causes interference exists in Step ST2703 of the third embodiment. The third modification discloses another method of judging whether or not the first cell that causes interference exists. As a specific example of the method of judging whether or not the first cell that causes interference exists, it is conceivable that judgment may be made as to whether or not the CSG cell has been installed within the coverage area of the already installed cell (first cell). As a specific example, whether or not the CSG cell has been installed within the coverage area of the macro cell is judged. It is conceivable that the EPC will use, in the judgment, the situation of neighboring cells that has been measured by the CSG cell.

Figure 30:
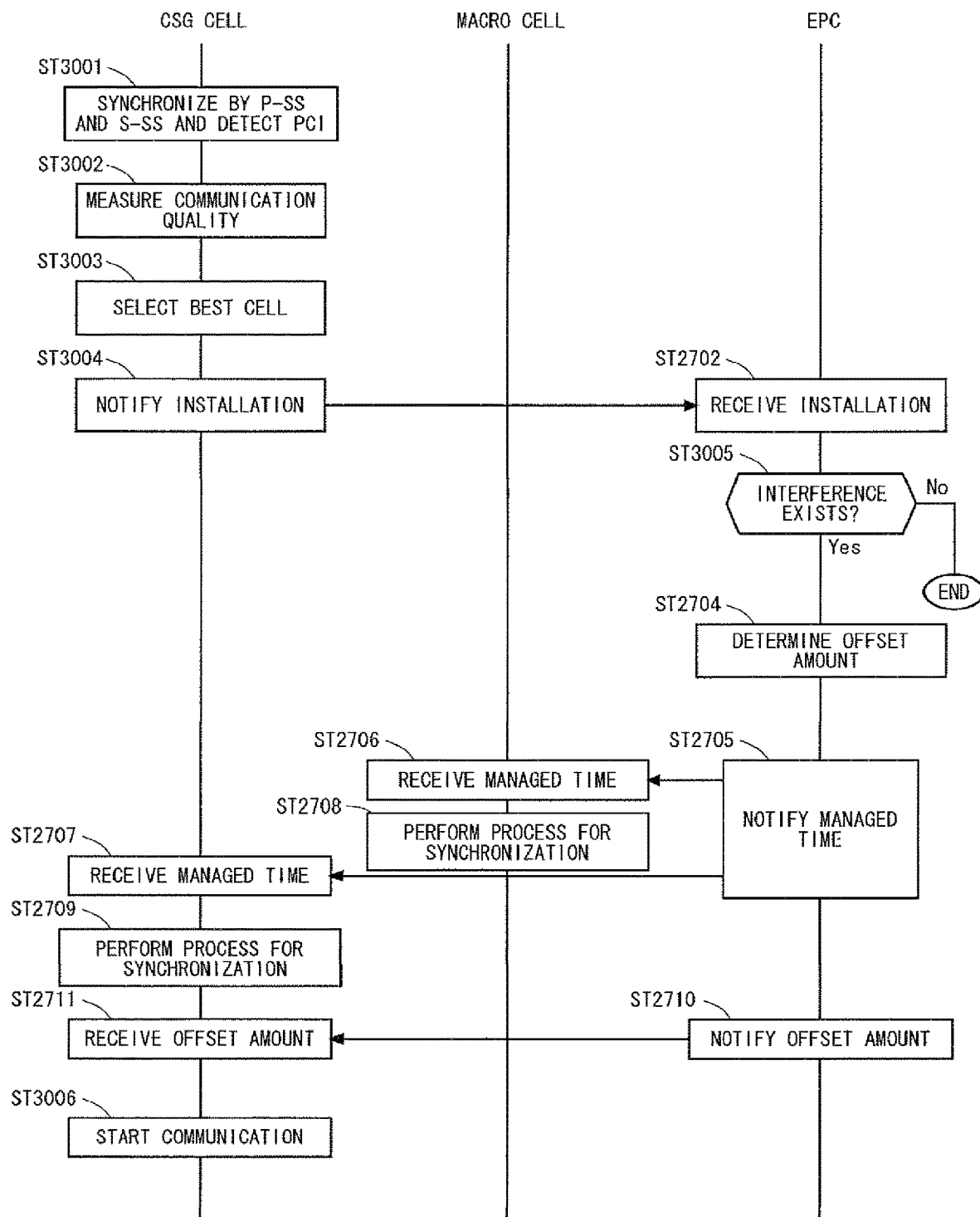
FIG. 30 is a sequence diagram until an offset amount of a mobile communication system is determined in a third modification of the third embodiment.

FIG. 30 shows an example of the sequence until the offset amount (or may be a frame configuration) of a mobile communication system is determined in the third modification. The same or equivalent processes are executed in the same steps as those of FIG. 27 in FIG. 30, and thus description thereof is omitted. In Step ST3001, the CSG cell performs synchronization between the slot timing and frame timing by a primary synchronization signal (P-SS) and a secondary synchronization signal (S-SS) transmitted from a nearby base station. Further, the CSG cell detects (identifies) the PCIs of the synchronized cells. In Step ST3002, the CSG cell measures the communication quality of each base station of the synchronized cells (neighboring cells). Specific examples of communication quality include (1) reference signal received power (RSRP) measured by detecting a cell specific reference signal (RS) transmitted for each cell, (2) ratio of strength (reference signal received quality (RSRQ)) between the received power of the cell specific reference signal RS transmitted for each cell and the received power at the carrier frequency of the system, (3) received signal strength (received signal strength indicator (RSSI)), (4) ratio between a desired signal and an interference signal (signal interference ratio (SIR)), (5) received power of cell specific reference signal RS (DL RS TX power) transmitted for each cell in a resource element (RE), and (6) interference amount.

In Step ST3003, the CSG cell selects the cell (best cell) having the best communication quality from one or more cells detected in Step ST3001 and Step ST3002. Specifically, the following are conceivable as the best cell: (1) the cell having the largest received power through detection of the cell specific reference signal (RS) transmitted for each cell: (2) the cell having the largest strength ratio between the received power of the cell specific reference signal RS transmitted for each cell and the received power at the carrier frequency of the system; (3) the cell having the largest received signal strength; (4) the cell having the largest ratio between a desired signal and an interference signal; (5) the cell having the largest received power of the cell specific reference signal RS transmitted for each cell in a resource element (RE); and (6) the cell having the smallest interference amount.

In a case where a CSG cell is newly installed, the network (EPC in FIG. 30) is notified that the cell has been installed (Step ST3004). When the installation is notified, the information for identifying the own cell, as a specific example, PCI or GCI may be notified. The second cell notifies the information for identifying the own cell, whereby what cell is the newly installed cell is judged or notified easily in the process thereafter. The situation of neighboring cells that has been measured in Step ST3001 to Step ST3003 is conceivable as a specific example of the installation. The method described in Step ST2701 can be used as the notification method. Further, the PCI (or GCI) of neighboring cells, the communication quality (specific examples of communication quality are as described above) of neighboring cells, the timing of neighboring cells and the like are conceivable as specific examples of the situation of neighboring cells. Further, in order to notify the timing of neighboring cells, a reference cell may be selected from neighboring cells, and a timing offset between the reference cell and the neighboring cells other than the reference cell may be notified. The best cell is conceivable as a specific example of the reference cell. The radio frame, SFN and the like are conceivable as specific examples of timing. In order to notify the network of the reference cell, the PCI (or GCI) of the reference cell is notified.

In Step ST3005, the EPC determines whether or not the first cell that interferes with the CSG cell exists upon the installation of the CSG cell. The EPC proceeds to Step ST2704 in the case where such a first cell exists, or ends the process in a case where such a first cell does not exist. Alternatively, the information indicating "ignore", "none" or "0" may be notified as an offset amount in Step ST2710 in the case where such a first cell does not exist. As a result, there can be achieved the effect that the process is unified irrespective of the judgment results in Step ST3005. Further, the second cell receives any information regarding the offset amount from the network irrespective of the judgment results in Step ST3005. As a result, in the case where the CSG cell cannot receive the offset amount, it is possible to recognize an error of communicating the notification of installation from the CSG cell to the EPC or an error of communicating an offset amount from the EPC to the CSG cell. This enables to achieve an effect that a communication error can be realized early. As a specific example of the method of judging whether or not the first cell that causes interference exists, it is conceivable that judgment may be made as to whether or not the CSG cell has been installed within the coverage area of the already installed cell (first cell). As a specific example, it is judged whether or not the CSG cell has been installed within the coverage area of the macro cell. The EPC is capable of using the information received in Step ST2702 for the judgment. As a specific example, a situation of neighboring cells of the CSG cell can be used.

In Step ST3006, the CSG cell starts communication in accordance with the offset amount received in Step ST2711, that is, by shifting the timing by the offset amount. Alternatively, the CSG cell starts communication in accordance with the fame configuration received in Step ST2711. Still alternatively, in a case where the EPC has determined the offset amount from the timing of a reference cell in Step ST2704, the CSG cell may start communication in accordance with the offset amount received in Step ST2711, that is, by shifting the timing by the offset amount from the timing of the reference cell obtained in Step ST3001 to Step ST3003.

Further, the time when a CSG cell is newly installed is conceivable as the timing at which the communication quality of the neighboring cells of the CSG cell is measured in Step ST3002. It is conceivable that the notification of the situation of neighboring cells from the CSG cell to the EPC in Step ST3004 and the judgment by the EPC in Step ST3005 may be performed when a CSG cell is newly installed. As a result, the CSG cell does not measure the communication quality of neighboring cells after the CSG cell starts communication in Step ST3006. Therefore, the offset amount of the CSG cell is not changed in accordance with the measurement results of communication quality, after the communication of the CSG cell is started. This achieves an effect that communication with UEs being served is not interrupted, which results from an offset amount change during the operation of the CSG cell or from the measurements of the communication quality of neighboring cells. Further, as to the timing at which the communication quality of neighboring cells of the CSG cell is measured in Step ST3002, it is conceivable that measurements may be performed periodically. As to the notification of the situation of neighboring cells from the CSG cell to the EPC in Step ST3004 and the judgment by the EPC in Step ST3005, it is conceivable that those may be performed periodically. After the CSG cell starts communication, in some cases, the situation of neighboring cells changes and the problem that the radio resources of signals that cannot be scheduled overlap with each other between cells occurs again, which causes downlink interference between the cells. The CSG cell performs measurement and notification periodically and the EPC performs judgment periodically, which enables the network to recognize the situation of neighboring cells even in a case where the situation of neighboring cells changes after the CSG cell starts communication in Step ST3006. As a result, the operation may be performed so as to prevent the radio resources of signals that cannot be scheduled from overlapping with each other between cells even after the CSG cell starts communication. It is possible to obtain a flexible mobile communication system.

Further, it is conceivable that the timing at which the communication quality of neighboring cells of the CSG cell is measured in Step ST3002 may be in a case where the situation of neighboring cells changes. It is conceivable that the notification of the situation of neighboring cells from the CSG cell to the EPC cell in Step ST3004 and the judgment by the EPC in Step ST3005 will be performed in a case where the situation of neighboring cells has changed. As in the case where the measurement and notification by the CSG cell and the judgment by the EPC are performed periodically, it is possible to obtain a flexible mobile communication system. Further, the measurement and notification by the CSG cell and the judgment by the EPC are performed only in the case where the situation of neighboring cells has changed, whereby it is also possible to achieve effects of reductions in load and power consumption of the CSG cell and the EPC. Note that it is conceivable that whether or not the situation of neighboring cells has changed will be notified from a newly installed cell or EPC to the CSG cell with the use of the S1 interface and X2 interface in a case where a new cell is installed in the vicinity of the CSG cell. The third modification can be used in combination with the third embodiment. The third modification can be used in combination with the first modification. Alternatively, the third modification can be used in combination with the second modification.

According to the third modification, it is possible to achieve the following effects in addition to the effects of the third embodiment. Whether or not the first cell that causes interference exists is judged based on the location information of the second cell in the third embodiment. Even in a case where it is judged based on the location information that the second cell is installed outside the coverage area of the first cell, there is also conceivable a case where the second cell is within the coverage area of the first cell due to the reflection from a building or the like in the actual communication situation. In the third modification, whether or not the first cell that causes interference exists is judged based on the situation of neighboring cells that has been actually measured by the second cell. Therefore, it is possible to achieve an effect that the judgment, which reflects the actual communication situation more compared with the third embodiment, can be performed.

Fourth Modification

Figure 31:
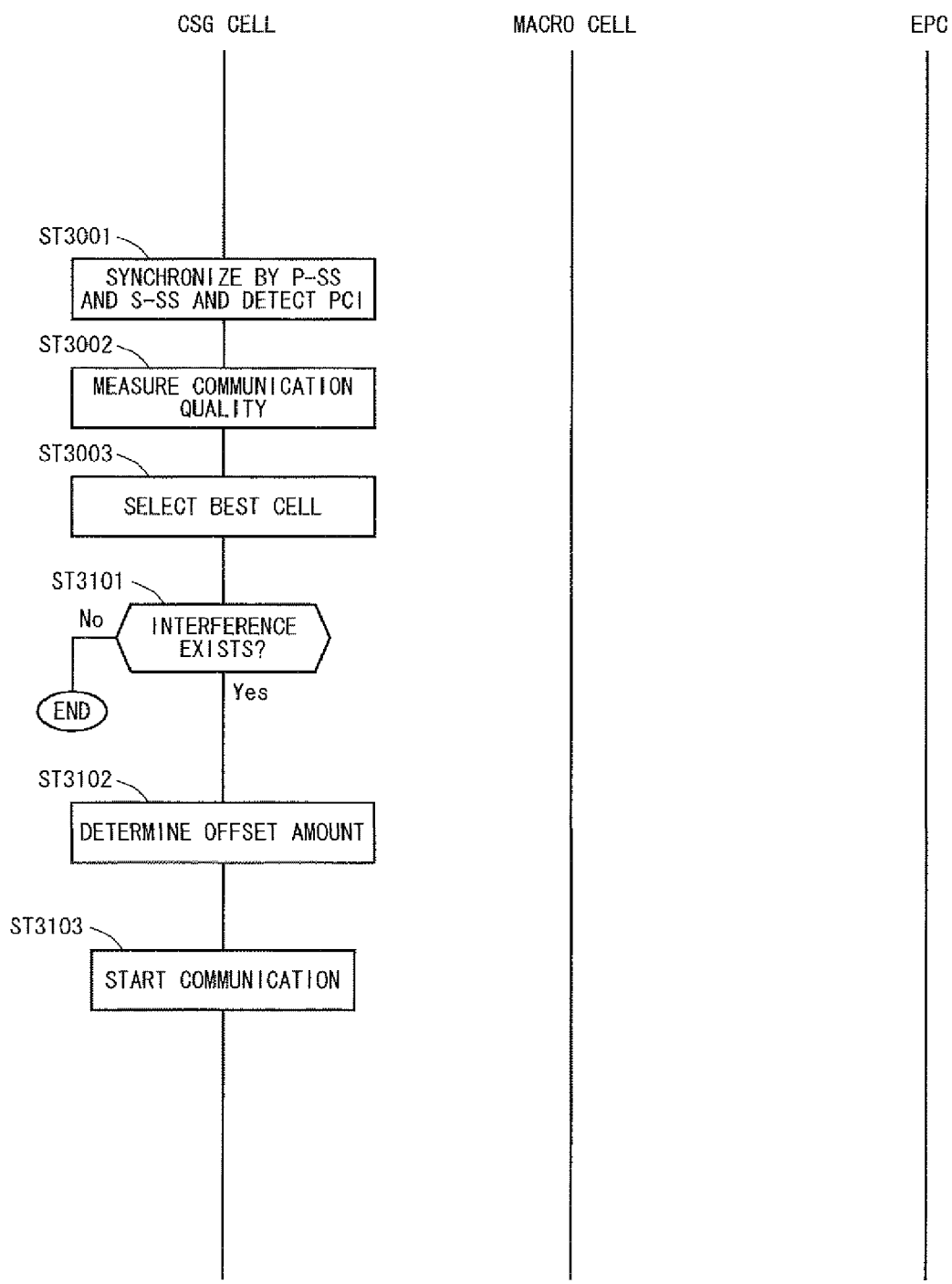
FIG. 31 is a sequence diagram until an offset amount of a mobile communication system is determined in a fourth modification of the third embodiment.

The fourth modification discloses the method of determining an offset amount by the second cell as the method of determining an offset amount different from that of the third embodiment. As specific examples of the second cell that determines an offset amount in the LTE system, eNodeB, NodeB, macro cell, HeNB, HNB, pico cell, micro cell, CSG cell and the like are conceivable. FIG. 31 shows an example of the sequence until the offset amount (or may be a frame configuration) of a mobile communication system is determined in the fourth modification. The same or equivalent processes are executed in the same steps as those of FIG. 30 in FIG. 31, and thus description thereof is omitted. In Step ST3101, the CSG judges whether or not the first cell that causes interference exists as a result of installation of the CSG cell. The CSG cell proceeds to Step ST3102 in a case where such a first cell exists or ends the process in the case where such a first cell does not exist. As a specific example of the method of judging whether or not the first cell that causes interference exists, it is conceivable that whether or not the CSG cell has been installed within the coverage area of the already installed cell (first cell) may be judged. As a specific example, whether or not the CSG cell has been installed within the coverage area of the macro cell is determined. The CSG is capable of using the situation of neighboring cells that has been measured in Step ST3001 and Step ST3002 for the judgment.

In Step ST3102, the CSG performs the process such that the resources of the signals that cannot be scheduled are prevented from overlapping with each other between cells. Its details are similar to those of Step ST2704, and thus its description is omitted. In Step ST3103, the CSG cell starts communication in accordance with the offset amount determined in Step ST3102, that is, by shifting the timing by the offset amount. Alternatively, the CSG cell starts communication in accordance with the frame configuration determined in Step ST3102. Still alternatively, the CSG cell may start communication in accordance with the offset amount determined in Step ST3102, that is, by shifting the timing by the offset amount from the timing of a reference cell that has been obtained in Step ST3001 to Step ST3003. Note that the description of the reference cell is similar to that of the third modification, and thus its description is omitted. Further, the process for synchronization between the CSG cell and macro cell may be performed. As a specific example of synchronization, the third embodiment, first modification and second modification can be used. Alternatively, the offset amount determined in Step ST3102 may be notified from the CSG cell to any or both of the macro cell and EPC.

According to the fourth modification, the following effects can be achieved in addition to the effects of the third embodiment. In a case where a new cell is installed, it is possible to perform the operation such that the resources of the signals that cannot be scheduled are prevented from overlapping with the already installed cell without the network and the already installed cell performing any process, which reduces interference between downlink signals. In other words, in a case where a new cell is installed, it is possible to perform the operation such that the resources of the signals that cannot be scheduled are prevented from overlapping with the already installed cell through the process of only the second cell, which reduces interference between downlink signals. As a result, an effect that a new cell can be installed while reducing interference between downlink signals can be achieved without affecting an existing mobile communication system. This achieves effects that the mobile communication system is prevented from becoming intricate and that a cell can be installed flexibly.

Fifth Modification

Figure 32:
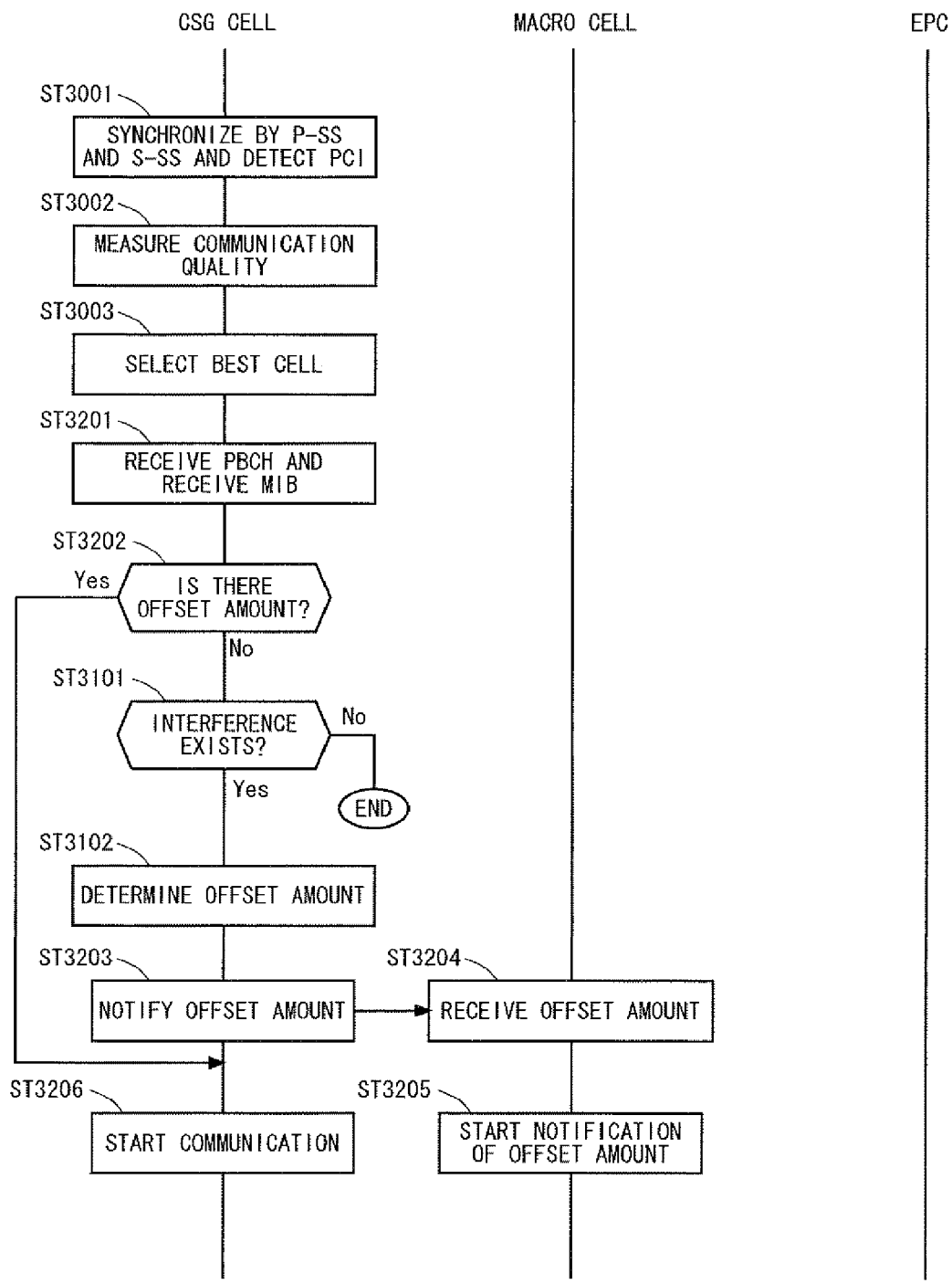
FIG. 32 is a sequence diagram until an offset amount of a mobile communication system is determined in a fifth modification of the third embodiment.

In the case where the offset amount of the second cell is determined with the use of the fourth modification, at times, different offset amounts (transmission timings) are provided even in the cells installed within the same first cell. The fifth modification discloses the method for the operation such that the second cell installed in the same first cell has the same offset amount (or may be the same frame configuration). FIG. 32 shows an example of the sequence until the offset amount (or may be a frame configuration) of a mobile communication system is determined in the fifth modification. The same or equivalent processes are executed in the same steps as those of FIG. 30 and FIG. 31 in FIG. 32, and thus description thereof is omitted. In Step ST3201, the CSG cell receives the PBCH of the first cell (may be the best cell) and obtains the BCHH that is the broadcast information. A master information block (MIB) including the cell configuration information is mapped to the BCH on the PBCH. Further, the DL-SCH of the cell may be received based on the cell configuration information of the MIB and a system information block (SIB) 1 of the broadcast information BCCH may be received. Further, the other SIB may be received based on the scheduling information of the other SIB (SIBk; k is an integer equal to or larger than 2) included in the SIB1.

In Step ST3202, the CSG cell checks whether or not the MIB or SIB1 or other SIB received in Step ST3201 includes the offset amount of a macro cell. The CSG cell moves to Step ST3101 in a case where the offset amount is not included. The CSG cell moves to Step ST3206 in a case where the offset amount is included. In Step ST3203, the CSG cell notifies the first cell of the offset amount determined in Step ST3102. The method disclosed in Step ST2803 can be used as the notification method. In notifying the offset amount, the CSG cell may notify the information for identifying the own cell, as a specific example, PCI or GCI. The second cell notifies the information for identifying the own cell, which facilitates the judgment or notification as to what cell is a cell newly installed in the process thereafter. Further, the CSG cell may notify the EPC of the offset amount. In Step ST3204, the macro cell receives the offset amount from the CSG cell. In Step ST3205, the macro cell notifies the own cell of the offset amount received in Step ST3204. The following method is conceivable as the notification method. The offset amount (or may be a frame configuration) applied by a cell to be newly installed in the cell is mapped to the broadcast information BCCH. An amount for shifting from the timing (radio frame, SFN) of the cell is conceivable as a specific example of the offset amount. In a case where the offset amount is mapped to the BCCH, the following effect can be achieved. What is mapped is the broadcast information, whereby it can be notified within the coverage area of the cell.

An offset amount is newly added as the information element of an existing master information block (MIB) in the broadcast information (Non-Patent Document 1). In the case where the offset amount is mapped to the MIB, the following effects can be achieved. For example, in the LTE communication system, the MIB is mapped to the PBCH, whereby it is possible to receive the MIB at an early stage of the search operation (a specific example thereof is Step ST1204 of FIG. 12). Therefore, it is possible to achieve the effects of prevention of a control delay and reduction of power consumption through mapping of the offset amount to the MIB information. An offset amount is newly added as the information element of an existing system information block (SIB) of the broadcast information BCCH (Non-Patent Document 11). Further, the offset amount is newly added as the information element of the SIB1. It is possible to achieve the following effects in a case where the offset amount is mapped to the SIB1. For example, in the LTE communication system, the SIB1 can be received at an early stage of search (a specific example thereof is Step ST1205 of FIG. 12). Therefore, it is possible to achieve the effects of prevention of a control delay and reduction of power consumption through mapping of the offset amount to the MIB Information. Further, the offset amount is newly added as the information element of the SIB2. The following effects can be achieved in a case where the offset amount is mapped to the SIB2. Currently, it is aimed in 3GPP that the setting of radio resources is mapped to the SIB2. The offset amount that is a parameter used in the setting of radio resources is added to the SIB2 including a similar parameter, with the result that the similar parameter can be obtained by the reception of the same system information. This enables to achieve the effects that a mobile communication system is prevented from becoming intricate and that a control delay is prevented.

In Step ST3206, the CSG cell starts communication in accordance with the offset amount determined in Step ST3102, that is, by shifting the timing by an offset amount. Alternatively, the CSG cell may start communication in accordance with the offset amount determined in Step ST3102, that is, by shifting the timing by an offset amount from the timing of the reference cell that has been obtained in Step ST3001 to Step ST3003. Note that the description of the reference cell is similar to that of the third modification, which is omitted. Alternatively, the CSG cell start communication in accordance with the offset amount received in Step ST3201, that is, by shifting the timing by an offset amount. Still alternatively, the CSG cell starts communication in accordance with the offset amount received in Step ST3201, that is, by shifting the timing by an offset amount from the timing of the reference cell that has been obtained in Step ST3001 to Step ST3003. Alternatively, the CSG cell starts communication in accordance with the frame configuration determined in Step ST3102. Still alternatively, the CSG cell starts communication in accordance with the frame configuration received in Step ST3201. According to the fifth modification, the following effects can be achieved in addition to the effects of the fourth modification. According to the fifth modification, the second cell is capable of judging whether "the offset amount applied by a cell to be newly installed in the cell" has been notified (broadcast) from the first cell and is capable of complying with the offset amount in a case where it has been notified. Accordingly, it is possible to achieve the effect that the same offset amount can be set in the second cell installed in the same first cell. Similarly in a case where multiple input multiple output (MIMO), which is the radio technology for broadening the band of data transmission/reception in combination with a plurality of antennas, is achieved using an antenna of another cell, it is possible to set the same offset amount in the second cell installed in the first cell. This achieves the following effects. There is achieved an effect that the second cell is capable of recognizing the timing (specific examples thereof include transmission timing and SFN) used in the first cell. This leads to an effect that the process of the network is simplified if the timings are identical to each other when the timings of transmission to the UE are controlled to be at the same timing.

Further, the method (Step ST3205) of the fifth modification may be used such that the first cell may notify the multimedia broadcast multicast service single frequency network (MBSFN) synchronization area number to which the first cell belongs or which is recognized by the first cell and the offset amount used in the MBSFN synchronization area. As a specific example of the offset amount, the offset amount (in a case where the offset amount is "0", the offset amount is not required to be notified) from the timing of the first cell is conceivable. This allows, in a case where a new cell is installed, a new cell to recognize the timing of the MB SFN synchronization area without the network and the already installed cell performing any process (Step ST3201). As a result, it is possible to perform the synchronization required for belonging to the MBSFN synchronization area only by the process of the cell in a case where a new cell is installed, which achieves effects that a mobile communication system is prevented from becoming intricate and that a cell is installed flexibly. In addition, the method (Step ST3205) of the fifth modification may be used such that the first cell notifies the MBSFN area number to which the first cell belongs or which is recognized by the first cell and the offset amount used in the MBSFN area. As a specific example of the offset amount, the offset amount (in a case where the offset amount is "0", the offset amount is not required to be notified) from the timing of the first cell is conceivable. This allows, in a case where a new cell is installed, a new cell to recognize the timing of the MB SFN area without the network and the already installed cell performing any process (Step ST3201). As a result, it is possible to perform the synchronization required for belonging to the MBSFN area only by the process of the cell in a case where a new cell is installed, which achieves effects that a mobile communication system is prevented from becoming intricate and that a cell is installed flexibly.

Sixth Modification

Figure 33:
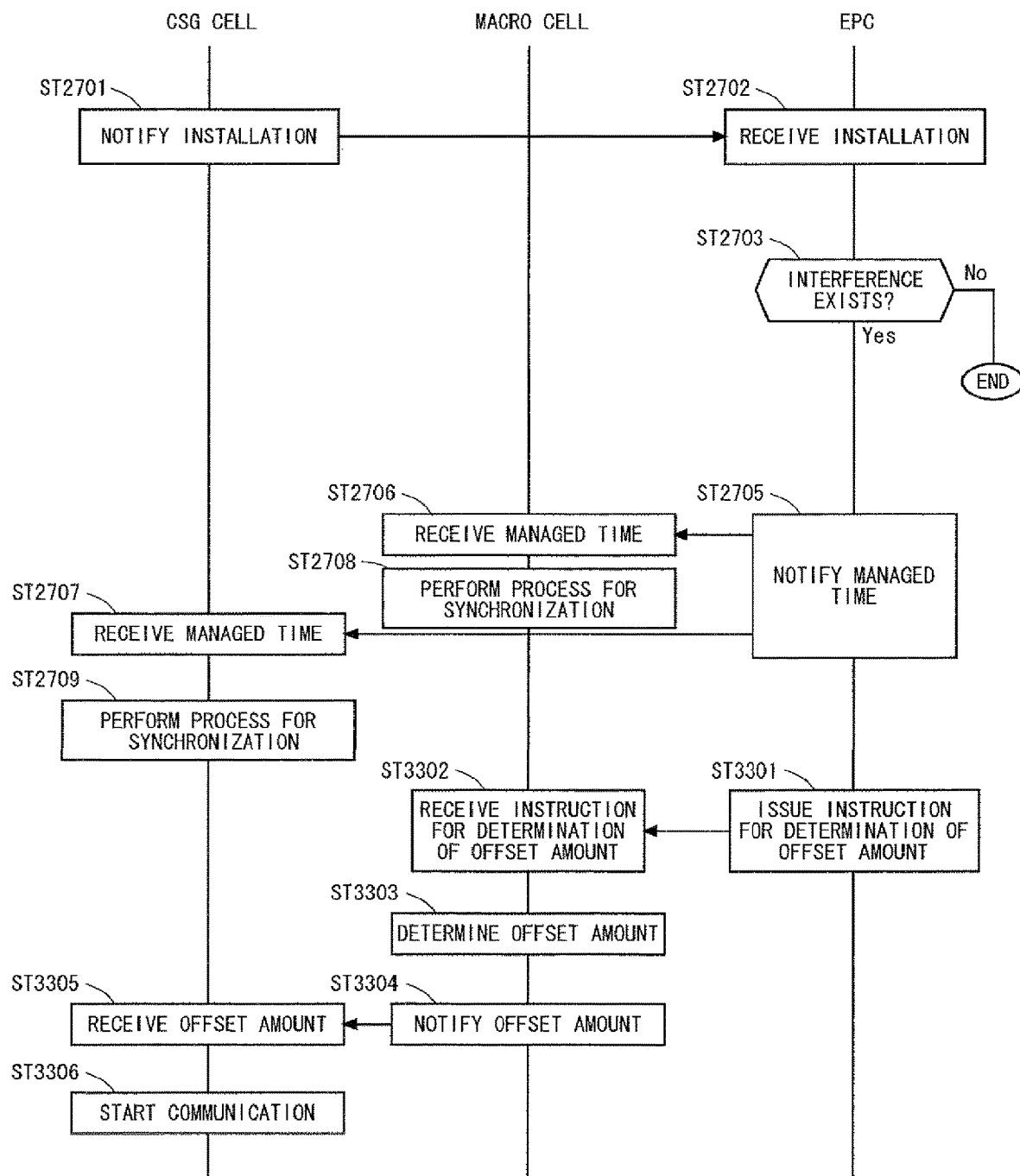
FIG. 33 is a sequence diagram until an offset amount of a mobile communication system is determined in a sixth modification of the third embodiment.

The sixth modification discloses the method of determining an offset amount (or may be a frame configuration) by the first cell as the method of determining an offset amount different from the third embodiment. As specific examples, the eNodeB, NodeB, macro cell, HeNB, HNB, Pico cell, micro cell, CSG cell and the like are conceivable as the first cell that determines the offset amount in the LTE system. FIG. 33 shows an example of the sequence until the offset amount (or may be a frame configuration) of a mobile communication system is determined in the sixth modification. The same or equivalent processes are executed in the same steps as those of FIG. 27 in FIG. 33, and thus description thereof is omitted. In Step ST3301, the EPC issues an instruction for determining an offset amount to the macro cell. As a notification method, the method described in Step ST2705 can be used. In Step ST3302, the macro cell receives the instruction for determining an offset amount. In Step ST3303, the macro cell performs the process such that the resources of the signals that cannot be scheduled are prevented from overlapping with each other between cells. As a specific example, the resources of the signals that cannot be scheduled are shifted from each other between cells (an offset amount is provided). The macro cell determines the offset amount. Detailed description is similar to that of Step ST2704, which is omitted. In Step ST3304, the macro cell notifies the CSG cell of the offset amount determined in Step ST3303. As a notification method, the method described in Step ST2803 of FIG. 28 can be used. In Step ST3305, the CSG cell receives the offset amount from the macro cell. In Step ST3306, the CSG cell starts communication in accordance with the offset amount received in Step ST3305, that is, by shifting the timing by the offset amount. Alternatively, the CSG cell starts communication in accordance with the frame configuration received in Step ST3305. In the sixth modification, the third embodiment, the first modification and the second modification can be used in the synchronization. Alternatively, the sixth modification can be used in combination with the third modification. According to the sixth modification, it is possible to achieve similar effects to those of the third embodiment.

Further, the CSG cell may notify the macro cell of the installation in Step ST2701. The judgment of Step ST2703 may be performed by the macro cell. Further, the first modification may be used in synchronization. This enables to omit the instruction for determining an offset amount from the EPC to the macro cell (Step ST3301 and Step ST3302) and the synchronization (Step ST2705) in the EPC. Accordingly, it is possible to achieve the effect that a mobile communication system is prevented from becoming intricate.

Seventh Modification

The seventh modification discloses a specific example of the judgment criteria for judging whether or not there exists the first cell that causes interference in a case where a new cell is installed. A threshold is used as judgment criteria. A specific example of the threshold is described below. In a case where the "location information" is used in judging whether or not there exists the first cell that causes interference, the distance between the second cell and the first cell (which may be multiple) is conceivable as the threshold. For example, in a case where the distance between the first cell and the second cell is equal to or larger than the threshold (or larger than the threshold), it is judged that the first cell and the second cell do not interfere with each other. While, in a case where the distance between the first cell and the second cell is smaller than the threshold (or equal to or smaller than the threshold), it is judged that the first cell and the second cell interfere with each other. In a case where the "situation of surrounding cells" is used in the judgment as to whether or not there exists the first cell that causes interference, the communication quality is conceivable as a threshold. As described in the third modification, the following are conceivable as specific examples of the communication quality: (1) received power of the RS; (2) ratio of strength between the received power of the RS and the received power at the carrier frequency; (3) received signal strength; (4) ratio between a desired signal and an interference signal; (5) received power of the RS in the RE; and (6) interference amount. For example, in a case where there exists no cell having a value equal to or larger than the threshold (or larger than the threshold) as a result of the measurement of the communication quality in the situation of neighboring cells, which is measured by the second cell, it is judged that the first cell that interferes with the second cell does not exist. Further, in a case where there exists a cell having a value equal to or larger than the threshold (or larger than the threshold) as a result of the measurement of the communication quality in the situation of neighboring cells, which is measured by the second cell, it is judged that there exists the first cell that interferes with the second cell.

Further, in a case where the second cell judges the measurement results of the situation of neighboring cells using the threshold and judges that there exists the first cell that causes interference, the situation of neighboring cells may be notified to the body that determines the offset amount. Accordingly, in a case where the first cell that causes interference does not exist as a result of the judgment by the second cell, it is possible to omit the notification of the situation of neighboring cells. This leads to the effects that a mobile communication system is prevented from becoming intricate and that the radio resources are effectively used. It is conceivable that the threshold may be determined in a static manner. The threshold is determined in a static manner, whereby the notification through change of the threshold is not required. This leads to an effect that a mobile communication system is prevented from becoming intricate. In addition, it is conceivable that the threshold can be changed. In such a case, the network notifies the threshold to the body that judges whether or not there exists the first cell that causes interference. As a notification method, the method described in Step ST2705 can be used. There is conceivable a case where whether or not there exists the first cell that causes interference is different even in a case where the second cell is installed in the same place, depending on a change of the maximum value of the transmission power allowed to each cell and the communication situation. The threshold can be changed, whereby it is possible to achieve an effect that a flexible mobile communication system complying with such a case can be obtained. Alternatively, the first cell may notify the threshold to the body that judges whether or not there exists the first cell that causes interference. As a notification method, the method described in Step ST2803 can be used. The threshold specific to each cell can be set, whereby it is possible to set the threshold complying with the installation location of the first cell. Therefore, a flexible mobile communication system can be obtained.

Similarly, the threshold can be used as the judgment criteria for judging whether or not the installation has been performed within the coverage area of the other cell. Similarly, in a case where the second cell has been installed, the threshold can be used as the judgment criteria for judging whether or not to perform the process to prevent the resources from being identical to each other between the channels that cannot be scheduled. The seventh modification can be used in combination with the third embodiment, third modification, fourth modification, fifth modification or sixth modification. Similar effects to those of the third embodiment can be used in the seventh modification.

Fourth Embodiment

The interference between downlink signals is an issue between cells in which handover cannot be performed or with the cell operated in a closed access mode. As the solution to this, the first embodiment discloses that the radio resources of the signals that cannot be scheduled are prevented from overlapping with each other between the cells. As the method therefor, the first embodiment discloses that synchronization is performed between the cells and that the resources of the signals that cannot be scheduled are shifted from each other between cells (an offset is provided). The second embodiment discloses what value is used for the offset amount for solving the problem of interference between downlink cells. The third embodiment discloses the method of determining an offset amount. Description is given below of the case where a new cell is installed in a location in which a plurality of cells and downlink signals cause interference.

Part (a) of FIG. 34 is a conceptual diagram of a problem of the fourth embodiment. There are a macro cell 3401 (eNB#1) and a macro cell 3403 (eNB#2). A coverage area 3402 of the macro cell 3401 and a coverage area 3404 of the macro cell 3403 are as shown in part (a) of FIG. 34. There is considered a case where a CSG cell 3405 (eNB#3) is newly installed in the coverage areas of both cells of the eNB#1 and the eNB#2, that is, in an area that belongs to 3402 and 3404. A coverage area 3406 of the CSG cell 3405 is as shown in part (a) of FIG. 34. A UE 3407 exists in the coverage area 3406. Part (b) of FIG. 34 shows the SIR at the UE 3407 in the communication situation before the CSG cell 3405 (eNB#3) is installed. A portion above a broken line indicates the SIR where communication is possible. Even in a case where the UE 3407 moves from the eNB#1 to the eNB#2, the SIR indicated by a chain line of part (b) can be obtained upon the UE 3407 performing handover from the eNB#1 to the eNB#2. This allows the UE 3407 to perform communication at all times even in a case where the UE 3407 moves from the eNB#1 to the eNB#2. Part (c) of FIG. 34 shows the SIR at the UE 3407 in the communication situation after the eNB#3 is installed. A portion above a broken line indicates the SIR where communication is possible. A bold broken line indicates the SIR received by the UE 3407 from the eNB#3. The eNB#3 is a CSG cell. Further, the case where the UE 3407 has not been registered in the eNB#3 is considered. The UE 3407 cannot communicate with the eNB#3 and cannot perform handover to the eNB#3. Therefore, in a case where the UE 3407 moves from the eNB#1 to the eNB#2, the SIR indicated by the chain line of part (c) is obtained, which causes a problem that the SIR where communication is possible in the vicinity of the eNB#3 is not satisfied, that is, communication cannot be performed.

In newly installing the eNB#3, it is conceivable that the radio resources of the signals that cannot be scheduled of the eNB#1 or eNB#2 will be prevented from overlapping with each other between those cells. In this case, without any improvements, there are conceivable a case where the radio resources of the signals that cannot be scheduled of the eNB#3 and eNB#1 will be prevented from overlapping with each other between those cells and a case where the radio resources of the signals that cannot be scheduled of the eNB#3 and eNB#2 will be prevented from overlapping with each other between those cells. FIG. 35 is a conceptual diagram of the results obtained by reducing the downlink interference amounts in the respective cases. Part (a) of FIG. 35 shows the case where the radio resources of the signals that cannot be scheduled of the eNB#3 and eNB#1 are prevented from overlapping with each other between those cells. In this case, even in a case where the UE 3407 moves from the eNB#1 to the eNB#2, it is possible to obtain the SIR indicated by a chain line of part (a) upon the UE 3407 performing handover from the eNB#1 to the eNB#2. This allows the UE 3407 to perform communication at all times even in the case where the UE 3407 moves from the eNB#1 to the eNB#2. Part (b) of FIG. 35 shows the case where the radio resources of the signals that cannot be scheduled of the eNB#3 and eNB#2 are prevented from overlapping with each other between those cells. In this case, when the UE 3407 moves from the eNB#1 to the eNB#2, only the SIR indicated by the chain line of part (b) can be obtained even if the UE 3407 performs handover from the eNB#1 to the eNB#2, which causes a problem that the SIR where communication is possible in the vicinity of the eNB#3 cannot be satisfied, that is, communication cannot be performed. That is, in a case where a new cell is installed in a location in which a plurality of cells and downlink signals cause interference, how to achieve collaboration for obtaining the effects most by reduction of the downlink interference is an issue. Specific examples of "collaboration" in this case include the synchronization, the process of shifting the timing and the process of providing an offset amount to the timing. The fourth embodiment discloses how to achieve collaboration for reducing the interference between downlink cells in a case where a plurality of first cells exist.

The fourth embodiment discloses that in a case where a new cell is installed in a location in which a plurality of first cells and downlink signals cause interference, the new cell is caused to collaborate with the cell that causes interference most therewith. The methods of the first embodiment including the modifications can be used for the configuration for preventing the resources of the signals that cannot be scheduled from overlapping with each other. Further, the methods of the second embodiment including the modifications can be used for the offset amount. Further, the methods of the third embodiment including the modifications can be used as the method of determining the offset amount (or may be a frame configuration). A specific example of determining a cell that causes interference most (hereinafter, referred to as a collaborative cell) is described below. In a case where the "location information" is used in judging whether or not the first cell that causes interference exists (for example, Step ST2703 of FIG. 27), the distance between the first cell and the second cell is used as judgment criteria. For example, the first cell among a plurality of first cells, which has the smallest distance between the first cell and the second cell, is judged as a collaborative cell. In a case where the "situation of neighboring cells" is used in judging whether or not there exists the first cell that causes interference, the communication quality of the situation of neighboring cells, which has been measured by the second cell, is used as judgment criteria. As described in the third modification of the third embodiment, the following are conceivable as specific examples of the communication quality: (1) received power of the RS; (2) ratio of strength between the received power of the RS and the received power at the carrier frequency; (3) received signal strength; (4) ratio between a desired signal and an interference signal; (5) received power of the RS in the RE; and (6) interference amount. For example, the cell having the largest results of measuring the communication quality of the situation of neighboring cells, which is measured by the second cell, is judged as a collaborative cell. In a case where the "situation of neighboring cells" is used, the second cell notifies the situation of neighboring cells to the body that determines offset amount.

According to the fourth embodiment, in a case where a cell is newly installed in a location in which a plurality of cells and downlink signals cause interference, the method of reducing downlink interference most efficiently can be obtained. As a result, it is possible to achieve an effect that the area in which communication is not possible is reduced owing to the installation of a new cell.

First Modification

The first modification discloses another solution to the same problem as that of the fourth embodiment. The first modification discloses that in a case where a new cell is installed in a location in which a plurality of first cells and downlink signals cause interference, the new cell is caused to collaborate with all the first cells. That is, timing (such as radio frame and SFN) is shifted from those of all the first cells (an offset is provided). The methods of the first embodiment including the modifications can be used for the configuration for preventing the resources of the signals that cannot be scheduled from overlapping with each other. Further, the methods of the second embodiment including the modifications can be used for the offset amount. Further, the methods of the third embodiment including the modifications can be used as the method of determining an offset amount (or may be a frame configuration).

The case where there are a large number of first cells and the offset amount setting range (range of the offset amount) described in the second embodiment is exceeded is considered below. In that case, collaboration is achieved with the cell that causes interference most. A specific method is similar to that of the fourth embodiment. Further, the timing identical to that of the cell that causes interference least is not shifted, that is, the timings are made identical to each other. Disclosed below is a specific example of the method of determining the cell that causes interference least. In a case where the "location information" is used in judging whether or not the first cell that causes interference exists, the distance between the second cell and the first cell is used as judgment criteria. For example, the first cell among a plurality of first cells, which has the largest distance between the first cell and the second cell, is judged as a cell that causes interference least. In a case where the "situation of neighboring cells" is used in judging whether or not there exists the first cell that causes interference, the communication quality of the situation of neighboring cells, which has been measured by the second cell, is used as judgment criteria. As described in the third modification, the following are conceivable as specific examples of the communication quality: (1) received power of the RS; (2) ratio of strength between the received power of the RS and the received power at the carrier frequency; (3) received signal strength; (4) ratio between a desired signal and an interference signal; (5) received power of the RS in the RE; and (6) interference amount. For example, the cell having the smallest results of measuring the communication quality of the situation of neighboring cells, which is measured by the second cell, is judged as a cell that causes interference least. In a case where the "situation of neighboring cells" is used, the second cell notifies the situation of neighboring cells to the body that determines offset amount. According to the first modification, the following effects can be achieved in addition to the effects of the fourth embodiment. It is possible to alleviate the interference with all first cells in which downlink signals cause interference within the offset amount setting range. Therefore, it is possible to achieve an effect that a mobile communication system in which downlink interference is suppressed is constructed.

Fifth Embodiment

The interference between downlink signals is an issue between cells in which handover cannot be performed or with the cell that is operated in a closed access mode. As the solution thereto, the first embodiment discloses that any or both of the times (timings) of the physical resources to which the signals that cannot be scheduled are mapped and frequencies are prevented from overlapping with each other between cells. As the method therefor, the first embodiment discloses that synchronization is performed between those cells and that the resources of the signals that cannot be scheduled are shifted from each other between cells (an offset is provided). Further, the second embodiment discloses what value is used for the offset amount for solving the problem of interference between downlink cells. Further, the third embodiment discloses the method of determining the offset amount. The fourth embodiment discloses that in a case where a new cell is installed in a location in which a plurality of first cells and downlink signals cause interference, collaboration is achieved with the cell that causes interference most. In some cases, cells having different frame configurations exist in the system by using the solution among the solutions of the first embodiment. As a specific example thereof, the first embodiment and the first modification of the first embodiment are solutions thereto. In a case where the cells having different frame configurations exist in the system, the UE cannot perform communication if it does not recognize a serving cell, a cell for handover, or the frame configuration that is used by the cell for cell reselection. Therefore, the fifth modification discloses a specific method of notifying a UE of the frame configuration (or offset amount).

In the fifth embodiment, the second cell notifies the offset amount of radio resources allocated to the signal that causes interference between the first cell and the second cell from the second or the information indicating the frame to UEs being served thereby. As a specific example, the second cell notifies the offset amount of radio resources allocated to the signal that causes interference between the first cell and the second cell or the information indicating the frame configuration to UEs being served thereby as the element of a master information block (MIB) information mapped to the BCCH on the PBCH. The offset amount of the signal that causes interference between the first cell and the second cell or the information indicating the frame configuration is notified to UEs being served as the element of the master information block (MIB) information mapped to the BCCH on the PBCH, whereby the following effects can be achieved. For example, in the LTE communication system, the MIB is mapped to the PBCH and accordingly can be received at an early stage of the search operation (Step ST1204 of FIG. 12 as a specific example). Therefore, it is possible to achieve the effects that a control delay is prevented and that power consumption is reduced by mapping the offset amount or the information indicating the frame configuration to the MIB information. Further, it is possible to notify the offset amount of the second cell or the information indicating the frame configuration only from the second cell. Therefore, notification is not required in the first cell. This achieves the effect that radio resources are effectively used.

Further, as another method, association is established between the PCI of the second cell and the offset amount of radio resources allocated to the signals that cause interference between the first cell and the second cell or between the PCI of the second cell and the information indicating the frame configuration of the second cell. For example, it suffices that an offset amount or frame configuration is obtained by a UE from the following equations.

Offset amount=PCI mod $N$ ($N$ is an integer)

Information indicating frame configuration=PCI mod $N$ ($N$ is an integer)

Association is established between the PCI of the second cell and the offset amount of radio resources allocated to the signals that cause interference between the first cell and the second cell, or between the PCI of the second cell and the information indicating the frame configuration of the second cell, to thereby achieve the following effects. The offset amount or frame configuration can be recognized together when the UE recognizes the PCI. The PCI of the cell can be recognized at an early stage of the search operation (Step ST1201 of FIG. 12 as a specific example). In the second method, the offset amount of the second cell or the frame configuration can be recognized at an earlier stage of the search operation of a UE compared with the first method. This enables to further obtain the effects that a control delay is prevented and that power consumption is reduced. In addition, additional information is not required for notifying the offset amount or frame configuration from a base station to a UE. Accordingly, an effect that radio resources are effectively used can be achieved.

Further, as another method, it is conceivable that the offset amount of radio resources allocated to the signals that cause interference between the first cell and the second cell or the frame configuration will be determined in a static manner as a mobile communication system. As a specific example, the offset amount or frame configuration used in the second cell and the offset amount or frame configuration in a case where the CSG cell is installed within the coverage area of a macro cell are determined in accordance with specifications. One or a plurality of offset amounts or frame configurations may be determined. In a case of a plurality thereof, a UE is capable of detecting the offset amount or frame configuration used in the second cell by blind detection. The offset amount of radio resources allocated to the signals that cause interference between the first cell and the second cell or the information indicating the frame configuration is determined in a static manner as a mobile communication system, whereby the following effects can be achieved. That is, additional information for notifying the offset amount or the information indicating the frame configuration is not required from a base station to a UE, and accordingly an effect that radio resources are effectively used can be achieved. Further, a UE does not use radio resources for recognizing an offset amount or frame configuration, and thus an effect that a reception error does not occur can be achieved.

The fifth embodiment can be used in combination with the first embodiment including the modifications, the second embodiment including the modifications, the third embodiment including the modifications or the fourth embodiment including the modifications. The following effect can be achieved by the fifth embodiment. In a case where an offset amount is provided between the first cell and the second cell for reducing the downlink interference, it is possible to achieve an effect that UEs being served by the second cell can perform communication even when the frame configuration is changed between the first cell and the second cell.

First Modification

Figure 36:
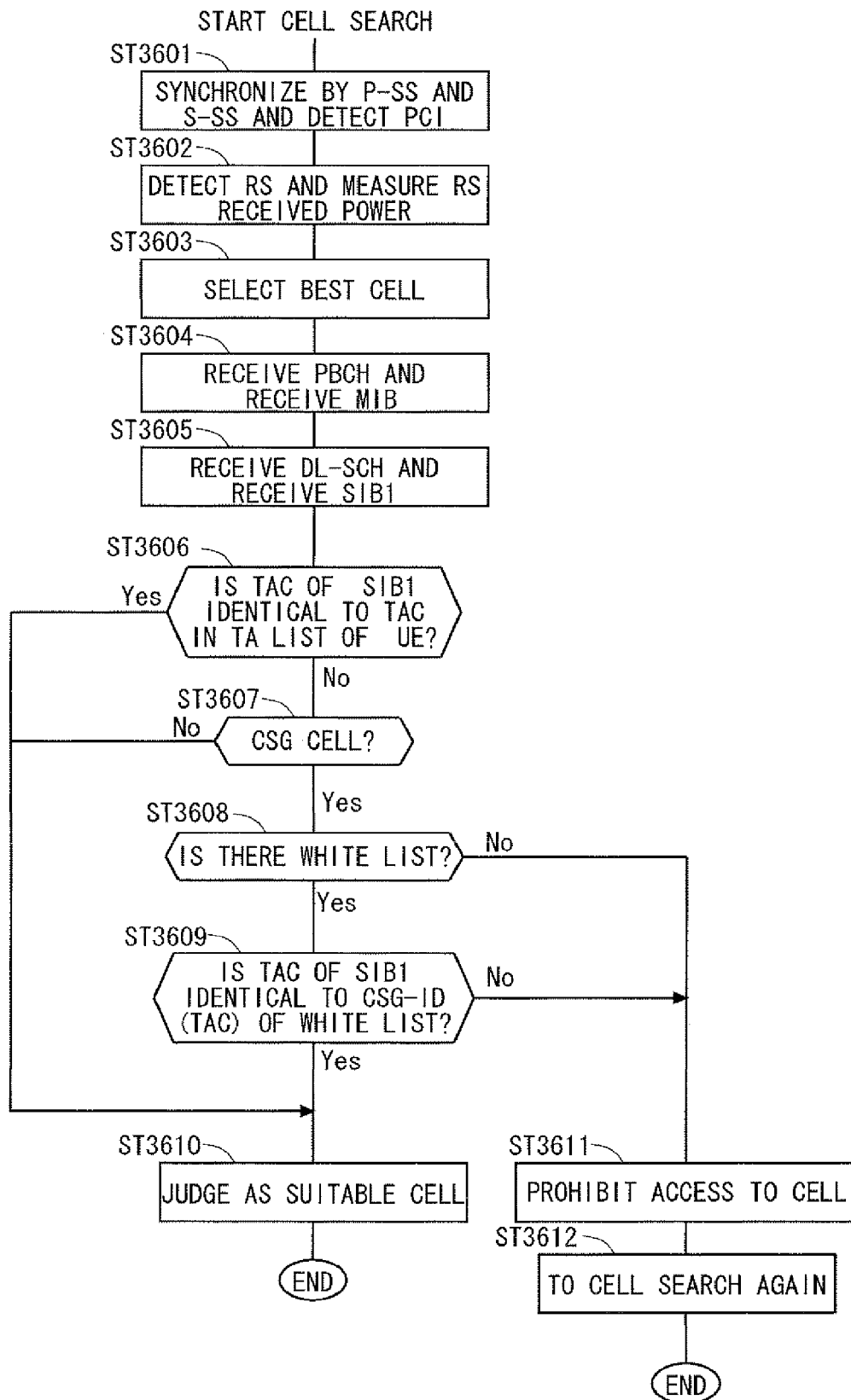
FIG. 36 is a flowchart of a UE, which illustrates a problem of a first modification of a fifth embodiment.

The first embodiment discloses the method of preventing the existence of the cells that have different frame configurations in a system even with the use of a solution. Specific examples of the method include the second modification of the first embodiment and the third modification of the first embodiment. In a case where there exist no cells having a different frame configurations in a system and the interference between downlink cells is reduced, it is possible to achieve an effect that a notification of the frame configuration (or offset amount) is not required from the second cell to a UE. That is, an effect that communication is enabled can be achieved only by a typical search operation. That is, additional information for notifying an offset amount or the information indicating the frame configuration is not required from a base station to a UE, leading to an effect that radio resources can be effectively used. Further, a UE does not use radio resources for recognizing an offset amount or frame configuration, leading to an effect that a reception error does not occur. While, a reduction of search time is a crucial issue for preventing a control delay in handover or the like. The first modification discloses the method that can be used for a reduction of search time even in the method of alleviating the interference in which communication can be performed only by a typical search operation (FIG. 12 as a specific example) of the UE. The issue of a reduction in search operation is conspicuous in a specific example below. FIG. 36 shows an example of an operation until a UE judges the cell as a "suitable cell" in this case.

In FIG. 36, Step ST3601 to Step ST3606 are the process corresponding to the process of Step ST1201 to Step ST1206 of FIG. 12, and thus description thereof is omitted. In a case where the TAC of the SIB1 is not identical to the TAC in the TA list of the UE in Step ST3606, the UE that has received the TAC broadcast from the selected cell moves to Step ST3607, and then judges whether the cell is a CSG cell. The CSG indicator broadcast by being included in the notification information by the cell, which is currently discussed by 3GPP, may be used in judgment as to whether the cell is a CSG cell. In the case where it is judged that the cell is not a CSG cell in Step ST3607, the UE moves to Step ST3610. In the case where the TAC of the SIB1 is identical to the TAC in the TA list of the UE in Step ST3606, the UE moves to Step ST3610.

In a case where it is judged that the cell is a CSG cell in Step ST3607, the UE moves to Step ST3608. In Step ST3608, the UE judges whether or not the own UE has a whitelist. In a case where the own UE has a whitelist, in Step ST3609, the UE compares the TAC (CSG-ID) included in the received SIB1 with the TAC (CSG-ID) in the whitelist of the own UE. In a case where there is the same TAC (CSG-ID) as a result of the comparison, in Step ST3610, the UE judges that the CSG cell is a "suitable cell". However, in a case where there is no identical TAC (CSG-ID) as a result of the comparison between the TAC (CSG-ID) included in the SIB1 received in Step ST3609 and the CSG-ID (TAC) in the whitelist of the own UE, the UE is prohibited to access the cell in Step ST3611 because the cell is not a "suitable cell". Accordingly, the UE has to perform retried cell search in Step ST3612. Also in a case where the UE does not have a whitelist in Step ST3608, the UE is prohibited to access the cell in Step ST3611 because the cell is not a "suitable cell". Also in this case, the UE cannot access the cell and has to perform retried cell search in Step ST3612.

As described above, there is required the time period for judging whether or not a target cell is a "suitable cell" in cell reselection and handover due to the introduction of a CSG cell. It is aimed that a CSG cell is introduced in a mobile communication system such the LTE and UMTS. Further, it is assumed that a large number of CSG cells will be installed in the future. In particular, the occurrence of communication interruption is a serious problem during handover. Therefore, it is a big issue to reduce the time period required for the UE to judge that the cell is a "suitable cell" as a mobile communication system.

The first modification discloses the method of solving the above-mentioned problem. The serving cell notifies the UE of the offset information (may be the information indicating a frame configuration) of neighboring cells. A specific example of the notification method is disclosed below. The serving cell notifies UEs being served thereby of the offset information of neighboring cells as the broadcast information. In a case where the offset information is mapped to the BCCH, the following effects can be achieved. What notified is the broadcast information, and thus it can be notified to the coverage area of the cell. Further, the broadcast information is the information that can be received by a UE in which a dedicated channel is not set with the serving cell, that is, even by a UE in the idle state. Therefore, there can be achieved an effect that the time period required for the UE to judge whether or not the cell is a "suitable cell" in the cell reselection can be reduced. The offset information is newly added as the information element of the master information block (MIB) information of the broadcast information. The offset information is newly added as the information element of a system information block (SIB) of the broadcast information BCCH. In addition, the offset information is newly added as the information element of the SIB4. In a case where the offset information is mapped to the SIB4, it is possible to achieve the following effect. Currently, it is aimed in 3GPP that an intra freq neighboring cell list is mapped to the SIB4. In the above-mentioned situation, it is possible for a UE to obtain a parameter used in the process of obtaining the situation of neighboring cells by the reception of the same system information, leading to effects that an operation of a UE is prevented from becoming intricate and that a control delay is prevented.

Further, the offset information is newly added as the information element of the SIB5. In a case where the offset information is mapped to the SIB5, the following effects can be achieved. Currently, it is aimed in 3GPP that an inter freq neighboring cell list is mapped to the SIB5. In the above-mentioned situation, it is possible for a UE to obtain a parameter used in the process of obtaining the situation of neighboring cells by the reception of the same system information, leading to effects that an operation of a UE is prevented from becoming intricate and that a control delay is prevented. Further, in a case where the second cell is the HeNB, the offset information is newly added as the information element of the SIB9. In a case where the offset information is mapped to the SIB9, the following effects can be achieved. Currently, it is aimed in 3GPP that a home eNB identifier (HNBID) is mapped to the SIB9. In the above-mentioned situation, it is possible for a UE to obtain a parameter used in the process of obtaining the information regarding the HeNB by the reception of the same system information, leading to effects that an operation of a UE is prevented from becoming intricate and that a control delay is prevented.

Alternatively, the offset information of neighboring cells may be mapped to a common control channel (CCCH) that is a logical channel, a dedicated control channel (DCCH), a multicast control channel (MCCH) or a multicast traffic channel (MTCH), and further mapped to a downlink shared channel (DL-SCH) that is a transport channel and a physical downlink shared channel (PDSCH) that is a physical channel, to thereby be notified to a UE. The broadcast information is the information that is broadcast periodically. Accordingly, a reduction in information amount of broadcast information is an important issue from the standpoint of effective use of radio resources. Therefore, in a case where the offset information of neighboring cells is notified using the downlink shared channel, it is possible to notify a UE of the offset information of neighboring cells without increasing an information amount of the broadcast information, leading to an effect that radio resources are effectively used.

Further, the offset information is newly added to the control information (also referred to as measurement control information) regarding the measurements of neighboring cell, which is notified from the serving cell to a UE. This allows a UE to obtain a parameter used in the process of measuring the neighboring cells in the same information, leading to effects that an operation of a UE is prevented from becoming intricate and that a control delay is prevented. In addition, the offset information of neighboring cells can be notified to a UE without increasing an information amount of the broadcast information, leading to an effect that radio resources are effectively used. As a specific example, it is conceivable that the offset information may be newly added to a meas object EUTRA information element (Non-Patent Document 11) as a new element. As a result, a new message is not required to be provided, leading to effects that an operation of a mobile communication system is prevented from becoming intricate and that a control delay is prevented. Further, the problem of the first modification is a problem that becomes conspicuous particularly in handover as described above. Accordingly, the offset information is newly added as an information element of the measurement control that is notified from the serving cell in the handover process. This allows the UE to obtain the parameter used in the process of performing handover in the same information, leading to effects that an operation of a UE is prevented from becoming intricate and that a control delay is prevented. Further, it is possible to notify the UE of the offset information of neighboring cells without increasing an information amount of the broadcast information, leading to an effect that radio resources are effectively used.

Specific examples of the offset information are disclosed below. As a first specific example, the offset amount of neighboring cells in collaboration with the own cell is notified from the serving cell. Specific examples of "collaboration" in this case include synchronization, the process of shifting timing and the process of providing an offset amount to timing. In a case where there are a plurality of neighboring cells, the offset amount may be notified for each PCI (or GCI). As a second specific example, the offset amount of the second cell within the coverage area of the serving cell is notified by the serving cell. Further, the offset amount of the CSG cell within the coverage area of the serving cell is notified by the serving cell. In a case where there are pluralities of second cells, the offset amount may be notified for each PCI (or GCI). According to the second specific example, there can be achieved an effect particularly in a reduction of the time period required for the handover process from the macro cell to the CSG cell installed within the coverage area of the macro cell. As a third specific example, the offset amount with the first cell is notified by the serving cell. Further, the offset amount with the macro cell that has the same coverage is notified by the serving cell. In a case where there are a plurality of first cells, the offset amount may be notified for each PCI (or GCI). According to the third specific example, there can be achieved an effect particularly in a reduction of the time period required for the handover process from the CSG cell to the macro cell that has the same coverage. As a fourth specific example, the serving cell provides information related to whether or not there exists a cell different from the own cell, which is within the first cells and has the same offset amount as that of the own cell. According to the fourth specific example, there can be achieved an effect particularly in a reduction of the time period required for the handover process from the CSG cell to the CSG cell within the same coverage area of the macro cell. The first to fourth specific examples can be used in combination. In addition, this first modification can be used in combination with the first embodiment including the modifications, the second embodiment including the modifications, the third embodiment including the modifications, the fourth embodiment including the modifications or the fifth embodiment.

According to this first modification, the following effects can be achieved. The serving cell notifies the offset information of neighboring cells or the information indicating a frame configuration. In a case where the offset information of neighboring cells is not notified from the serving cell, the UE has to blind-detect the timing synchronization in Step ST3601. As a specific example of the LTE system, the UE has to blind-detect the slot timing using P-SS in Step ST3601. According to this first modification, the UE can obtain the offset information of neighboring cells, and accordingly is capable of reducing the blind detection of Step ST3601. This leads to an effect that the time period required for judging whether or not the cell is a "suitable cell" in cell reselection and handover is reduced.

The methods disclosed in the first embodiment to the fifth embodiment including the modifications can be used as the solution in the case below. The methods disclosed in the first embodiment to the fifth embodiment including the modifications can be used as the method of reducing the interference of downlink signals between the first cell and the second cell in a case where a macro cell, HeNB, HNB, pico cell or micro cell to which handover cannot be performed is installed as the second cell. With the use of the first embodiment to the fifth embodiment including the modifications, the resources of the signals that cannot be scheduled of the first cell and the second cell are prevented from overlapping with each other between the first cell and the second cell, whereby it is possible to achieve a reduction in interference of downlink signals. Further, the methods disclosed in the first embodiment to the fifth embodiment including the modifications can be used as the method of reducing the interference of downlink signals between the first cell and the second cell in a case where a macro cell, HeNB, HNB, pico cell or micro cell that is operated in a closed mode is installed as the second cell. With the use of the first embodiment to the fifth embodiment including the modifications, the resources of the signals that cannot be scheduled of the first cell and the second cell are prevented from overlapping with each other between the first cell and the second cell, whereby it is possible to achieve a reduction in interference of downlink signals.

Further, the methods disclosed in the first embodiment to the fifth embodiment including the modifications can be used as the method of reducing the interference of downlink signals between CSG cells (which may be HeNBs, HNBs, pico cells or micro cells) when a dedicated channel is operated, when a co-channel is operated and when a partial co-channel is operated. The resources of the signals that cannot be scheduled between the CSG cells (which may be HeNBs, HNBs, pico cells or micro cells) are prevented from overlapping with each other with the use of the first embodiment to the fifth embodiment including the modifications, whereby it is possible to achieve a reduction in interference of downlink signals. While the OFDM communication system has been mainly described above, the first embodiment to the fifth embodiment including the modifications are also applicable to the TDM communication system. The resources of the signals that cannot be scheduled of the first cell of TCM communication system and the second cell of the TDM communication system are prevented from overlapping with each other with the use of the first embodiment to the fifth embodiment including the modifications, whereby it is possible to achieve a reduction in interference of downlink signals. In the TDM communication system, the radio resources used in uplink transmission and the radio resources used in downlink transmission are separated in time. It is possible to provide an offset such that the radio resources used in downlink transmission of the first cell are used as the uplink radio resources of the second cell and that the radio resources used in uplink transmission of the first cell are used as the radio resources in downlink transmission of the second cell, which broadens the range of the offset amount that is effective in a reduction of downlink interference. As described above, the solutions disclosed in the first embodiment to the fifth embodiment including the modifications are methods highly complying with the TDM system.

Sixth Embodiment

In general, in a case where the interference power from the other cell increases within the coverage of a cell, a UE is configured to perform handover (HO) to the other suitable cell or cell reselection for preventing disconnection of communication. However, in a case where the UE cannot perform handover to such a cell or cell reselection, there arises a problem that the interference power from the other cell increases and communication is disconnected. For example, in a case where the CSG cell is introduced, it is conceivable that the HNB/HeNB will be operated as the CSG cell in a closed access mode and that the CSG cell is installed within the coverage of the macro cell. In such a case, interference occurs between the macro cell and the CSG cell within the CSG coverage, and accordingly there arises a problem that the UE that has not performed user registration with the CSG cell cannot communicate with the macro cell due to the interference from the CSG cell. In addition, similarly in a case where the UE that performs communication in the CSG cell cannot perform handover to the macro cell (eNB), a problem that communication cannot be performed arises. In order to solve those problems, Non-Patent Document 8 describes that a cell is operated in an open access mode as the deployment configuration E. However, Non-Patent Document 8 does not describe the method of setting this mode, for example, the method of determining a cell that is operated in an open access mode. Normally, it is conceivable that all HeNBs/HNBs will be operated in an open access mode, which leads to a problem that a deployment as a CSG cannot be performed, for example, access is allowed only to UEs that have registered in a closed access mode. Therefore, in order to solve those problems, the present embodiment discloses that a cell where interference is an issue complying with the open access mode. In addition, the present embodiment discloses the method of setting the mode when the cell is caused to comply with the access mode.

In the present embodiment, it is judged whether the cell is a cell where interference is an issue, and in a case of the cell where interference is an issue, an access mode is caused to comply with an open access mode. First, the method of determining an offset amount, which is disclosed in the third embodiment, is partially applicable to the judgment as to whether the cell is a cell where interference is an issue. For example, in a case where the core network (CN, EPC) (MME, HeNBGW) makes a judgment, Step ST2701 to Step ST2703 of FIG. 27 may be applied. In a case of YES in Step ST2703, the CSG cell (HeNB/HNB) that has notified the installation in Step ST2701 may be set to an open access mode. Further, for example, Step ST3001 to Step ST3005 of FIG. 30 may be applied. In a case of YES in Step ST3005, the CSG cell (HeNB/HNB) that has notified the installation in Step ST3004 may be set to an open access mode. Further, in a case where the CSG cell (HeNB/HNB) makes a judgment, Step ST3001 to Step ST3101 of FIG. 31 may be applied. In a case of YES in Step ST3101, the CSG cell (HeNB/HNB) may be set to an open access mode. The method disclosed in the seventh modification of the third embodiment may be used as judgment index. For example, a judgment is made with the use of a position, the downlink received power from the other cell, and a threshold of the received power as to whether or not communication is allowed.

Figure 37:
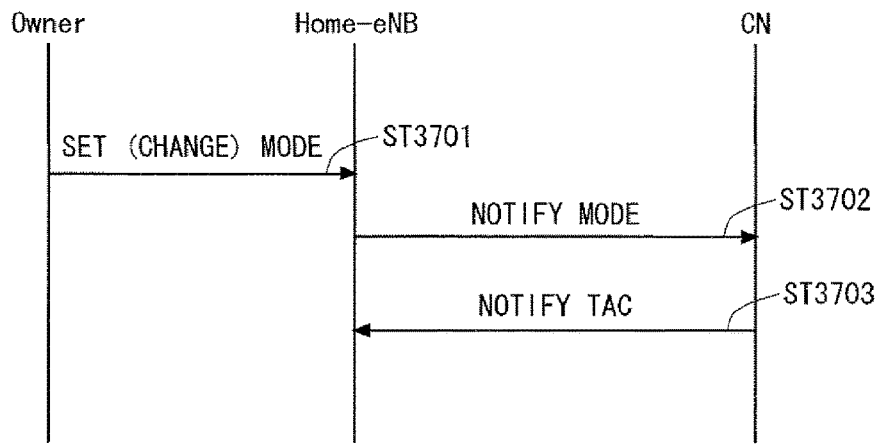
FIG. 37 is a sequence diagram for setting a CSG cell (HeNB/HNB) to comply with an open access mode in a case where the CSG cell (HeNB/HNB) makes a judgment.

Disclosed next is the method of setting a CSG cell (HeNB/HNB) to comply with the open access mode. For example, the method shown in FIG. 37 is used in a case where the CSG cell (HeNB/HNB) makes a judgment. The CSG cell (HeNB/HNB) that has judged the presence/absence of interference in Step ST3101 of FIG. 31 issues an instruction to the owner of the HeNB/HNB by, for example, indicating the judgment results. The owner is allowed to set (change) the mode of the HeNB/HNB. Accordingly, the owner sets (changes) the mode of the HeNB/HNB as shown in Step ST3701 of FIG. 37. The HeNB/HNB whose mode has been set (changed) notifies the core network of the set mode in Step ST3702. In Step ST3703, the core network notifies the HeNB/HNB of the TAC in the set mode. In a case where the HeNB/HNB judges YES in Step ST3101 of FIG. 31, the owner who has received an instruction of the results sets (changes) the mode to comply with the open access mode. An open access mode and a hybrid access mode are examples of the modes complying with the open access mode. In Step ST3702, the HeNB/HNB whose mode has been set (changed) to comply with an open access mode notifies the core network of the mode. In Step ST3703, the core network notifies the TAC complying with the mode.

Figure 38:
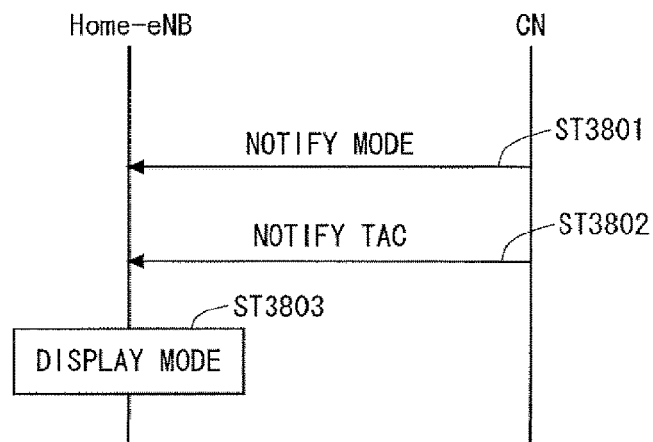
FIG. 38 is a sequence diagram for setting a CSG cell (HeNB/HNB) to comply with an open access mode in a case where a core network makes a judgment.

For example, the method shown in FIG. 38 is used in a case where the core network makes a judgment. The core network that has judged the presence/absence of interference in Step ST2703 of FIG. 27 sets (changes) the mode of the HeNB/HNB that has notified the installation in Step ST2701, based on the results of judgment. In Step ST3801, the core network notifies the HeNB/HNB of the set (changed) mode, to thereby set (change) the mode of the HeNB/HNB. In Step ST3801, the HeNB/HNB that has notified the set (changed) mode from the core network may set (change) the mode. In addition, in Step ST3802, the core network notifies the HeNB/HNB of the TAC in the set mode. The HeNB/HNB whose mode has been set (changed) may indicate the mode in Step ST3803 for showing in what mode the HeNB/HNB operates for the owner or the user of a UE existing in the vicinity thereof. In a case where YES is judged in Step ST2703 of FIG. 27, in Step ST3801, the core network sets (changes) the mode of the HeNB/HNB that has notified the installation in Step ST2701 to comply with the open access mode. Further, in Step ST3802, the core network notifies the TAC complying with the open access mode. In Step ST3803, the HeNB/HNB that has been set (changed) to comply with the open access mode indicates a mode so as to show, to the owner and the user of a UE existing in the vicinity thereof, that the HeNB/HNB operates in a manner complying with the open access mode.

As a specific example of the interface used in notification of an access mode, which is shown in Step ST3702 and Step ST3801, an S1 interface is conceivable. The location information that is new information is notified using the S1 interface that is an existing interface, to thereby obtain an effect that a mobile communication system is prevented from becoming intricate. As the method of making a notification with the S1 interface, there may be used the method of notifying the location information from the CSG cell to the EPC or the method of making a notification from the EPC to the macro cell or CSG cell for synchronization, which is disclosed in the third embodiment. Further, the access mode may be notified through, for example, a broadband line.

The access mode may be set (changed) at the timing when the HeNB/HNB is installed or when the power supply is changed from off to on. Further, the access mode may be set (changed) in a semi-static manner, such as in a case where a new cell where interference is a new issue is installed. Further, in a case where it is known in advance that the HeNB/HNB is installed in an area where interference is an issue, only the HeNB/HNB that has been caused to comply with the open access mode in advance may be installed, or it may be determined in advance that setting is performed to compatible with the open access mode between the owner and the operator.

The method of setting the access mode, which is disclosed in the present embodiment, does not require to set all HeNBs/HNBs to the open access mode irrespective of the presence/absence of interference between cells, which enables to set suitable HeNB/HNB to comply with the open access mode depending on the presence/absence of the interference between cells. This leads to an effect that the deployment as a CSG is allowed as well. Note that also in a case where the HeNB/HNB desired to be operated also in a closed access mode causes a problem as to the interference between cells, the HeNB/HNB is set (changed) to the hybrid access mode in the above-mentioned mode setting method so as to comply with the closed access mode as well as the open access mode. In a case where the interference between cells is an issue, it is possible to solve the problem that communication is disconnected also in a case where a UE cannot perform handover to those cells or cell reselection.

Figure 39:
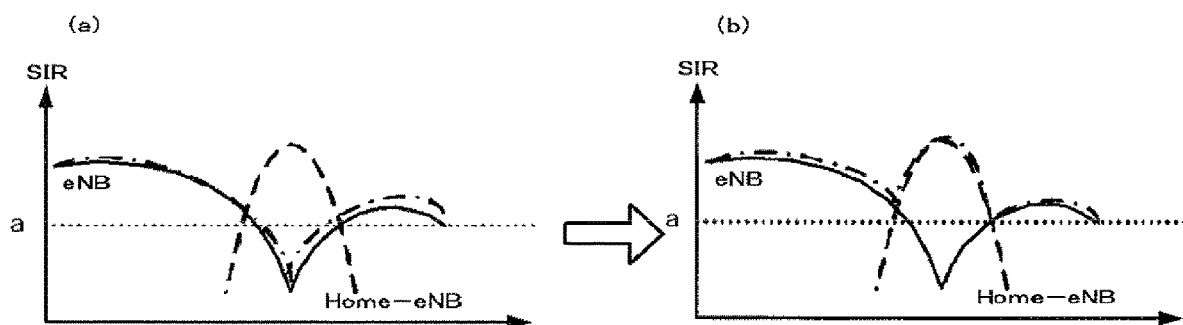
FIG. 39 is a conceptual diagram of the received signal-to-interference ratio (SIR) at a UE in the situation in which a HeNB operating as a CSG cell is installed within a coverage of a macro cell.

For example, FIG. 39 is a conceptual diagram of the received signal-to-interference ratio (SIR) at a UE in a situation in which a HeNB operating as a CSG cell is installed within the coverage of the macro cell. Part (a) of FIG. 39 shows the SIR in a conventional case. A horizontal axis represents the distance from the base station (eNB) to the macro cell, whereas a vertical axis represents the SIR. A threshold a is a value where communication can be made in a case in which the SIR is larger than a and cannot be made in a case in which the SIR is smaller than a. The UE has not performed user registration with the CSG. In a case where the CSG cell is installed within the coverage of the macro cell and the UE communicating with the macro cell within the coverage of the macro cell moves into the coverage of the CSG cell installed within the macro cell coverage, a radio wave from the CSG cell causes interference, which interferes communication with the macro cell. As shown in part (a) of FIG. 39, in a case where the HeNB is installed within the coverage of the eNB, the SIR of a UE communicating with the eNB degrades considerably in the vicinity of the HeNB. The SIR of a UE becomes smaller than the threshold a in the vicinity of the HeNB as indicated by a chain line. For this reason, the UE attempts to perform handover to the HeNB or cell reselection, but the HeNB is a CSG cell in a closed access mode. Accordingly, the UE cannot perform handover to the CSG cell or cell reselection, and thus communication is disconnected. However, the method disclosed in the present embodiment allows any UE to perform handover to the HeNB which has been set (changed) to comply with the open access mode in the vicinity of the HeNB, as shown in part (b) of FIG. 39, which prevents the SIR of a UE from falling below the threshold a as indicated by the chain line. Therefore, the UE is capable of continuing communication with the eNB or HeNB without disconnection.

While the first cell and the second cell where interference is an issue are the macro cell and HeNB/HNB in the example above, which are not limited thereto, it suffices that they are cells whose access modes are capable of being set to an open access mode. Further, while setting is made to an open access mode in the example above, which is not limited to that mode, it suffices that setting is made so as to allow handover.

First Modification

This modification discloses the method of setting or limiting any or both of the system bandwidths (entire frequency bandwidths) and center frequencies (carriers) of the cells in a case where interference between cells is an issue. The third modification of the first embodiment discloses the method of preventing the frequency domains where the signals that cannot be scheduled are mapped from overlapping with each other between cells. The third modification of the first embodiment also discloses the method of providing an offset to the frequency so as to prevent the frequency domains to which the signals that cannot be scheduled are mapped from overlapping with each other between cells. This modification describes the method of setting the offset. First, as in the sixth embodiment, the method of determining an offset amount, which is disclosed in the third embodiment, is partially applicable to the judgment as to whether the cell is a cell where interference is an issue. First, in the method of determining the offset amount, an offset amount is determined based on any or both of the system bandwidths and the center frequencies (carriers) of cells where interference is an issue, within the allowable frequency offset range disclosed in the second embodiment. For example, the offset amount may be determined by the HeNB/HNB or core network. In a case where the core network recognizes the system bandwidths or the center frequencies (carriers) of cells where interference is an issue, the core network is capable of determining the offset amount based on any or both of the system bandwidths and the center frequencies (carriers) of the cells where interference is an issue. On the other hand, the HeNB/HNB or macro cell does not recognize the system bandwidths or the center frequencies (carriers) of cells where interference is an issue, and thus in a case where the HeNB/NHB or macro cell determines the offset amount, the core network may notify the HeNB/HNB or macro cell of any or both of the system bandwidths and the center frequencies (carriers). In a case where the HeNB/HNB determines the offset amount, as another method, there may be used the method of obtaining any or both of the center frequency (carrier) of the cell by cell search and the system bandwidth of the master information block (MIB) information, which is disclosed in the second modification of the third embodiment. In some cases, the core network does not recognize the system bandwidth and the center frequency (carrier) of a cell that causes interference. In this case, each cell that has determined that the interference is an issue by the method disclosed in the third embodiment may notify the core network of any or both of the system bandwidth or the center frequency (carrier) of the own cell. Next, as to the method of notifying a set offset amount, the method of notifying an offset amount may be applied, which is disclosed in the third embodiment, to this method.

The employment of the method disclosed in this modification prevents the frequency domains to which the signals that cannot be scheduled are mapped from overlapping with each other. Further, similar effects to those of the first to fifth embodiments can be achieved with the use of the method disclosed in this modification in combination with the methods disclosed in the first embodiment to the fifth embodiment.

The method of setting a frequency offset, which is disclosed in this modification, is also applicable in a case where the CSG cell and the macro cell are operated in dedicated frequency domains different from each other or in a case some frequency is operated in an overlapping manner. While the first cell and the second cell where interference is an issue are the macro cell and the HeNB/HNB in the example above, which are not limited thereto, and it suffices that they are cells where interference is an issue.

Second Modification

This modification discloses that the first cell, second cell and core network each judge allowance/prohibition of the installation of the second cell. The installation is prohibited for the cell to be installed later where interference is an issue for reducing interference, to thereby prevent that the UEs being served by a cell that have been installed are not allowed to perform communication. The same method as that of the sixth embodiment is applicable in judgment whether or not the cell is a cell where interference is an issue. The method disclosed in the seventh modification of the third embodiment can be used as judgment criteria. Examples of the judgment index include a position, the downlink received power from the other cell, and the threshold of the received power as to whether or not communication is allowed. Alternatively, a judgment may be made based on any one or a plurality of UEs that exist within the coverage in a case where the second cell is installed. The threshold as to whether or not there is interference may be equal to the threshold disclosed in the sixth embodiment or the third embodiment, or may be a different value. The threshold of installation allowance/prohibition may be provided separately. This allows the deployments at a plurality of stages, such as the deployment in which installation of the second cell is allowed but an offset is provided and the deployment in which the installation is not allowed. Further, a judgment is made based on the number of UEs that exist within the coverage in a case where the second cell is installed, which enables an elaborate deployment such as one in which installation is not performed in the area crowded with UEs to prevent a large number of UEs from prohibiting communication. The method disclosed in the method of setting an access mode according to the sixth embodiment is also applicable to the method of notifying the second cell of the installation allowance/prohibition, the interface used in notification or notification timing. In this case, the installation allowance/prohibition is not notified but only the installation allowance may be notified. Operation may be allowed as a cell only in a case where the installation allowance notification is received.

The method described above does not require to adjust an offset between cells, which prevents a system from becoming intricate. In addition, the control is simplified in the base station or UE, leading to effects that a size of a control circuit is reduced and that in power consumption reduced.

Third Modification

As the method of reducing interference in a case where a cell where interference is an issue is installed, when the second cell is installed and the second cell interferes with the first cell, the first cell or core network may instruct the UEs that exist within the coverage of the second cell to perform handover to a cell operated on a frequency (channel) different from that of the second cell or reselection before the operation of the second cell is started. The method disclosed in the third embodiment may be applied to the judgment as to whether or not the second cell interferes with the first cell. The body that has judged the interference of the second cell with the first cell notifies the first cell or network of the interference. This allows the first cell to instruct the UEs to perform handover or reselection by being led by the cell or the network. Alternatively, what UEs exist within the coverage of the second cell may be judged by the first cell or core network. The first cell or core network obtains the location information about the location in which the second cell is installed and accordingly is capable of making that judgment based on the location information. The method disclosed in the third embodiment may be applied to the method of obtaining or notifying the location information.

Seventh Embodiment

Figure 40:
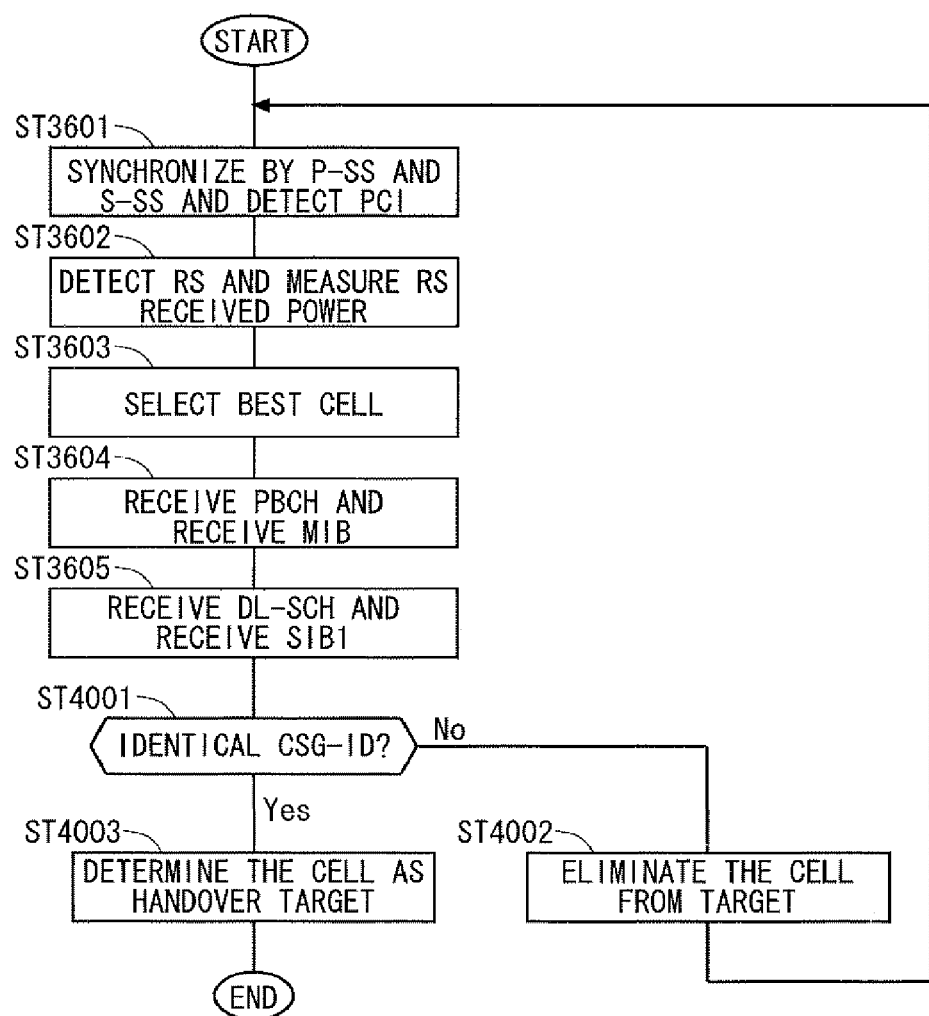
FIG. 40 is a flowchart of a UE, which describes a problem of a seventh embodiment.

The problem of the seventh embodiment is described below. For example, there is conceivable the service where the same owner has the cells having the same CSG-ID, the same charging benefit can be received from the cells having the same CSG-ID, or the same benefit can be received at a communication speed from the cells having the same CSG-ID. From the above, it is conceivable that in handover, a user may desire to perform handover to the cell having the same CSG-ID. The CSG-ID is associated with the TAC under the current specifications. The TAC is mapped to the SIB1. FIG. 40 shows the process of a UE in a case where handover to the cell having the same CSG-ID is performed without any improvements. The same or equivalent processes are executed in the steps of the same numbers as those of FIG. 36 in FIG. 40, and thus description of the same step numbers is omitted. In Step ST4001, the UE judges whether or not the CSG-ID (or TAC or TA) of the cell that is included in the SIB1 is identical to that of a serving cell. The UE proceeds to Step ST4002 in a case where it is judged that the CSG-ID is different. The UE proceeds to Step ST4003 in a case where it is judged that the CSG-ID is identical. In Step ST4002, the UE eliminates the cell from cell search or the measurement targets, and then proceeds to Step ST3601. In Step ST4003, the UE determines that handover is performed to the cell. That is, it is after the reception of the SIB1 in Step ST3605 that the CSG-ID of a target cell is revealed in handover. In a case where it is judged in Step ST4001 that the CSG-ID is different, the process from Step ST3601 to Step ST3605 becomes unnecessary. In a location in which the CSG cells having a different CSG-ID from that of the serving cell are installed in a crowded manner, it is judged that the CSG cell has a different CSG-ID many times in Step ST4001, and the process of Step ST3601 to Step ST3605 are repeated. This causes a problem that upon the allowable time for handover being exceeded, the ongoing communication is disconnected, handover fails, or handover is performed to the CSG-ID different from that of the serving cell, which is not desired by a user in terms of the allowable time, irrespective of the presence of the cell having the same CSG-ID as that of the serving cell in the vicinity. Therefore, it is a big issue to reduce the time period required for a UE to obtain the CSG-ID of a target cell as a mobile communication system.

Figure 41:
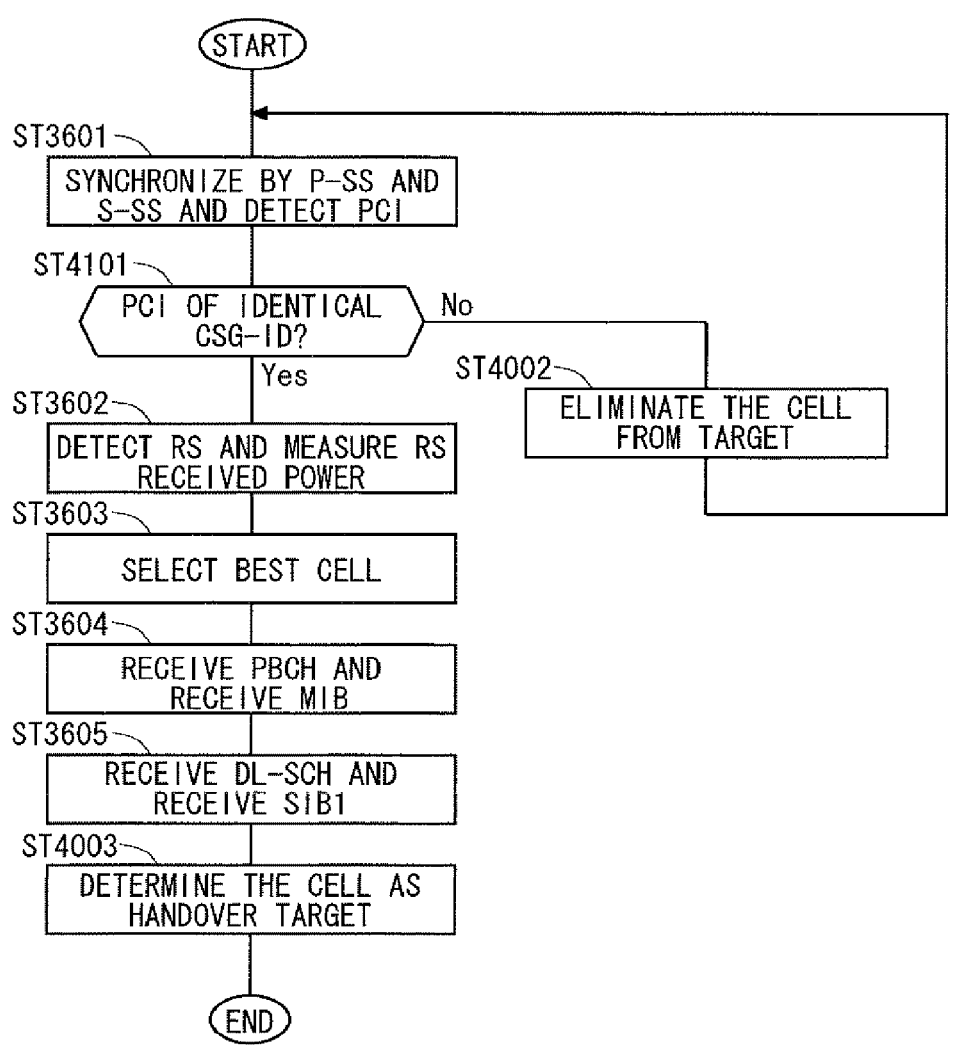
FIG. 41 is a flowchart of a UE in a case where handover to a cell having the same CSG-ID is performed in the seventh embodiment.

This embodiment discloses the method of solving the above-mentioned problem. The serving cell notifies the UE of the CSG cell having the same CSG-ID (or TAC or TA). The method of notifying the offset information according to the first modification of the fifth embodiment can be used as a specific example of the notification method. As a specific example of the notification information, it is conceivable that the PCI (or list) of the cell having the same CSG-ID as that of the serving cell may be notified. FIG. 41 shows the process of a UE in a case where handover to the cell having the same CSG-ID is performed in the seventh embodiment. The same or equivalent processes are executed in the steps of the same numbers as those of FIG. 36 and FIG. 40 in FIG. 41, and thus description of the same step numbers is omitted. In Step ST4101, the UE judges whether or not the PCI of the cell obtained in Step ST3601 is the "PCI of the cell having the same CSG-TD as that of the serving cell" notified from the serving cell. Alternatively, the UE judges whether or not the PCI of the cell obtained in Step ST3601 exists in the "PCI list of the cells having the same CSG-ID as that of the serving cell" notified from the serving cell. In the case of the same PCI or in the case where such a PCI exists in the list, the UE proceeds to Step ST3602. While, in the case of a different PCI or in the case where such a PCI does not exist in the list, the UE proceeds to Step ST4002.

This enables to judge whether or not the cell is a cell having the same CSG-ID as that of the serving cell at an early stage (Step ST4101) of the handover operation. In addition, this enables to eliminate unnecessary Step ST3602 to Step ST3605 regarding the cell having a different CSG-ID from that of the serving cell, which are caused in the conventional technology. Therefore, it is possible to achieve an effect that handover to a cell having the same CSG-ID can be performed without generating a control delay in the seventh embodiment.

While the LTE system (E-UTRAN) is mainly described in the present invention, the present invention is applicable to the W-CDMA system (UTRAN, UMTS) and LTE-Advanced. Further, the present invention is applicable to a mobile communication system in which a closed subscriber group (GSG) is introduced and a communication system in which an operator identifies subscribers and the identified subscribers are allowed access as in the CSG. In the LTE-Advanced or the like, not only the base station (such as eNB, HNB and HeNB) but also various devices or nodes for transmission/reception or multihop at many points are discussed. In a case where interference is an issue upon installation of those various devices or nodes, the present invention is applicable as the method of causing the devices or nodes to collaborate with each other for reducing interference therebetween. The interface provided between the devices or nodes may be used as the interface disclosed in the third embodiment.

The invention claimed is:

1. A mobile communication system comprising:
at least one user equipment; and
at least one base station that performs radio communication with said at least one user equipment,
wherein said at least one user equipment is notified of measurement control information regarding a measurement of a neighboring cell by the at least one base station, and
said measurement control information includes a physical cell identity (PCI) of another base station that specific subscribers are permitted to access and that is included in a group to which said at least one base station belongs.

2. The mobile communication system according to claim 1, wherein, the measurement control information and the PCI are transmitted by the at least one base station in a synchronization signal.

3. The mobile communication system according to claim 1, wherein the measurement control information further includes a symbol offset.

4. A base station, comprising:
circuitry coupled to a memory and that
performs radio communication with at least one user equipment,
notifies said at least one user equipment of measurement control information regarding a measurement of a neighboring cell,
includes a physical cell identity (PCI) in said measurement control information, said physical cell identity indicating another base station that specific subscribers are permitted to access and that is included in a group to which said base station belongs.

5. A user equipment, comprising:
circuitry coupled to a memory and that
performs radio communication with at least one base station, and
receives a signal notifying measurement control information regarding a measurement of a neighboring cell from the at least one base station,
wherein said measurement control information includes a physical cell identity indicating another base station that specific subscribers are permitted to access and that is included in a group to which said at least one base station belongs.

* * * * *